US008795552B2

(12) United States Patent
Wu et al.

(10) Patent No.: US 8,795,552 B2
(45) Date of Patent: Aug. 5, 2014

(54) LIQUID-CRYSTALLINE MEDIUM

(75) Inventors: Mingchou Wu, Nantou (TW); Martin (Kelun) Shu, Taoyuan (TW); Carol (Yi-Hsuan) Lin, Miaoli (TW); Mark Verrall, Taipei (TW)

(73) Assignee: Merck Patent GmbH, Darmstadt (DE)

( * ) Notice: Subject to any disclaimer, the term of this patent is extended or adjusted under 35 U.S.C. 154(b) by 160 days.

(21) Appl. No.: 13/058,697

(22) PCT Filed: Jul. 13, 2009

(86) PCT No.: PCT/EP2009/005084
§ 371 (c)(1),
(2), (4) Date: Feb. 11, 2011

(87) PCT Pub. No.: WO2010/017868
PCT Pub. Date: Feb. 18, 2010

(65) Prior Publication Data
US 2011/0140039 A1  Jun. 16, 2011

(30) Foreign Application Priority Data

Aug. 11, 2008  (EP) .................................... 08014316

(51) Int. Cl.
C09K 19/34  (2006.01)
C09K 19/52  (2006.01)
C09K 19/06  (2006.01)
C09K 19/30  (2006.01)
C09K 19/12  (2006.01)
C09K 19/00  (2006.01)
C09K 19/42  (2006.01)
C09K 19/32  (2006.01)
C09K 19/04  (2006.01)

(52) U.S. Cl.
CPC ......... *C09K 19/42* (2013.01); *C09K 2019/3009* (2013.01); *C09K 2019/0466* (2013.01); *C09K 2019/123* (2013.01); *C09K 2019/3422* (2013.01); *C09K 19/3402* (2013.01); *C09K 2019/3016* (2013.01); *C09K 2019/301* (2013.01); *C09K 2019/0407* (2013.01); *C09K 19/32* (2013.01); *C09K 19/3098* (2013.01)
USPC .............. 252/299.61; 252/299.01; 252/299.6; 252/299.63; 252/299.66; 428/1.1; 428/1.3

(58) Field of Classification Search
USPC ............... 252/299.01, 299.6, 299.61, 299.63, 252/299.66; 428/1.1, 1.3
See application file for complete search history.

(56) References Cited

U.S. PATENT DOCUMENTS

| 7,445,819 | B2* | 11/2008 | Czanta et al. | 428/1.1 |
| 7,579,053 | B2* | 8/2009 | Czanta et al. | 428/1.1 |
| 2005/0179007 | A1 | 8/2005 | Manabe et al. | |
| 2006/0124896 | A1 | 6/2006 | Klasen-Memmer et al. | |
| 2006/0278850 | A1 | 12/2006 | Czanta et al. | |

* cited by examiner

FOREIGN PATENT DOCUMENTS

EP  1 876 214 A  1/2008

OTHER PUBLICATIONS

International Search Report of PCT/EP2009/005084, Date of Completion Oct. 7, 2009, Date of Mailing Oct. 13, 2009.

*Primary Examiner* — Geraldina Visconti
(74) *Attorney, Agent, or Firm* — Millen, White, Zelano & Branigan, P.C.

(57) ABSTRACT

The invention relates to a liquid-crystalline medium containing one or more compounds of the formula I

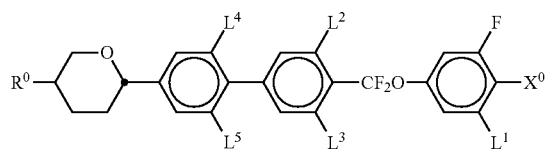

I and one or more compounds selected from the group of the compounds of the formula IA to IE

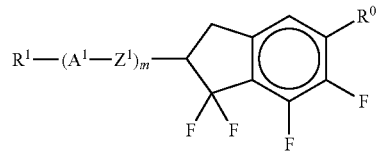

IA

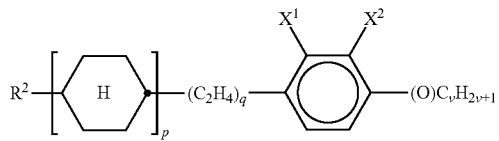

IB

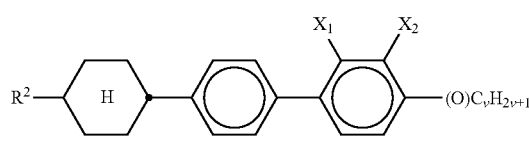

IC

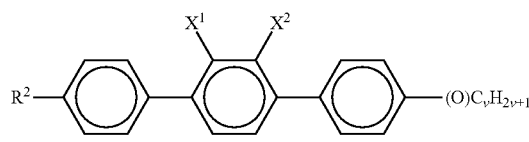

ID

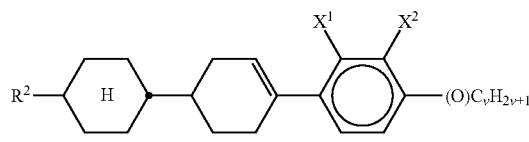

IE in which $R^0$, $R^1$, $R^2$, $X^0$, $X^1$, $X^2$, $A^1$, $Z^1$, m, p, q, v have the meanings indicated in Claim 1,
and to the use thereof in electro-optical liquid-crystal displays.

48 Claims, No Drawings

LIQUID-CRYSTALLINE MEDIUM

The present invention relates to a liquid-crystalline medium (LC medium), to the use thereof for electro-optical purposes, and to LC displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The commonest display devices are based on the Schadt-Helfrich effect and have a twisted nematic structure. In addition, there are also cells which work with an electric field parallel to the substrate and liquid-crystal plane, such as, for example, IPS ("in-plane switching") cells. TN, STN, FFS (fringe field switching) and IPS cells, in particular, are currently commercially interesting areas of application for the media according to the invention.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Examples of non-linear elements which can be used to individually switch the individual pixels are active elements (i.e. transistors). The term "active matrix" is then used, where a distinction can be made between two types:

1. MOS (metal oxide semiconductor) or other diodes on silicon wafers as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electrooptical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are backlit.

The term MLC displays here encompasses any matrix display with integrated non-linear elements, i.e., besides the active matrix, also displays with passive elements, such as varistors or diodes (MIM=metal-insulator-metal).

MLC displays of this type are particularly suitable for TV applications (for example pocket televisions) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKI-GUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diodoe Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable lifetimes. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not satisfy today's requirements.

Besides liquid-crystal displays which use backlighting, i.e. are operated transmissively and if desired transflectively, reflective liquid-crystal displays are also particularly interesting. These reflective liquid-crystal displays use the ambient light for information display. They thus consume significantly less energy than backlit liquid-crystal displays having a corresponding size and resolution. Since the TN effect is characterised by very good contrast, reflective displays of this type can even be read well in bright ambient conditions. This is already known of simple reflective TN displays, as used, for example, in watches and pocket calculators. However, the principle can also be applied to high-quality, higher-resolution active matrix-addressed displays, such as, for example, TFT displays. Here, as already in the transmissive TFT-TN displays which are generally conventional, the use of liquid crystals of low birefringence ($\Delta n$) is necessary in order to achieve low optical retardation ($d \cdot \Delta n$). This low optical retardation results in usually acceptably low viewing-angle dependence of the contrast (cf. DE 30 22 818). In reflective displays, the use of liquid crystals of low birefringence is even more important than in transmissive displays since the effective layer thickness through which the light passes is approximately twice as large in reflective displays as in transmissive displays having the same layer thickness.

For TV and video applications, displays having short response times are required. Such short response times can be achieved, in particular, if liquid-crystal media having low values for the viscosity, in particular the rotational viscosity $\gamma_1$, are used. However, diluting additives generally lower the clearing point and thus reduce the working-temperature range of the medium.

Thus, there continues to be a great demand for MLC displays having very high specific resistance at the same time as a large working-temperature range, short response times, even at low temperatures, and a low threshold voltage which do not exhibit these disadvantages or only do so to a lesser extent.

In the case of TN (Schadt-Helfrich) cells, media are desired which facilitate the following advantages in the cells:
extended nematic phase range (in particular down to low temperatures)
switchability at extremely low temperatures (outdoor use, automobiles, avionics)
increased resistance to UV radiation (longer life)
low threshold voltage.

The media available from the prior art do not enable these advantages to be achieved while simultaneously retaining the other parameters.

In the case of supertwisted (STN) cells, media are desired which facilitate greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

In particular in the case of LC displays for TV and video applications (for example LCD TVs, monitors, PDAs, notebooks, games consoles), a significant reduction in the response times is desired. A reduction in the layer thickness d ("cellap") of the LC medium in the LC cell theoretically results in faster response times, but requires LC media having higher birefringence Δn in order to ensure an adequate optical retardation (d·Δn). However, the LC materials of high birefringence known from the prior art generally also have high rotational viscosity at the same time, which in turn has an adverse effect on the response times. There is therefore a demand for LC media which simultaneously have fast response times, low rotational viscosities and high birefringence.

When a TN-TFT LC pixel is switched from "off"-state (low applied voltage) to "on"-state (higher applied voltage) the liquid crystal director re-orients from essentially planar to homeotropic orientation relative to the plane of the cell. As a consequence, the component of dielectric anisotropy in the LC mixture which is effective in the cell thickness direction (z-axis) of the panel changes from primarily $\in_\perp$ to primarily $\in_\parallel$, thereby changing the dielectric properties of the cell or pixel. This change in dielectric constants within the TFT pixels leads to undesirable effects including build up of residual DC voltage within the pixel, and consequent shift in effective V-T curve leading to the appearance of image retention. Typically, in order to reduce driving voltage a higher Δ∈ value is required in the LC mixture. This is normally achieved by increasing the amount of positive Δ∈ compounds of the mixture, leading to a potentially large increase in $\in_\parallel$ but only small change in $\in_\perp$. This effect results in LC mixtures with a higher Δ∈ value showing a larger relative change between $\in_\parallel$ and $\in_\perp$ which is responsible for the image retention, especially surface type image sticking.

It has now been found that the problem of image sticking can be eliminated or significantly reduced by addition of a small amount of LC compounds having negative dielectric anisotropy into TN TFT mixtures.

This object can be achieved by using negative Δ∈ compounds of the formula IA, IB, IC, ID and/or IE into TN-TFT mixtures which contain at least one compound of the formula I.

The invention relates to a liquid-crystalline medium, characterised in that it contains one or more compounds of the formula I

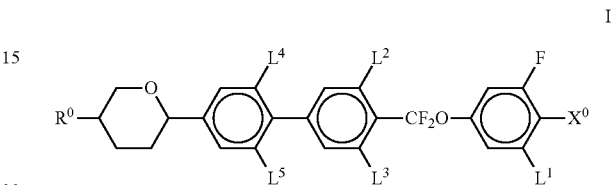

and at least one compound selected from the group of the compounds of the formulae IA to IE

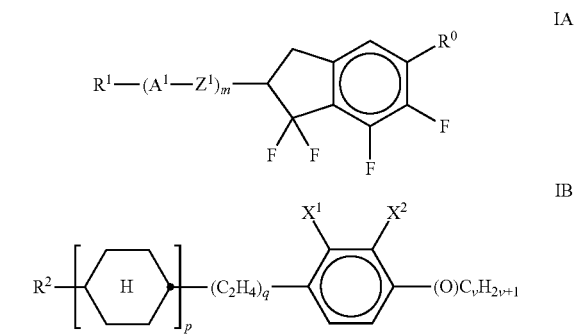

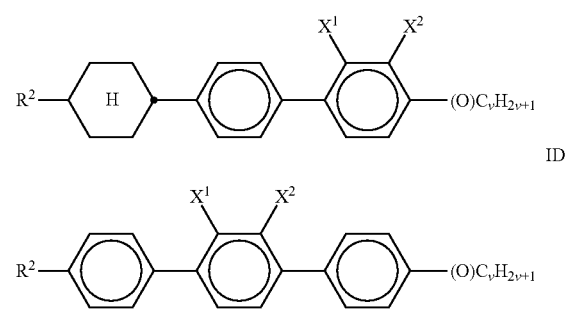

in which
$X^0$ denotes F, Cl, CN, SF$_5$, SCN, NCS, a halogenated alkyl radical, a halogenated alkenyl radical, a halogenated alkoxy radical or a halogenated alkenyloxy radical having up to 6 C atoms,
$L^1$ to $L^5$ each, independently of one another, denote H or F,
$R^1$ and $R^2$ each, independently of one another, denote an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

—C≡C—, —$CF_2$O—, —O$CF_2$— —OC—O— or —O—CO— in such a way that O atoms are not linked directly to one another, $R^0$ denotes H, an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

—C≡C—, —$CF_2$O—, —O$CF_2$— —OC—O— or —O—CO— in such a way that O atoms are not linked directly to one another, $Z^1$ denotes —CO—O—, —O—CO—, —$CF_2$O—, —O$CF_2$—, —$CH_2$O—, —O$CH_2$—, —$CH_2CH_2$—, —$(CH_2)_4$—, —$C_2F_4$—, —$CH_2CF_2$—, —$CF_2CH_2$—, —CF=CF—, —CH=CF—, —CF=CH—, —CH=CH—, —C≡C— or a single bond, $A^1$ a) denotes a 1,4-cyclohexenylene or 1,4-cyclohexylene radical, in which one or two non-adjacent $CH_2$ groups may be replaced by —O— or —S—, b) denotes a 1,4-phenylene radical, in which one or two CH groups may be replaced by N, or c) denotes a radical from the group consisting of piperidine-1,4-diyl-, 1,4-bicyclo[2.2.2]octylene-, naphthalene-2,6-diyl, decahydronaphthalene-2,6-diyl, 1,2,3,4-tetrahydro-naphthalene-2,6-diyl, phenanthrene-2,7-diyl and fluorene-2,7-diyl, where the radicals a), b) and c) may be mono- or polysubstituted by halogen atoms, m denotes 0, 1 or 2,
p denotes 1 or 2,
q denotes 0 or 1,
v denotes 1 to 6,
$X^1$ and $X^2$ each, independently of one another, denote F, Cl, $CHF_2$, $CF_3$, $OCHF_2$ or $OCF_3$, preferably $X^1$ and $X^2$ are each F.

In the case that the mixture according to the present invention contains two or more compounds of the formulae IB to IE the definitions for $R^2$, $X^1$, $X^2$, q and v can be the same or different.

LC media containing compounds of the formula I and at least one compound of the formulae IA to IE show low rotational viscosities $\gamma_1$ as well as fast response times, a low threshold voltages, high clearing points, high positive dielectric anisotropy, a broad nematic phase range and show no or reduced image sticking problems.

The compounds of the formula I and IA to IE have a broad range of applications. Depending on the choice of substituents, they can serve as base materials of which liquid-crystalline media are predominantly composed; however, liquid-crystalline base materials from other classes of compounds can also be added to the compounds of the formulae I and IA to IE in order, for example, to modify the dielectric and/or optical anisotropy of a dielectric of this type and/or to optimise its threshold voltage and/or its viscosity.

The media according to the present invention are highly suitable for MLC, TN, STN, FFS or IPS displays of this type, which have the desired properties indicated above and do not exhibit the disadvantages mentioned above or only do so to a lesser extent. The media according to the present invention are highly suitable for TN-TFT applications, especially for notebook applications.

The compounds of the formula I are known for example from the GB 22 29 438 B.

Preferred compounds of the formula I are the compounds of the formulae I-1 to I-48,

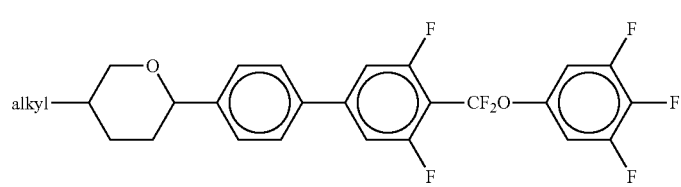

I-1

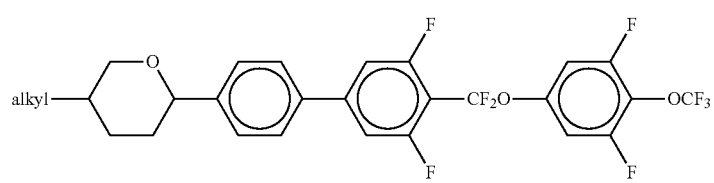

I-2

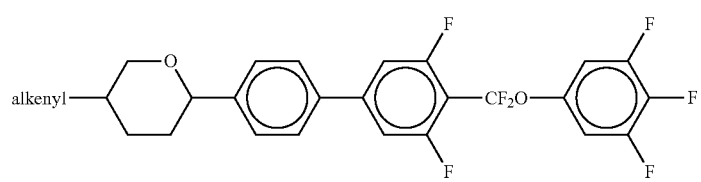

I-3

-continued
I-4
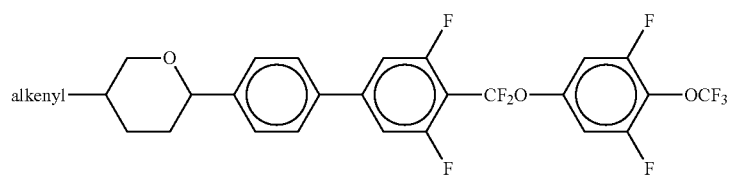
I-5
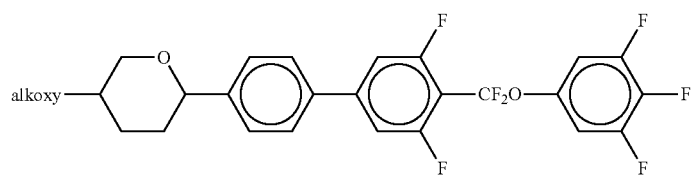
I-6
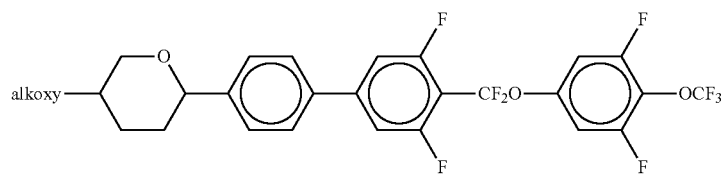
I-7
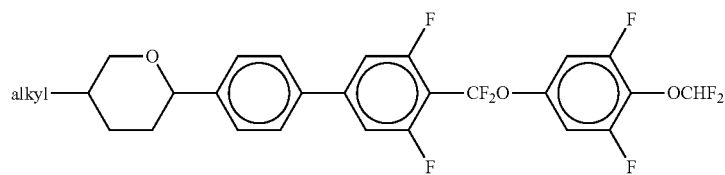
I-8
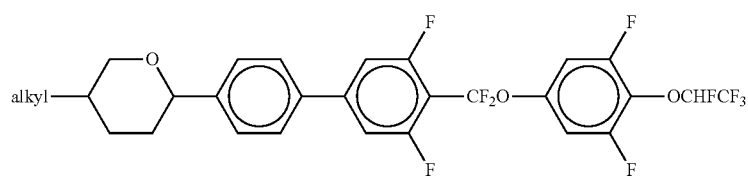
I-9
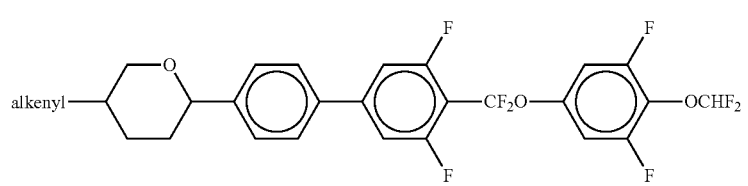
I-10
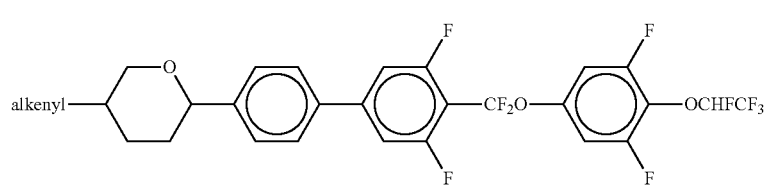
I-11
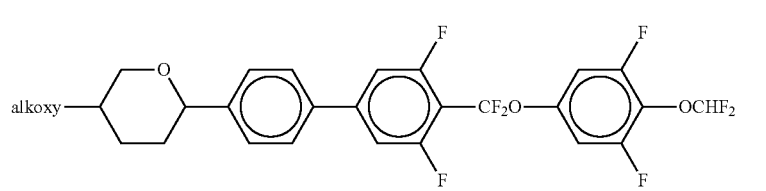
I-12
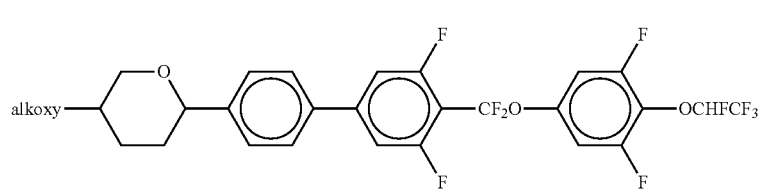

-continued
I-13
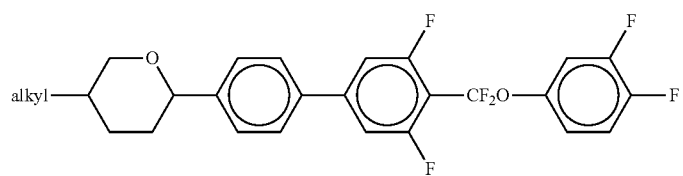
I-14
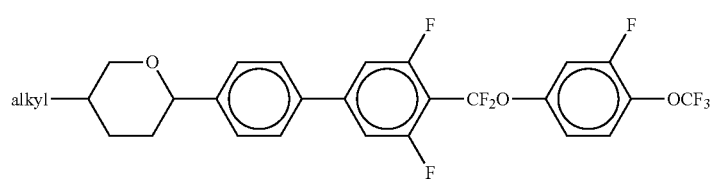
I-15
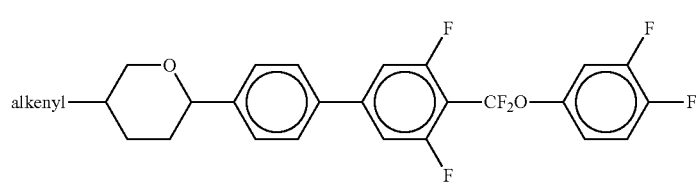
I-16
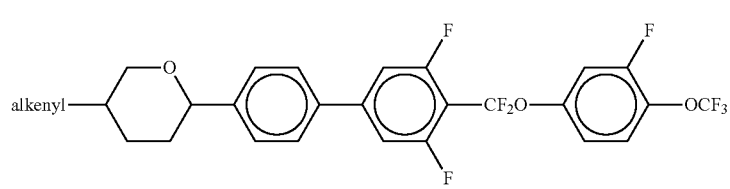
I-17
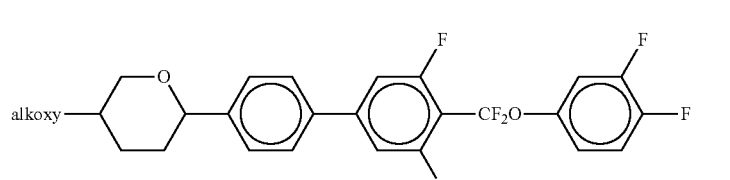
I-18
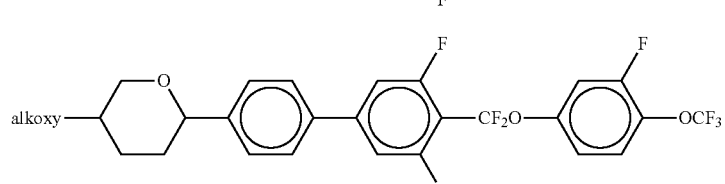
I-19
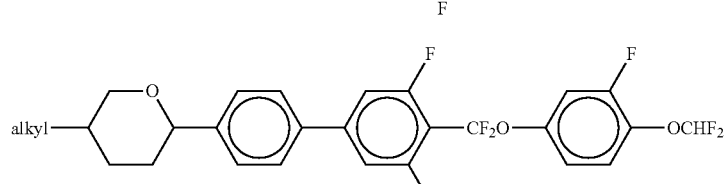
I-20
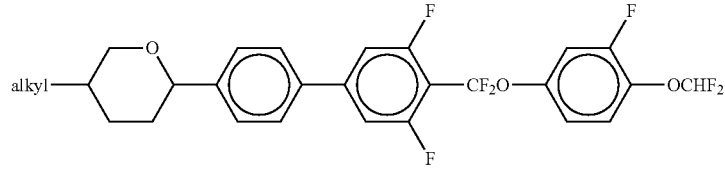
I-21
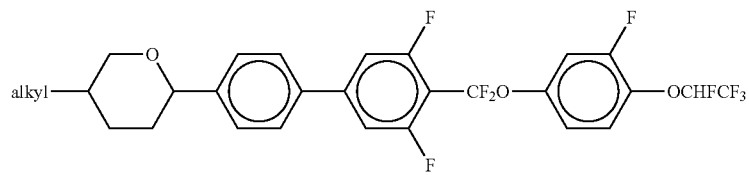

-continued
I-22
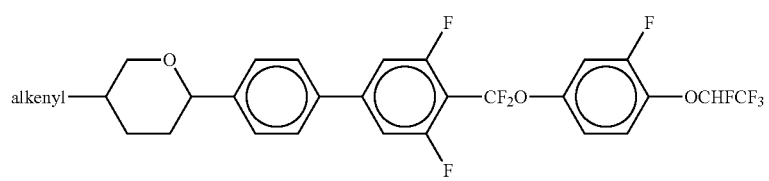
I-23
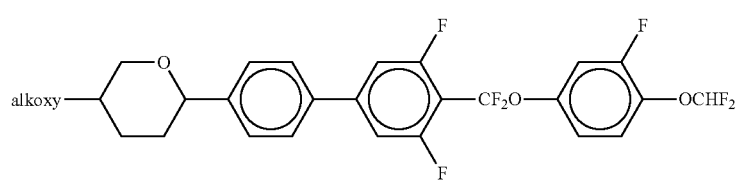
I-24
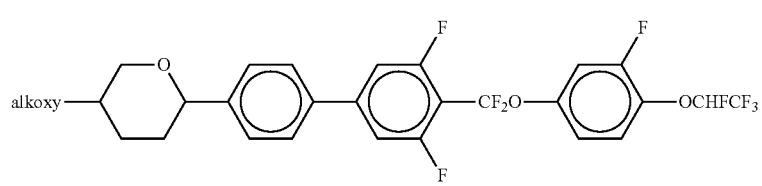
I-25
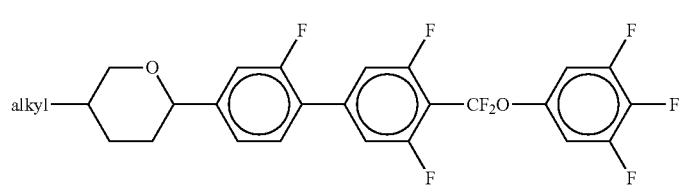
I-26
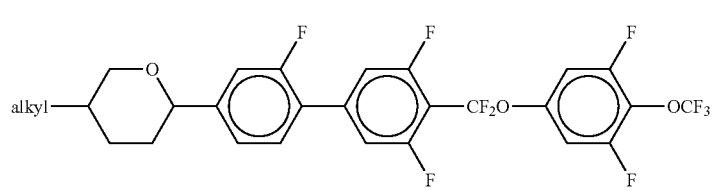
I-27
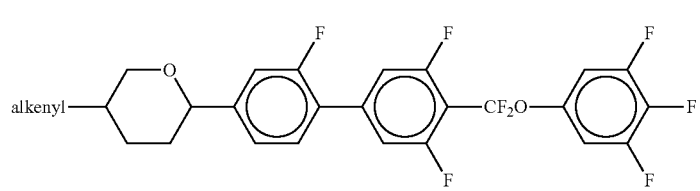
I-28
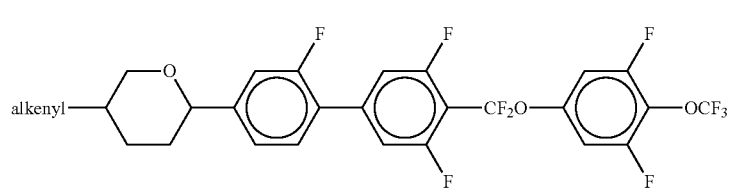
I-29
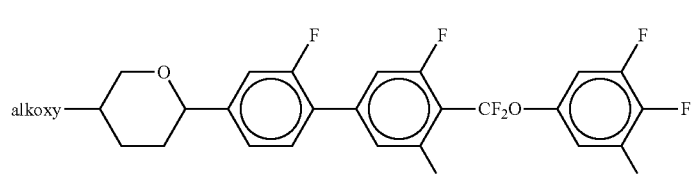
I-30
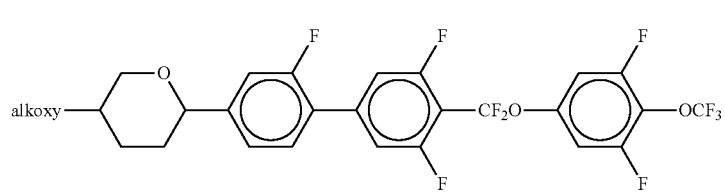

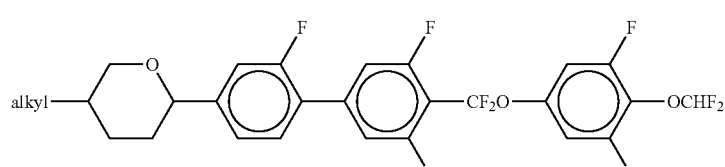
I-31
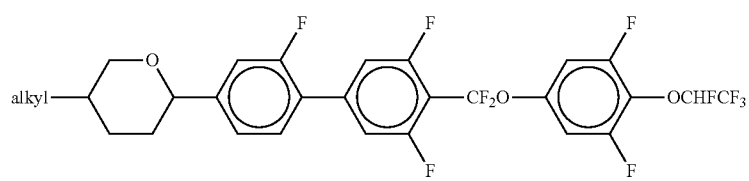
I-32
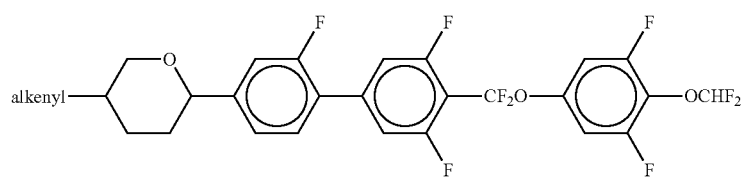
I-33
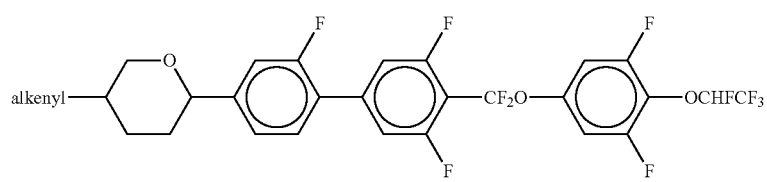
I-34
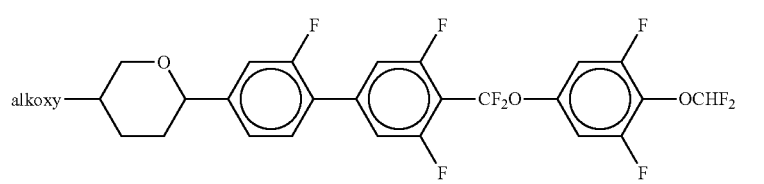
I-35
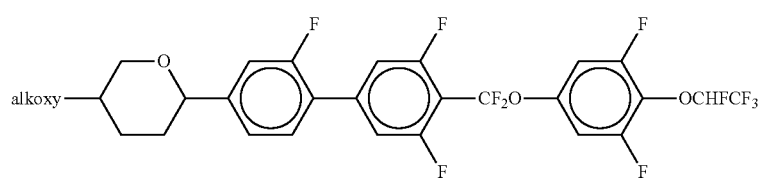
I-36
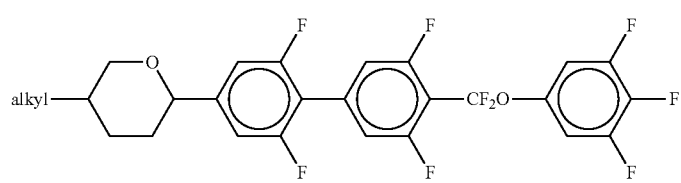
I-37
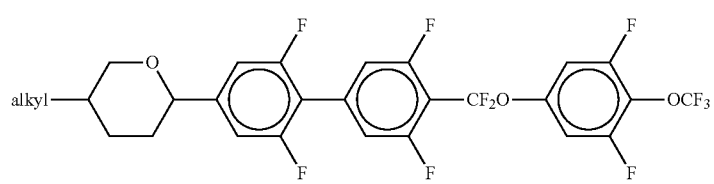
I-38
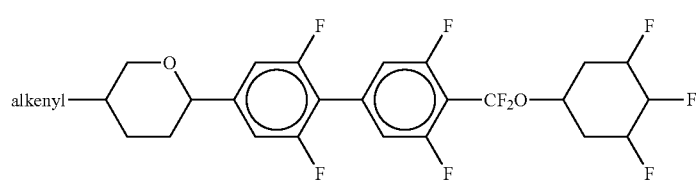
I-39

-continued
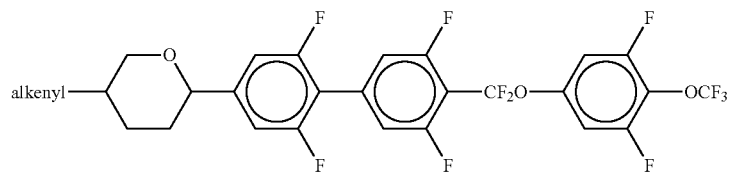
I-40
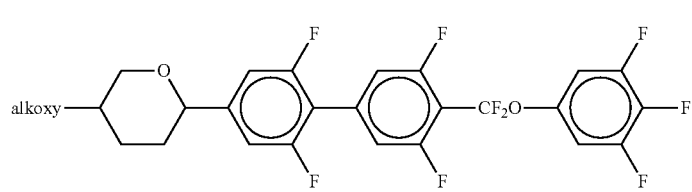
I-41
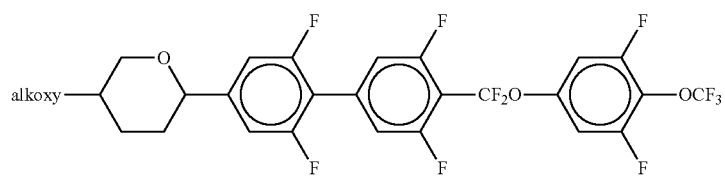
I-42
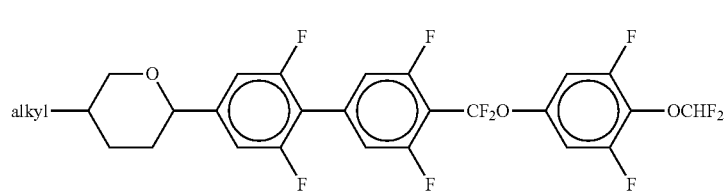
I-43
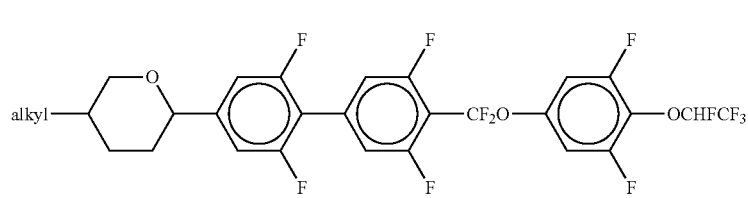
I-44
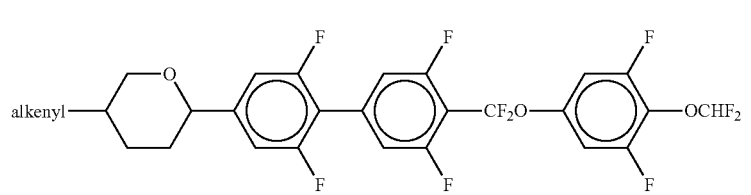
I-45
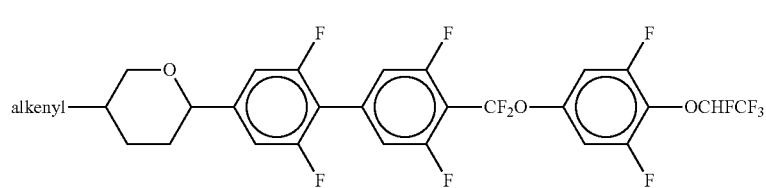
I-46
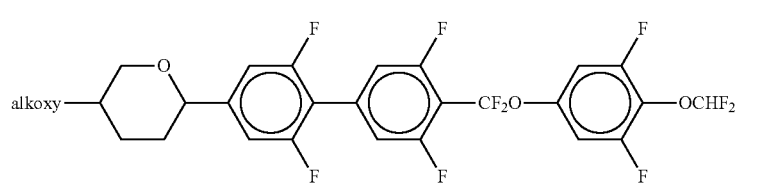
I-47

I-48

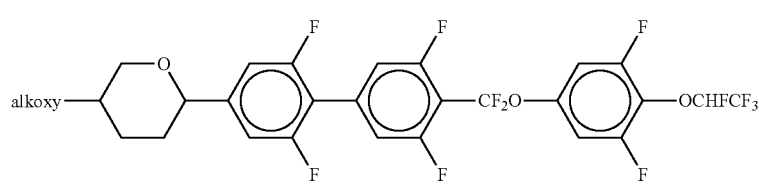

in which alkyl is a straight-chain alkyl radical with 1-7 C atoms,
alkoxy is a straight-chain alkoxy radical with 1-7 C atoms,
alkenyl is a straight-chain alkenyl radical with 2-7 C atoms.

Especially preferred compounds are the compounds of the formula I-1 and I-2.

In the pure state, the compounds of the formula I and IA to IE are colourless and form liquid-crystalline mesophases in a temperature range which is favourably located for electro-optical use. They are stable chemically, thermally and to light.

The compounds of the formulae I and IA to IE are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se, which are not mentioned here in greater detail.

If $R^0$, $R^1$ and $R^2$ each independently from one another in the formulae above and below denote an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl preferably denotes straight-chain 2-oxapropyl (=methoxymethyl), 2- (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

If $R^0$, $R^1$ and $R^2$ each independently from one another denote an alkyl radical in which one $CH_2$ group has been replaced by —CH=CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl. These radicals may also be mono- or polysubstituted.

If $R^0$, $R^1$ and $R^2$ each independently from one another, denote an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

$R^1$ and $R^2$, each independently from one another denote preferably a straight chain alkyl radical with 1 to 6 carbon atoms. Preferably $R^0$ denotes H.

In the formula I $X^0$ is preferably F, Cl, CN, NCS, $CF_3$, $SF_5$, $CF_2H$, $OCF_3$, $OCF_2H$, $OCFHCF_3$, $OCFHCFH_2$, $OCFHCF_2H$, $OCF_2CH_3$, $OCF_2CFH_2$, $OCF_2CF_2H$, $OCF_2CF_2CF_2H$, $OCF_2CF_2CFH_2$, $OCFHCF_2CF_3$, $OCFHCF_2CF_2H$, $OCFHCFHCF_3$, $OCH_2CF_2CF_3$, $OCF_2CF_2CF_3$, $OCF_2CFHCFH_2$, $OCF_2CH_2CF_2H$, $OCFHCF_2CFH_2$, $OCFHCFHCF_2H$, $OCFHCH_2CF_3$, $OCH_2CFHCF_3$, $OCH_2CF_2CF_2H$, $OCF_2CFHCH_3$, $OCF_2CH_2CFH_2$, $OCFHCF_2CH_3$, $OCFHCFHCFH_2$, $OCFHCH_2CF_3$, $OCH_2CF_2CFH_2$, $OCH_2CFHCF_2H$, $OCF_2CH_2CH_3$, $OCFHCFHCH_3$, $OCFHCH_2CFH_2$, $OCH_2CF_2CH_3$, $OCH_2CFHCFH_2$, $OCH_2CH_2CF_2H$, $OCHCH_2CH_3$, $OCH_2CFHCH_3$, $OCH_2CH_2CF_2H$, $OCClFCF_3$, $OCClFCClF_2$, $OCClFCFH_2$, $OCFHCCl_2F$, $OCClFCF_2H$, $OCClFCClF_2$, $OCF_2CClH_2$, $OCF_2CCl_2H$, $OCF_2CCl_2F$, $OCF_2CClFH$, $OCF_2CClF_2$, $OCF_2CF_2CClF_2$, $OCF_2CF_2CCl_2F$, $OCClFCF_2CF_3$, $OCClFCF_2CF_2H$, $OCClFCF_2CClF_2$, $OCClFCFHCF_3$, $OCClFCClFCF_3$, $OCCl_2CF_2CF_3$, $OCClHCF_2CF_3$, $OCClFCF_2CF_3$, $OCClFCClFCF_3$, $OCF_2CClFCFH_2$, $OCF_2CF_2CCl_2F$, $OCF_2CCl_2CF_2H$, $OCF_2CH_2CClF_2$, $OCClFCF_2CFH_2$, $OCFHCF_2CCl_2F$, $OCClFCFHCF_2H$, $OCClFCClFCF_2H$, $OCFHCFHCClF_2$, $OCClFCH_2CF_3$, $OCFHCCl_2CF_3$, $OCCl_2CFHCF_3$, $OCH_2CClFCF_3$, $OCCl_2CF_2CF_2H$, $OCH_2CF_2CClF_2$, $OCF_2CClFCH_3$, $OCF_2CFHCCl_2H$, $OCF_2CCl_2CFH_2$, $OCF_2CH_2CCl_2F$, $OCClFCF_2CH_3$, $OCFHCF_2CCl_2H$, $OCClFCClFCFH_2$, $OCFHCFHCCl_2F$, $OCClFCH_2CF_3$, $OCFHCCl_2CF_3$, $OCCl_2CF_2CFH_2$, $OCH_2CF_2CCl_2F$, $OCCl_2CFHCF_2H$, $OCClHCClFCF_2H$, $OCF_2CClHCClH_2$, $OCF_2CH_2CCl_2H$, $OCClFCFHCF_3$, $OCF_2CClFCCl_2H$, $OCClFCH_2CFH_2$, $OCFHCCl_2CFH_2$, $OCCl_2CF_2CH_3$, $OCH_2CF_2CClH_2$, $OCCl_2CFHCFH_2$, $OCH_2CClFCFCl_2$, $OCH_2CH_2CF_2H$, $OCClHCClHCF_2H$, $OCH_2CCl_2CF_2H$, $OCClFCH_2CH_3$, $OCFHCH_2CCl_2H$, $OCClHCFHCClH_2$, $OCH_2CFHCCl_2H$, $OCCl_2CH_2CF_2H$, $OCH_2CCl_2CF_2H$, CH=$CF_2$, CF=$CF_2$, OCH=$CF_2$, OCF=$CF_2$, CH=CHF, OCH=CHF, CF=CHF, OCF=CHF, especially F, Cl, CN, NCS, $CF_3$, $SF_5$, $CF_2H$, $OCF_3$, $OCF_2H$, $OCFHCF_3$, $C_2F_5$, $C_3F_7$, $OCFHCFH_2$, $OCFHCF_2H$, $OCF_2CH_3$, $OCF_2CFH_2$, $OCF_2CF_2H$, $OCF_2CF_2CF_2H$, $OCF_2CF_2CFH_2$, $OCFHCF_2CF_3$, $OCFHCF_2CF_2H$, $OCF_2CF_2CF_3$ or $OCF_2CHFCF_3$.

Particular preference is given to compounds of the formula I in which $X^0$ denotes F or $OCF_3$. Further preferred compounds of the formula I are those in which $R^0$ denotes straight-chain alkyl or alkoxy having 1 to 8 C atoms or straight-chain alkenyl or alkenyloxy having 2 to 7 C atoms.

Preferred compounds of the formula IA are selected from the sub-formulae IA-1 to IA-18,

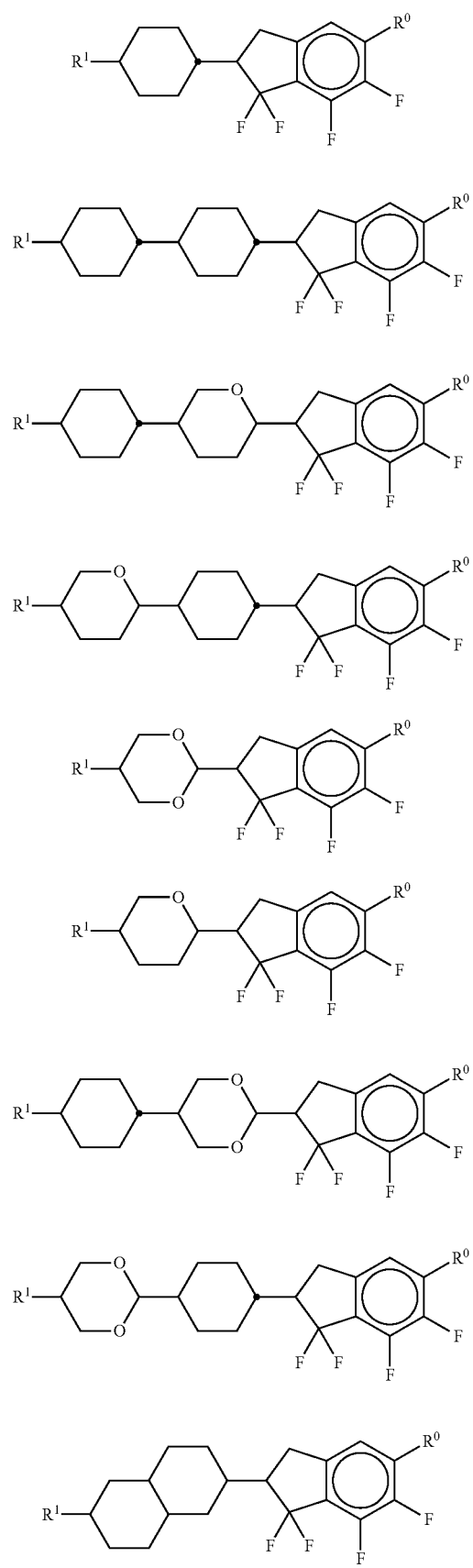
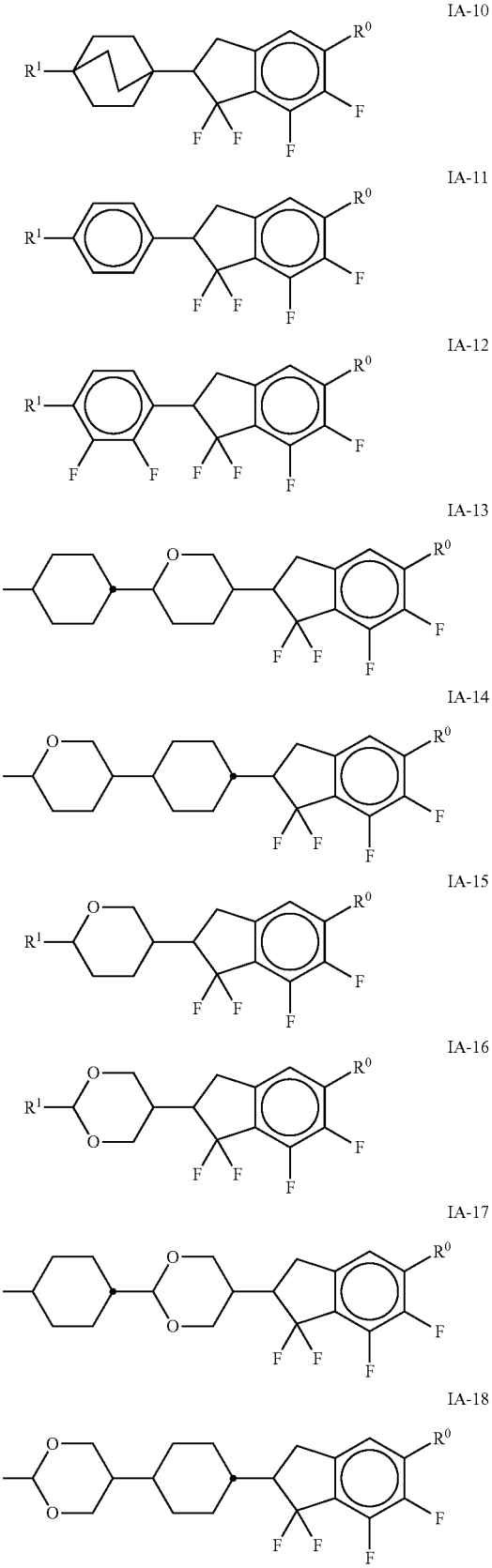
in which R⁰ and R¹ have the meaning as given in claim 1.

Preferably $R^1$ is a straight-chain alkyl radical; especially preferred $R^1$ is $C_2H_5$, n-$C_3H_7$, n-$C_5H_{11}$. $R^0$ is a straight-chain alkyl radical, preferably $R^0$ denotes H, $CH_3$, $C_2H_5$ or n-$C_3H_7$.

Particularly preferred media contain one or more compounds selected from the group containing the compounds of the formulae IA-1a
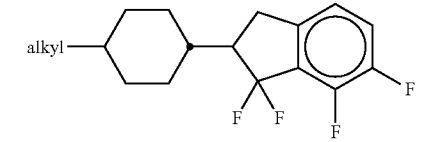

IA-1b
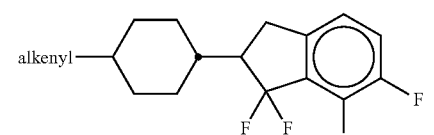

IA-1c
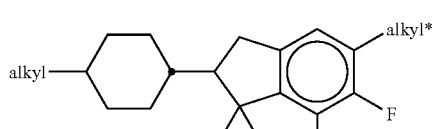

IA-1d
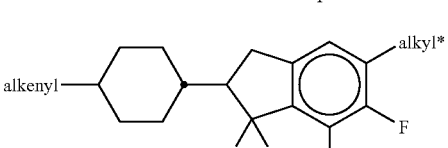

IA-2a
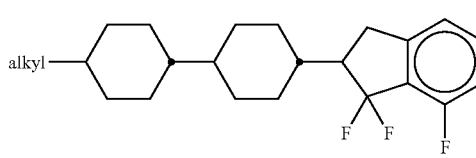

IA-2b
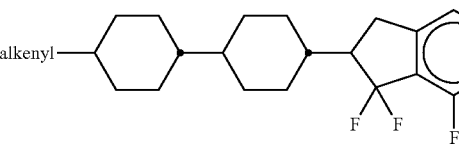

IA-6a
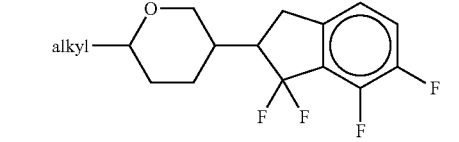

IA-6b
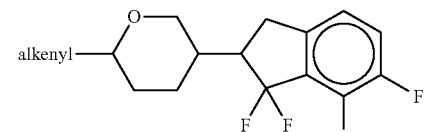

Particular preference is given to media which contain at least one compound of the formula IA-1a and/or IA-6a. Especially preferred mixtures contain one, two or three compounds of the formula IA-1a.

Preferred compounds of the formula IB are selected from the sub-formulae IB-1 to IB-24

IB-1
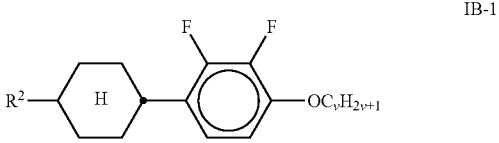

IB-2
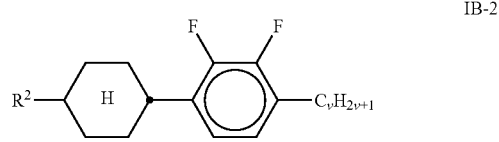

IB-3
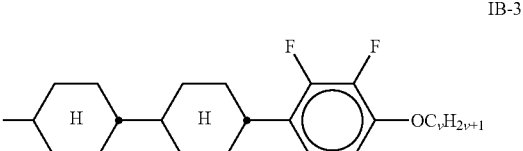

IB-4
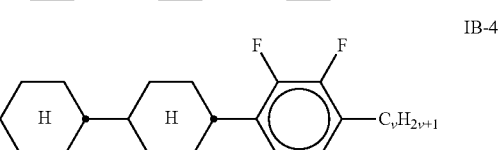

IB-5
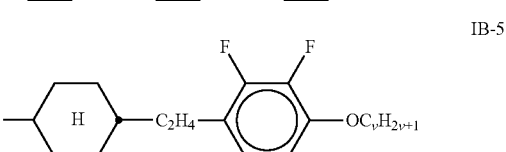

IB-6
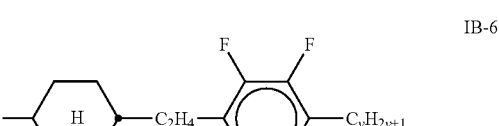

IB-7
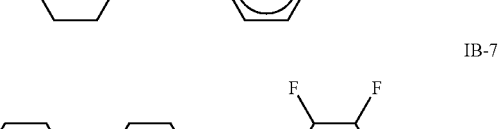

IB-8
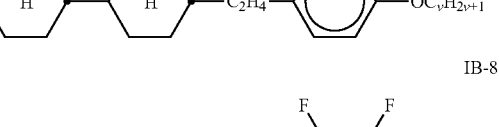

IB-9
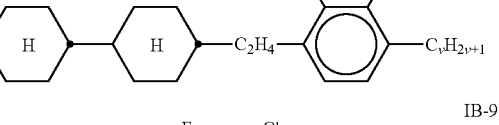

IB-10
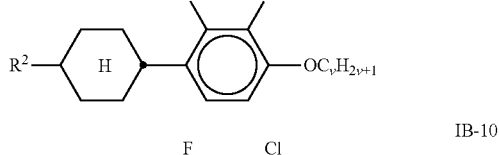

IB-11
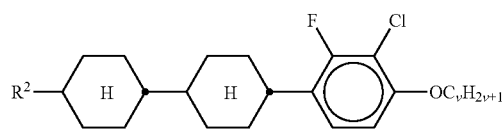

IB-12
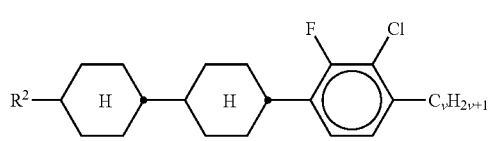

IB-13
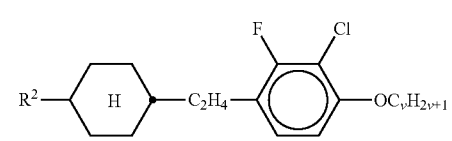

IB-14
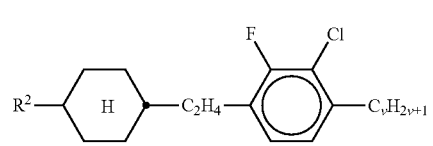

IB-15
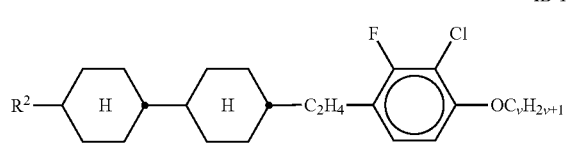

IB-16
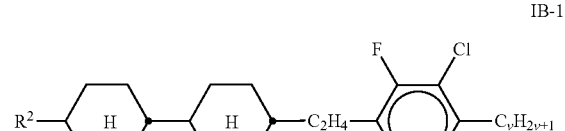

IB-17
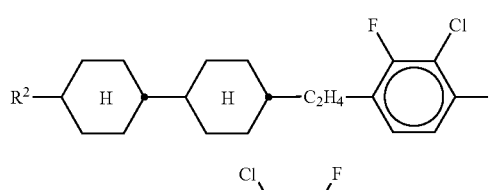

IB-18
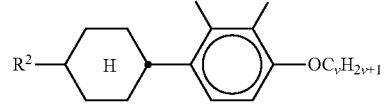

IB-19
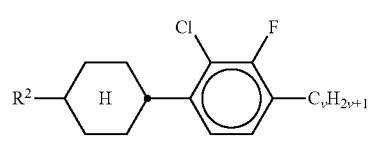

IB-20
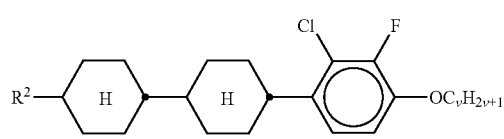

IB-21
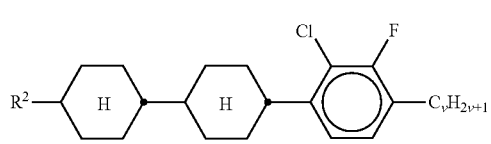

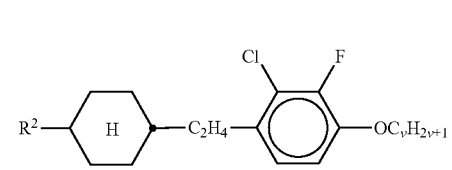

IB-22
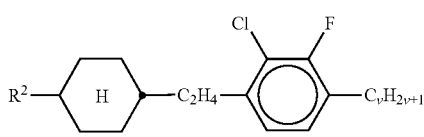

IB-23
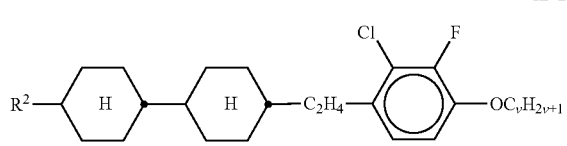

IB-24
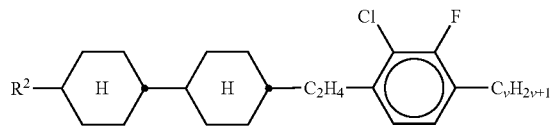

wherein $R^2$ has the meaning of $R^1$. Preferably $R^2$ is a straight-chained alkyl group having 1 to 6 carbon atoms or an alkenyl group having 2 to 6 carbon atoms, preferably vinyl, $CH=CHCH_3$, $CH_2CH_2CH=CH_2$, $CH_2CH_2CH=CHCH_3$. Especially preferred are the compounds of the formulae IB-1, IB-2, IB-3, IB-4, IB-5 and IB-6.

In the compounds of the formula IB $X^1$ and $X^2$ preferably are both F.

Preferred compounds of the formula IC are selected from the sub-formulae IC-1 to IC-4

IC-1
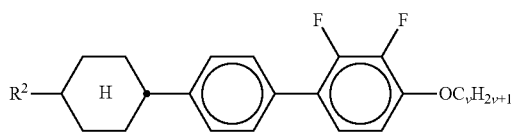

IC-2
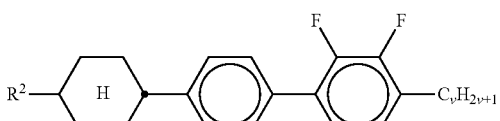

IC-3
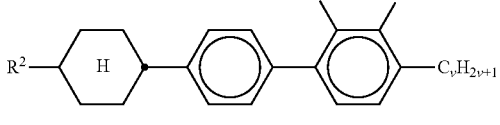

IC-4
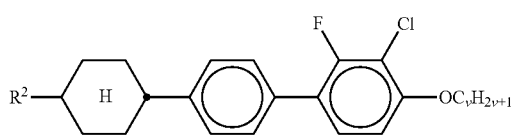

wherein $R^2$ has the meaning of $R^1$. Preferably $R^2$ is a straight-chained alkyl group having 1 to 6 carbon atoms or an alkenyl group having 2 to 6 carbon atoms, preferably vinyl, $CH=CHCH_3$, $CH_2CH_2CH=CH_2$, $CH_2CH_2CH=CHCH_3$. Especially preferred are the compounds of the formula IC-1 and IC-2.

Preferred compounds of the formula ID are selected from the sub-formulae ID-1 to ID-6

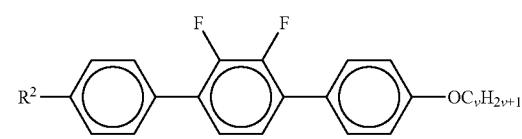
ID-1

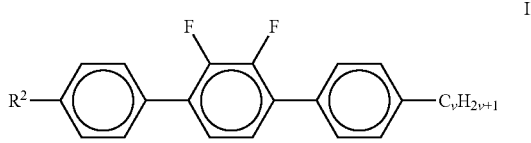
ID-2

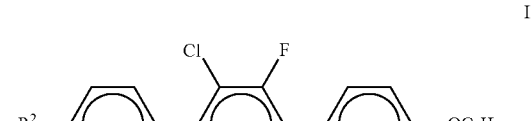
ID-3

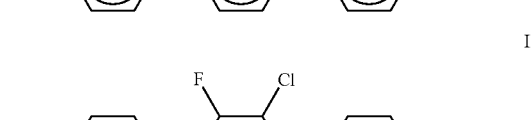
ID-4

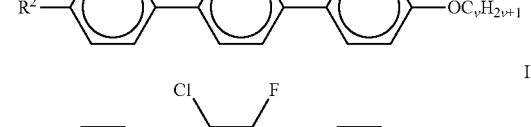
ID-5

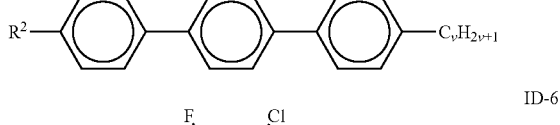
ID-6 wherein $R^2$ has the meaning of $R^1$. Preferably $R^2$ is a straight-chained alkyl group having 1 to 6 carbon atoms or an alkenyl group having 2 to 6 carbon atoms, preferably vinyl, $CH\!=\!CHCH_3$, $CH_2CH_2CH\!=\!CH_2$, $CH_2CH_2CH\!=\!CHCH_3$. Especially preferred are the compounds of the formula ID-1 and ID-2.

Preferred compounds of the formula IE are selected from the sub-formulae IE-1 to IE-6

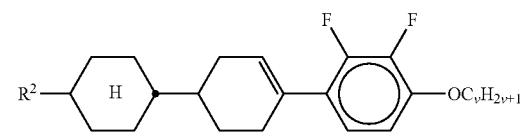
IE-1

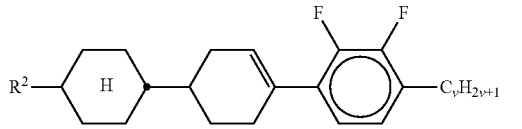
IE-2

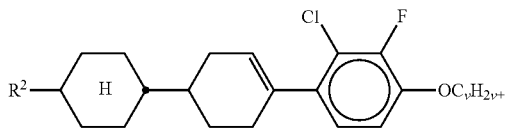
IE-3

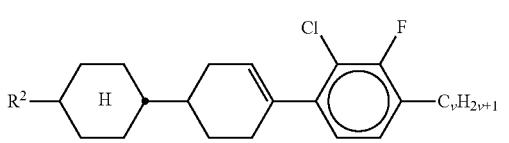
IE-4

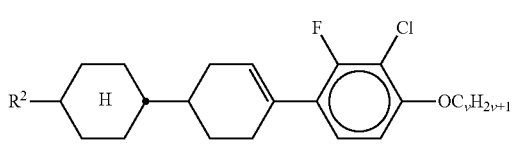
IE-5

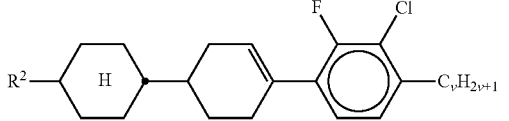
IE-6 wherein $R^2$ has the meaning of $R^1$. Preferably $R^2$ is a straight-chained alkyl group having 1 to 6 carbon atoms or an alkenyl group having 2 to 6 carbon atoms, preferably vinyl, $CH\!=\!CHCH_3$, $CH_2CH_2CH\!=\!CH_2$, $CH_2CH_2CH\!=\!CHCH_3$. Especially preferred are the compounds of the formulae IE-1 and IE-2.

In the compounds of the formula IE $X^1$ and $X^2$ preferably are both F.

Further preferred embodiments are indicated below:

The medium additionally comprises one or more compounds of the formulae II and/or III

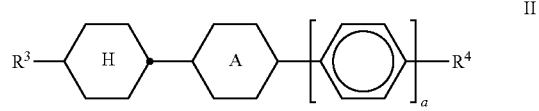
II

III in which

A denotes 1,4-phenylene or trans-1,4-cyclohexylene, a is 0 or 1, and $R^3$ denotes alkenyl having 2 to 9 C atoms, and $R^4$ has the meaning indicated for $R^0$ in formula I and preferably denotes alkyl having 1 to 12 C atoms or alkenyl having 2 to 9 C atoms.

The compounds of the formula II are preferably selected from the following formulae

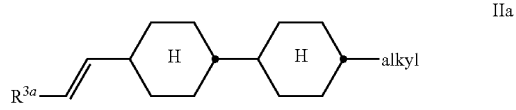
IIa

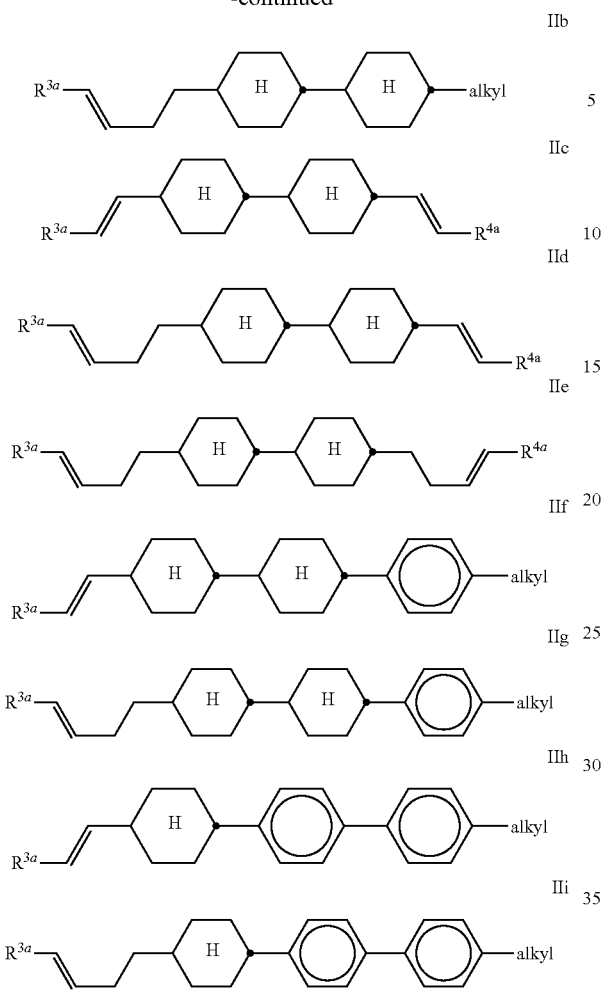

in which $R^{3a}$ and $R^{4a}$ each, independently of one another, denote H, CH$_3$, C$_2$H$_5$ or C$_3$H$_7$, and "alkyl" denotes a straight-chain alkyl group having 1 to 8 C atoms. Particular preference is given to compounds of the formulae IIa and IIf, in particular in which $R^{3a}$ denotes H or CH$_3$, and compounds of the formula IIc, in particular in which $R^{3a}$ and $R^{4a}$ denote H, CH$_3$ or C$_2$H$_5$.

The compounds of the formula III are preferably selected from the following formulae

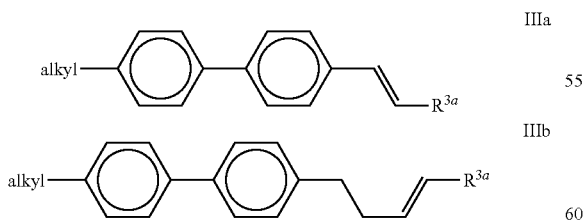

in which "alkyl" and $R^{3a}$ have the meanings indicated above, and $R^{3a}$ preferably denotes H or CH$_3$. Particular preference is given to compounds of the formula IIIb;

The medium additionally comprises one or more compounds selected from the following formulae IV to VIII

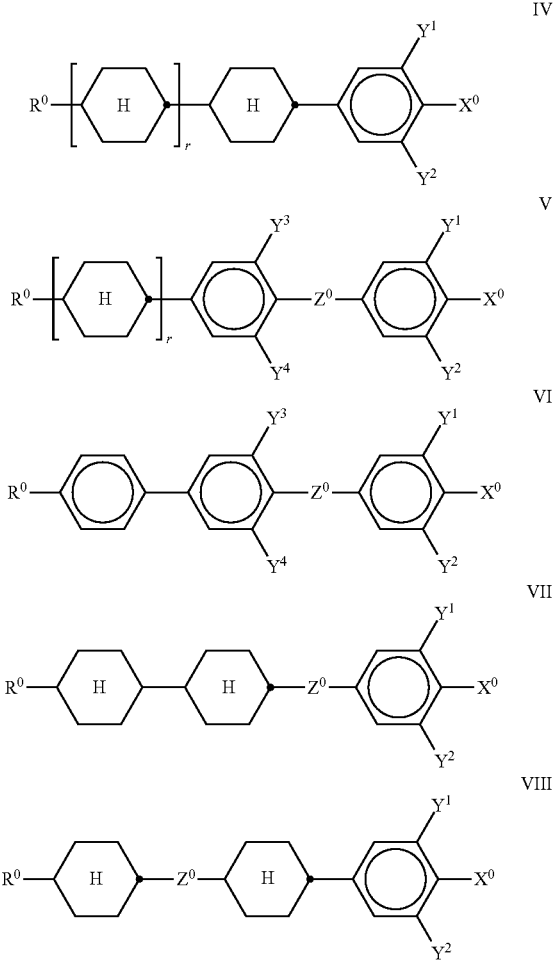

in which
$R^0$ and $X^0$ have the meanings indicated in formula I, and
$Y^{1-4}$ each, independently of one another, denote H or F,
$Z^0$ denotes —C$_2$H$_4$—, —(CH$_2$)$_4$—, —CH=CH—, —CF=CF—, —C$_2$F$_4$—, —CH$_2$CF$_2$—, —CF$_2$CH$_2$—, —CH$_2$O—, —OCH$_2$—, —COO—, —CF$_2$O— or —OCF$_2$—, in formulae V and VI also a single bond, and
r denotes 0 or 1.

The compounds of the formula IV are preferably selected from the following formulae

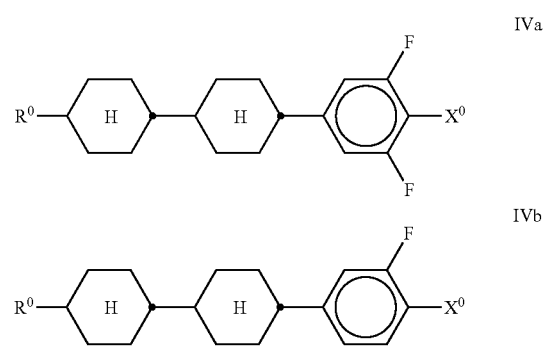

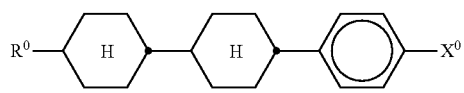

IVc

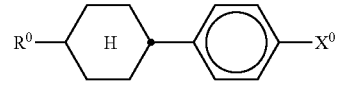

IVd

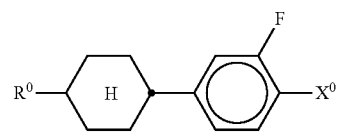

IVe

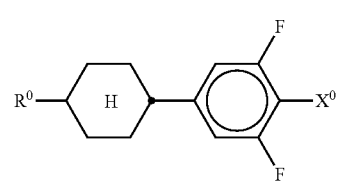

IVf in which $R^0$ and $X^0$ have the meanings indicated above. In formula IV, $R^0$ preferably denotes alkyl having 1 to 8 C atoms, and $X^0$ preferably denotes F, Cl, OCHF$_2$ or OCF$_3$;

The compounds of the formula V are preferably selected from the following formulae:

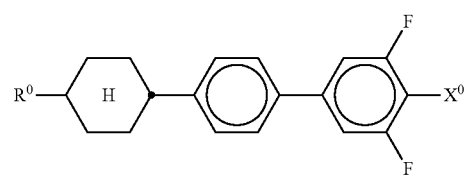

Va

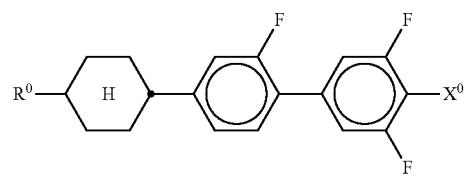

Vb

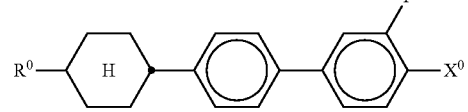

Vc

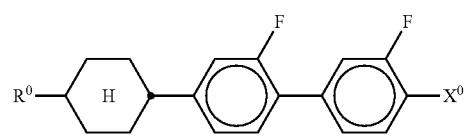

Vd

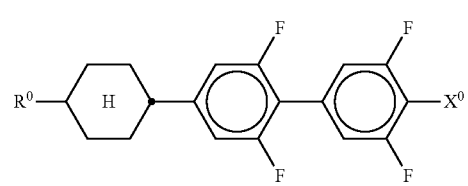

Ve

Vf

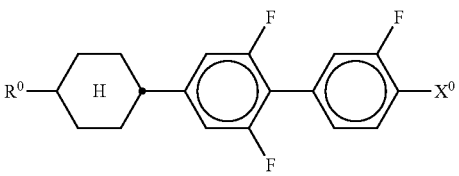

Vg in which $R^0$ and $X^0$ have the meanings indicated above. In formula V, $R^0$ preferably denotes alkyl having 1 to 8 C atoms, and $X^0$ preferably denotes F, furthermore OCF$_3$ or OCH=CF$_2$.

The medium comprises one or more compounds of the formula VI-1

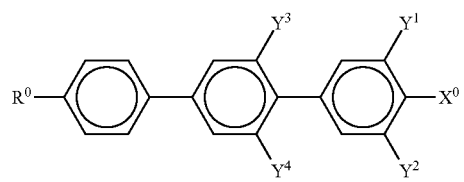

VI-1 particularly preferably those selected from the following formulae

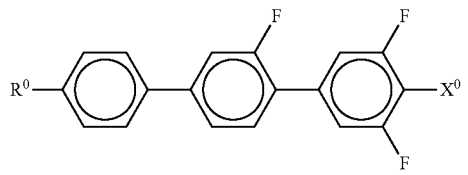

VI-1a

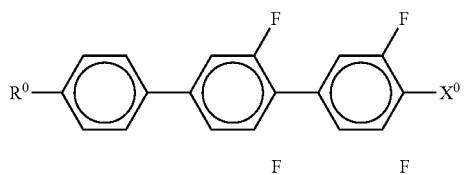

VI-1b

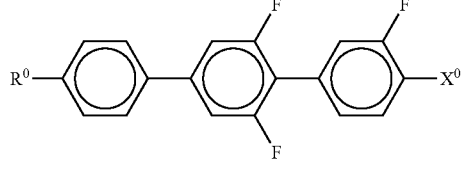

VI-1c

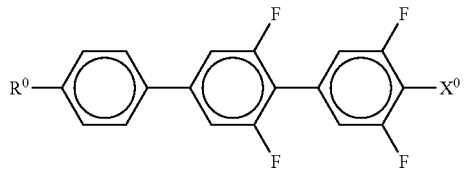

VI-1d in which $R^0$ and $X^0$ have the meanings indicated above. In formula VI, $R^0$ preferably denotes alkyl having 1 to 8 C atoms, and $X^0$ preferably denotes F, furthermore OCF$_3$.

The medium comprises one or more compounds of the formula VI-2

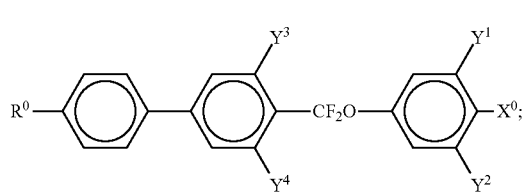
VI-2 particularly preferably those selected from the following formulae:

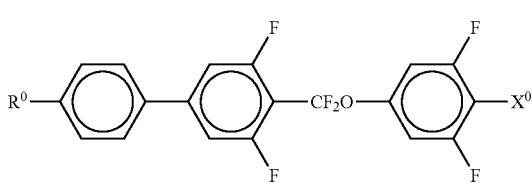
VI-2a

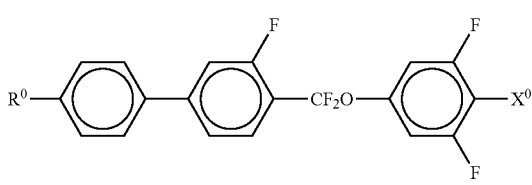
VI-2b

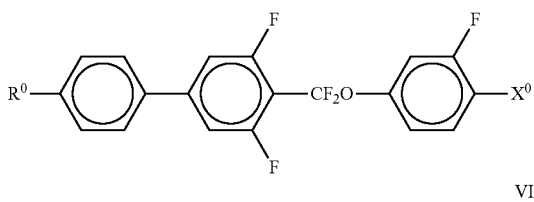
VI-2c

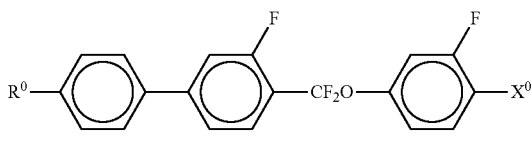
VI-2d in which $R^0$ and $X^0$ have the meanings indicated above. In formula VI, $R^0$ preferably denotes alkyl having 1 to 8 C atoms, and $X^0$ preferably denotes F;

The medium preferably comprises one or more compounds of the formula VII in which $Z^0$ denotes —CF$_2$O—, —CH$_2$CH$_2$ or —COO—, particularly preferably those selected from the following formulae:

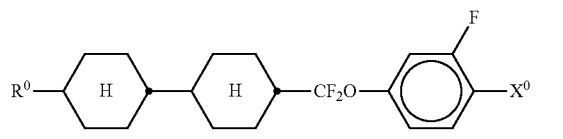
VII-1a

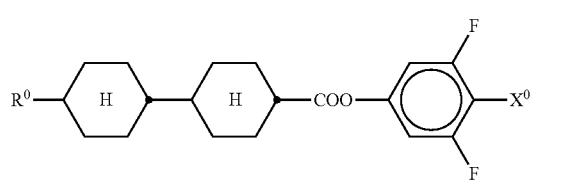
VII-1b

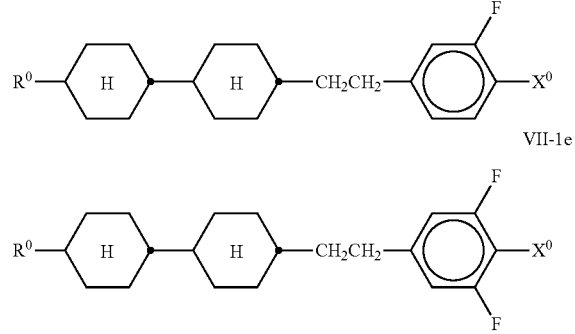
VII-1c

VII-1d

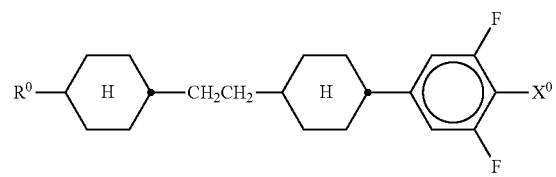
VII-1e

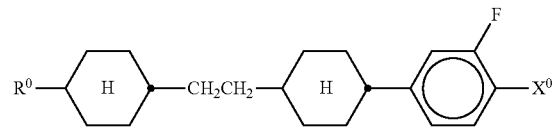

in which $R^0$ and $X^0$ have the meanings indicated above. In formula VII, $R^0$ preferably denotes alkyl having 1 to 8 C atoms, and $X^0$ preferably denotes F, furthermore OCF$_3$.

The compounds of the formula VIII are preferably selected from the following formulae:

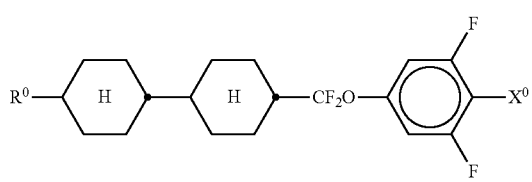
VIIIa

VIIIb

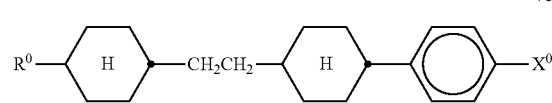
VIIIc

-continued

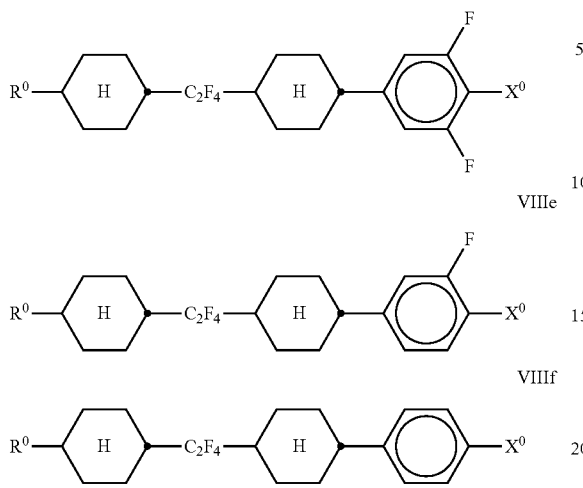

in which $R^0$ and $X^0$ have the meanings indicated above. $R^0$ preferably denotes a straight-chain alkyl radical having 1 to 8 C atoms. $X^0$ preferably denotes F.

The medium additionally comprises one or more compounds of the following formula:

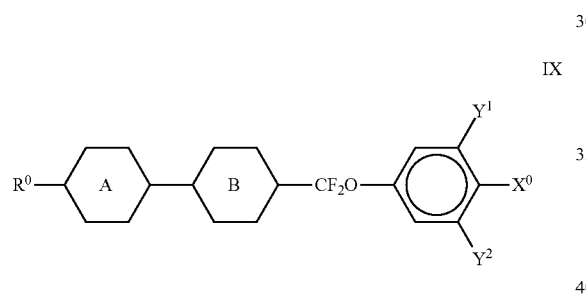

in which $R^0$, $X^0$, $Y^1$ and $Y^2$ have the meaning indicated above, and

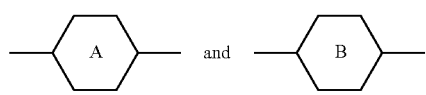

each, independently of one another denote

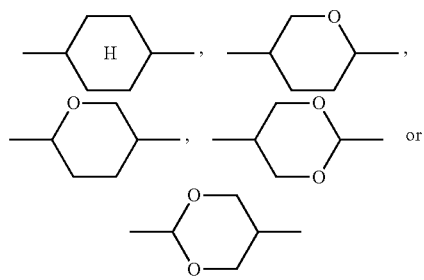

where rings A and B do not both simultaneously denote cyclo-hexylene;

The compounds of the formula IX are preferably selected from the following formulae:

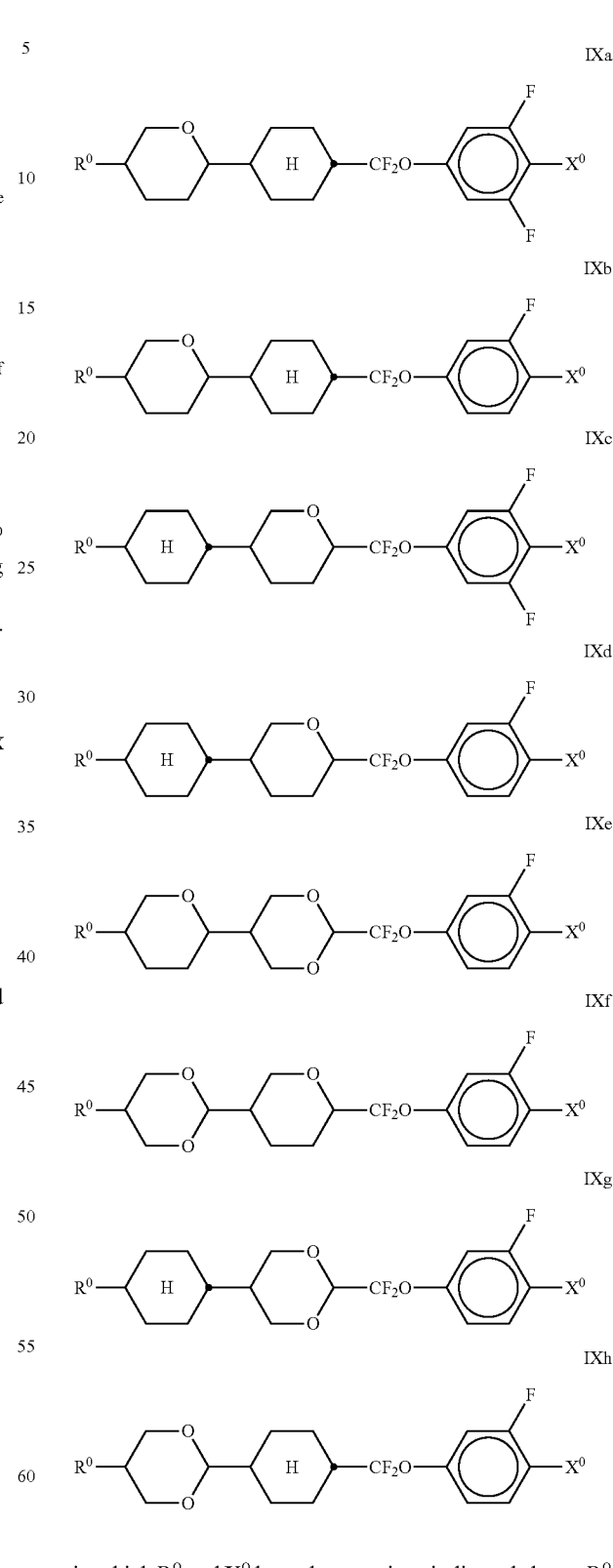

in which $R^0$ and $X^0$ have the meanings indicated above. $R^0$ preferably denotes alkyl having 1 to 8 C atoms, and $X^0$ preferably denotes F. Particular preference is given to compounds of the formula IXa;

The compounds of the formulae X and XI are preferably selected from the following formulae:

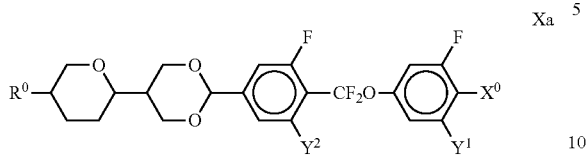

Xa in which $R^0$ and $X^0$ have the meanings indicated above. $R^0$ preferably denotes alkyl having 1 to 8 C atoms, and $X^0$ preferably denotes F. Particularly preferred compounds are those in which $Y^1$ denotes F and $Y^2$ denotes H or F, preferably F;

The medium additionally comprises one or more compounds of the following formula:

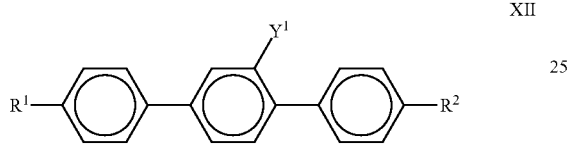

XII in which $R^1$ and $R^2$ each, independently of one another, denote n-alkyl, alkoxy, oxaalkyl, fluoroalkyl or alkenyl, each having up to 9 C atoms, and preferably each, independently of one another, denote alkyl having 1 to 8 C atoms. $Y^1$ denotes H or F.

Preferred compounds of the formula XII are the compounds of the formulae

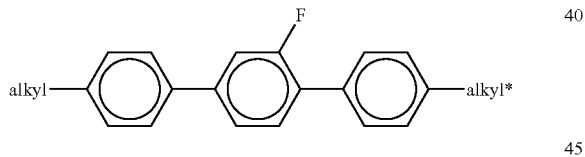

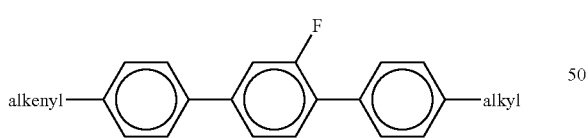

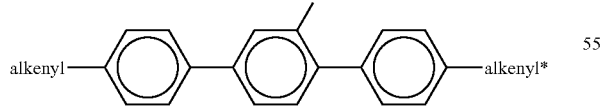

in which alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

The medium additionally comprises one or more compounds selected from the following formulae:

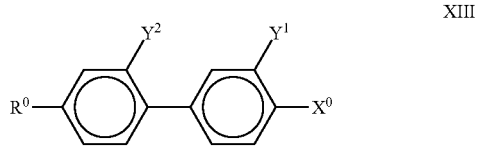

XIII

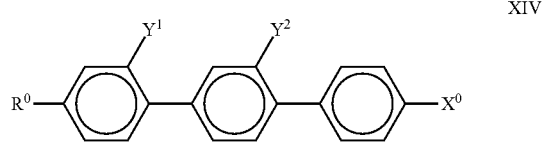

XIV

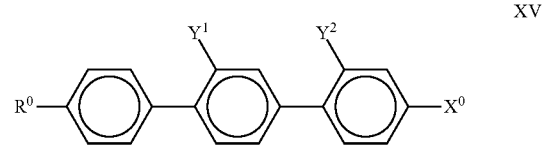

XV

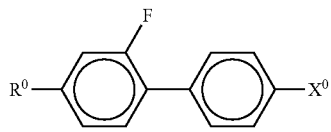

XVI in which $R^0$, $X^0$, $Y^1$ and $Y^2$ have the meanings indicated above. $R^0$ preferably denotes alkyl having 1 to 8 C atoms, and $X^0$ preferably denotes F or Cl;

The compounds of the formulae XIII and XIV are preferably selected from the following formulae:

XIIIa

XIVa

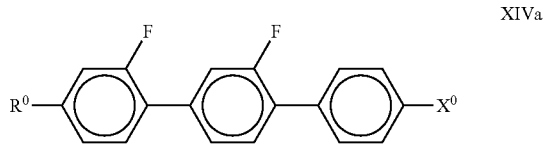

XVa

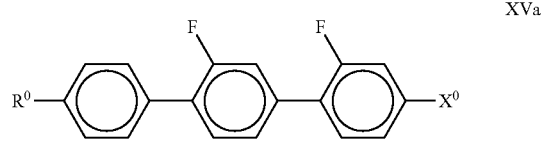

in which $R^0$ and $X^0$ have the meanings indicated above. $R^0$ preferably denotes alkyl having 1 to 8 C atoms. In the compounds of the formula XIII, $X^0$ preferably denotes F or Cl.

The medium additionally comprises one or more compounds of the following formulae:

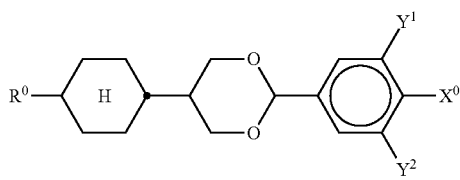
D1

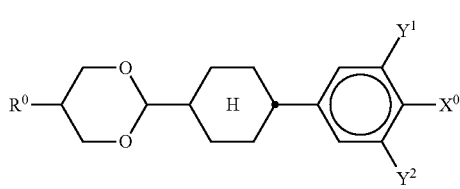
D2

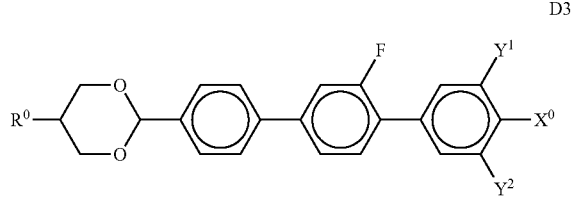
D3 in which $Y^1$, $Y^2$, $R^0$ and $X^0$ have the meaning indicated above. $R^0$ preferably denotes alkyl having 1 to 8 C atoms, and $X^0$ preferably denotes F. Particular preference is given to compounds of the formulae

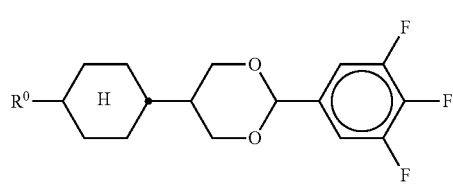
D1-1

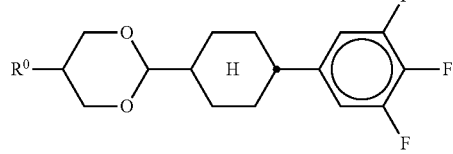
D2-1

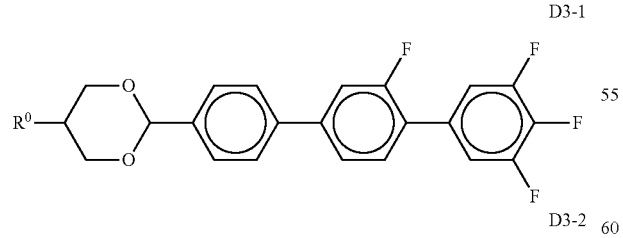
D3-1

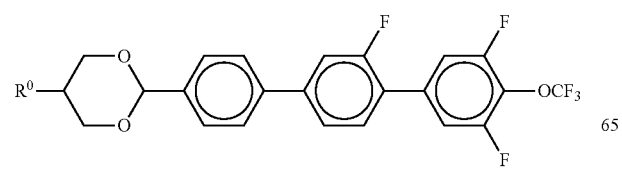
D3-2 in which $R^0$ has the meanings indicated above and preferably denotes straight-chain alkyl having 1 to 6 C atoms, in particular $C_2H_5$, n-$C_3H_7$ or n-$C_5H_{11}$.

The medium additionally comprises one or more compounds of the following formula

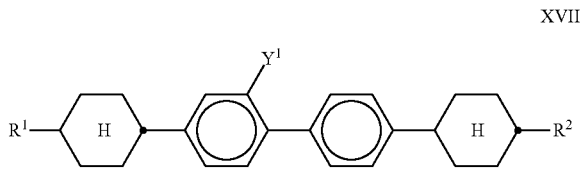
XVII in which $Y^1$, $R^1$ and $R^2$ have the meaning indicated above. $R^1$ and $R^2$ preferably each, independently of one another, denote alkyl having 1 to 8 C atoms;

The medium additionally comprises one or more compounds of the following formula:

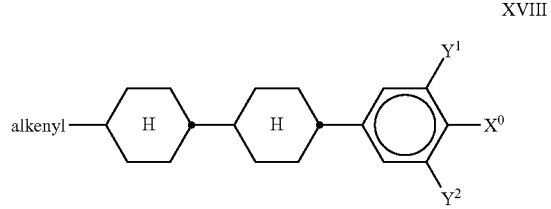
XVIII in which $X^0$, $Y^1$ and $Y^2$ have the meanings indicated above, and "alkenyl" denotes $C_{2-7}$-alkenyl. Particular preference is given to compounds of the following formula

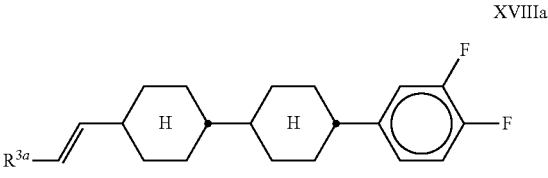
XVIIIa in which $R^{3a}$ has the meaning indicated above and preferably denotes H;

The medium additionally comprises one or more compounds selected from the following formulae

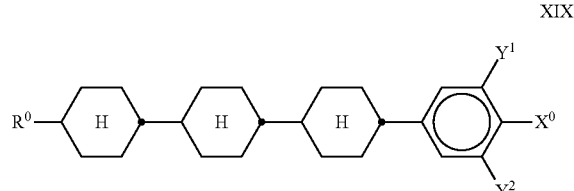
XIX

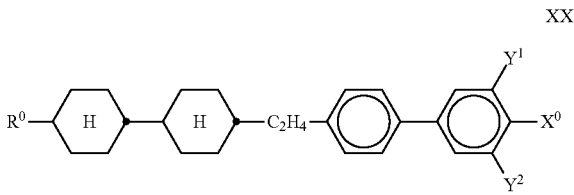
XX

-continued

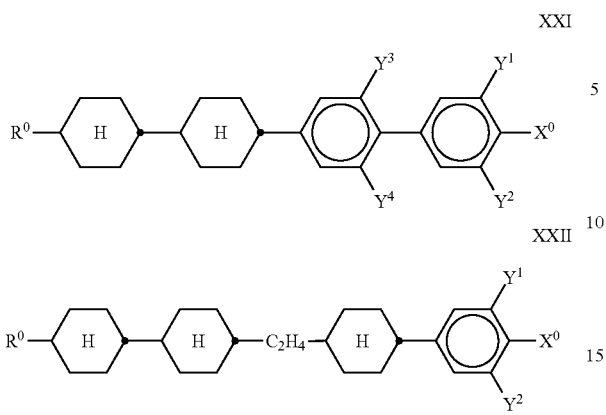

in which $Y^{1-4}$, $R^0$ and $X^0$ each, independently of one another, have one of the meanings indicated above. $X^0$ is preferably F, Cl, $CF_3$, $OCF_3$ or $OCHF_2$. $R^0$ preferably denotes alkyl, alkoxy, oxaalkyl, fluoro-alkyl or alkenyl, each having up to 8 C atoms.

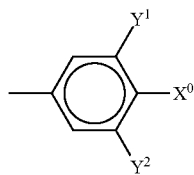

is preferably

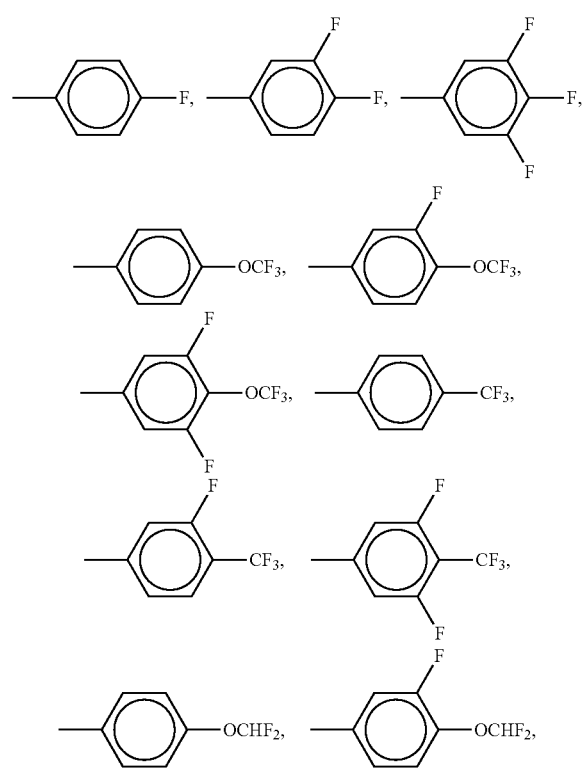

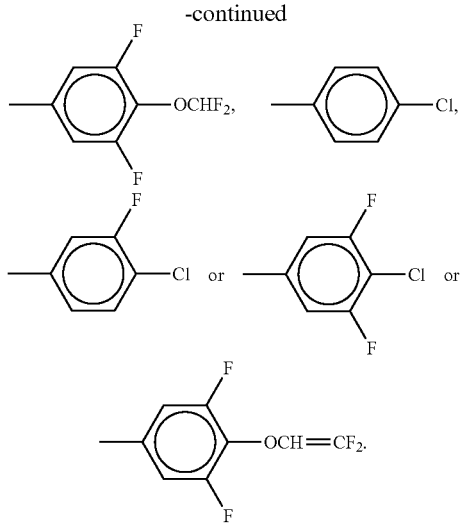

$R^0$ is preferably straight-chain alkyl or alkenyl having 2 to 7 C atoms;

$X^0$ is preferably F, furthermore $OCF_3$, Cl or $CF_3$;

The medium preferably comprises one, two or three compounds of the formula I;

The medium comprises compounds selected from the formulae I, II, III, V, VI-1, VI-2, XII, XIII, XIV and XVI;

The medium preferably comprises one or more compounds of the formula VI-1;

The medium preferably comprises one or more compounds of the formula VI-2;

The medium preferably comprises 1-25% by weight, preferably 1-20% by weight, particularly preferably 2-15% by weight, of compounds of the formula I based on the total mixture.

The medium preferably comprises 2-30% by weight, preferably 5-20% by weight, particularly preferably 2-15% by weight, of compounds of the formula IA, IB, IC, ID and/or IE based on the total mixture.

The proportion of compounds of the formulae II-XXII in the mixture as a whole is preferably 20 to 97% by weight;

The medium preferably comprises 25-80% by weight, particularly preferably 30-70% by weight, of compounds of the formulae II and/or III;

The medium preferably comprises 5-40% by weight, particularly preferably 10-30% by weight, of compounds of the formula V;

The medium preferably comprises 3-30% by weight, particularly preferably 6-25% by weight, of compounds of the formula VI-1;

The medium preferably comprises 2-30% by weight, particularly preferably 4-25% by weight, of compounds of the formula VI-2;

The medium comprises 5-40% by weight, particularly preferably 10-30% by weight, of compounds of the formula XII;

The medium preferably comprises 1-25% by weight, particularly preferably 2-15% by weight, of compounds of the formula XIII;

The medium preferably comprises 5-45% by weight, particularly preferably 10-35% by weight, of compounds of the formula XIV;

The medium preferably comprises 1-20% by weight, particularly preferably 2-15% by weight, of compounds of the formula XVI.

It has been found that besides the compounds of the formulae IA-IE, even a relatively small proportion of compounds of the formula I mixed with conventional neutral and/or positive $\Delta\epsilon$ liquid-crystal materials, but in particular with one or more compounds of the formulae II to XXII, results in a significant increase in the light stability and in low birefringence values, with broad nematic phases with low smectic-nematic transition temperatures being observed at the same time, improving the shelf life. At the same time, the mixtures exhibit very low threshold voltages and very good values for the VHR on exposure to UV.

The term "alkyl" or "alkyl*" in this application encompasses straight-chain and branched alkyl groups having 1-7 carbon atoms, in particular the straight-chain groups methyl, ethyl, propyl, butyl, pentyl, hexyl and heptyl. Groups having 1-6 carbon atoms are generally preferred.

The term "alkenyl" or "alkenyl*" in this application encompasses straight-chain and branched alkenyl groups having 2-7 carbon atoms, in particular the straight-chain groups. Preferred alkenyl groups are $C_2$-$C_7$-1E-alkenyl, $C_4$-$C_7$-3-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" in this application preferably encompasses straight-chain groups having at least one fluorine atom, preferably a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxy" in this application preferably encompasses straight-chain radicals of the formula $C_nH_{2n+1}$—O—$(CH_2)_m$, in which n and m each, independently of one another, denote 1 to 6. m may also denote 0. Preferably, n=1 and m=1-6 or m=0 and n=1-3.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}$/$k_{11}$ compared with alkyl and alkoxy radicals. The mixtures according to the invention are distinguished, in particular, by high $K_1$ values and thus have significantly faster response times than the mixtures from the prior art.

The term "neutral compounds" denotes mesogenic compounds having a·$\Delta\epsilon$-value of −1.5 to +1.5.

The term "positive compounds" denotes mesogenic compounds having a·$\Delta\epsilon$-value of >+1.5.

The term "negative compounds" denotes mesogenic compounds having a·$\Delta\epsilon$-value of <−1.5.

The optimum mixing ratio of the compounds of the above-mentioned formulae depends substantially on the desired properties, on the choice of the components of the above-mentioned formulae and on the choice of any further components that may be present.

Suitable mixing ratios within the range indicated above can easily be determined from case to case.

The total amount of compounds of the above-mentioned formulae in the mixtures according to the invention is not crucial. The mixtures can therefore comprise one or more further components for the purposes of optimisation of various properties. However, the observed effect on the desired improvement in the properties of the mixture is generally greater, the higher the total concentration of compounds of the above-mentioned formulae.

In a particularly preferred embodiment, the media according to the invention comprise compounds of the formulae IV to VIII in which $X^0$ denotes F, $OCF_3$, $OCHF_2$, $OCH=CF_2$, $OCF=CF_2$ or $OCF_2$—$CF_2H$. A favourable synergistic action with the compounds of the formula I results in particularly advantageous properties. In particular, mixtures comprising compounds of the formulae I, V and VI are distinguished by their low threshold voltages.

The individual compounds of the above-mentioned formulae and the sub-formulae thereof which can be used in the media according to the invention are either known or can be prepared analogously to the known compounds.

The invention also relates to electro-optical displays, such as, for example, TN, STN, FFS, OCB, IPS, FFS or MLC displays, having two plane-parallel outer plates, which, together with a frame, form a cell, integrated non-linear elements for switching individual pixels on the outer plates, and a nematic liquid-crystal mixture having positive dielectric anisotropy and high specific resistance located in the cell, which contain media of this type, and to the use of these media for electro-optical purposes.

The liquid-crystal mixtures according to the invention enable a significant broadening of the available parameter latitude. The achievable combinations of clearing point, viscosity at low temperature, thermal and UV stability and high optical anisotropy are far superior to previous materials from the prior art.

The mixtures according to the invention are particularly suitable for mobile applications and high-Δn TFT applications, such as, for example, PDAs, notebooks, LCD TVs and monitors.

The liquid-crystal mixtures according to the invention, while retaining the nematic phase down to −20° C. and preferably down to −30° C., particularly preferably down to −40° C., and the clearing point ≥70° C., preferably ≥75° C., at the same time allow rotational viscosities $\gamma_1$ of ≤90 mPa·s, particularly preferably ≤70 mPa·s, to be achieved, enabling excellent MLC displays having fast response times to be achieved.

The dielectric anisotropy $\Delta\epsilon$ of the liquid-crystal mixtures according to the invention is preferably ≥+3, particularly preferably ≥+4. In addition, the mixtures are characterised by low operating voltages. The threshold voltage of the liquid-crystal mixtures according to the invention is preferably ≤2.0 V. The birefringence Δn of the liquid-crystal mixtures according to the invention is preferably ≥0.11, particularly preferably ≥0.12.

The nematic phase range of the liquid-crystal mixtures according to the invention preferably has a width of at least 90°, in particular at least 100°. This range preferably extends at least from −25° C. to +70° C.

It goes without saying that, through a suitable choice of the components of the mixtures according to the invention, it is also possible for higher clearing points (for example above 100° C.) to be achieved at higher threshold voltages or lower clearing points to be achieved at lower threshold voltages with retention of the other advantageous properties. At viscosities correspondingly increased only slightly, it is likewise possible to obtain mixtures having a higher $\Delta\epsilon$ and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German patent 30 22 818), lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR on UV exposure than analogous mixtures comprising cyano-phenylcyclohexanes of the formula

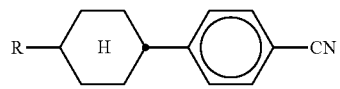

or esters of formula

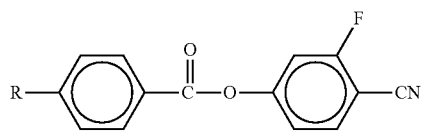

instead of the compounds of the formula I.

The light stability and UV stability of the mixtures according to the invention are considerably better, i.e. they exhibit a significantly smaller decrease in the HR on exposure to light or UV. Even low concentrations of the compounds (<10% by weight) of the formula I in the mixtures increase the HR by 6% or more compared with mixtures from the prior art.

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se, for example by mixing one or more compounds of the formula I with one or more compounds of the formulae II-XXII or with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, UV stabilisers, such as Tinuvin® from Ciba, antioxidants, free-radical scavengers, microparticles, nanoparticles, etc. For example, 0-15% of pleochroic dyes or chiral dopants can be added. Suitable stabilisers and dopants are mentioned below in Tables C and D.

In the present application and in the examples below, the structures of the liquid-crystal compounds are indicated by means of acronyms, the trans-formation into chemical formulae taking place in accordance with Tables A and B below. All radicals $C_nH_{2n+1}$ and $C_mH_{2m+1}$ are straight-chain alkyl radicals having n and m C atoms respectively; n, m and k are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nOCF$_3$ | $C_nH_{2n+1}$ | OCF$_3$ | H | H |
| nOCF$_3$.F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components are shown in Tables A and B.
TABLE A
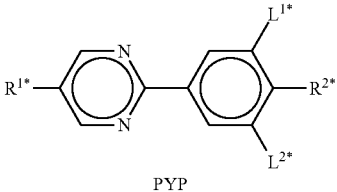
PYP
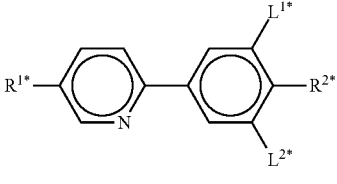
PYRP
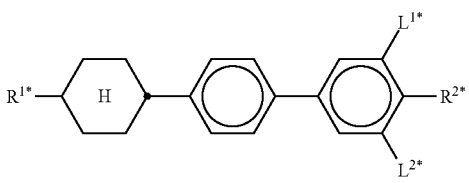
BCH
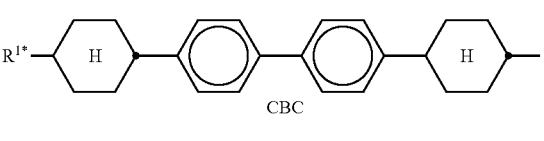
CBC
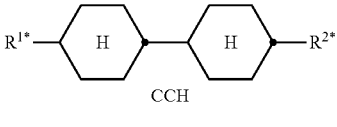
CCH
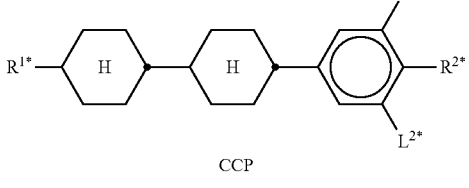
CCP
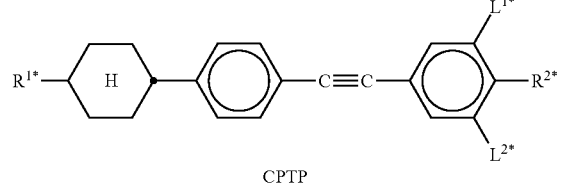
CPTP
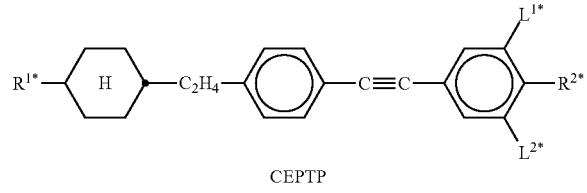
CEPTP
TABLE A-continued
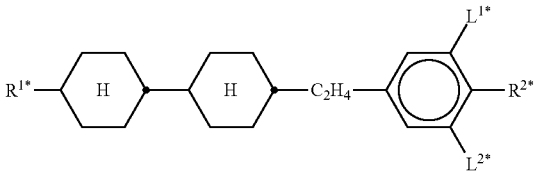
ECCP
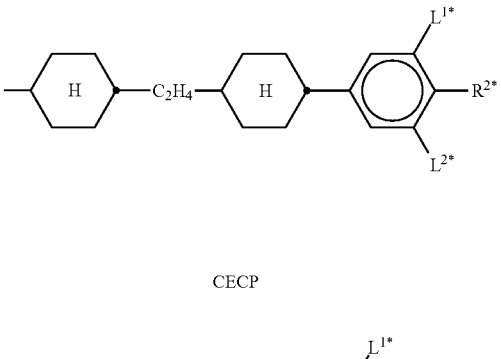
CECP
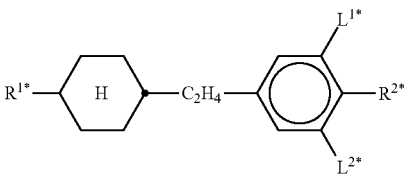
EPCH
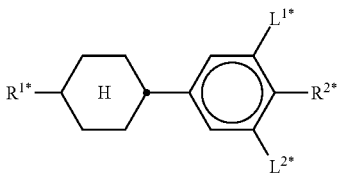
PCH
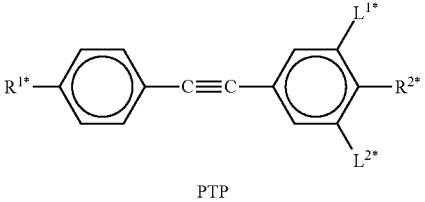
PTP
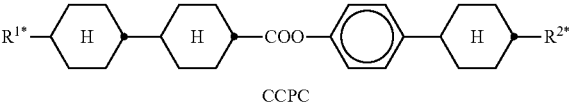
CCPC
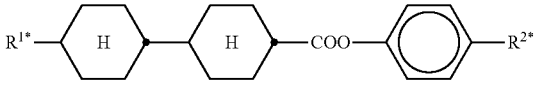
CP TABLE A-continued
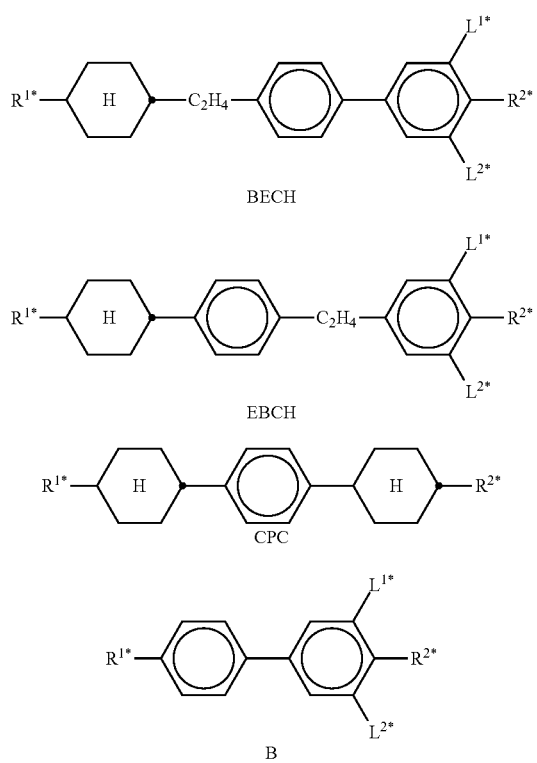
TABLE A-continued
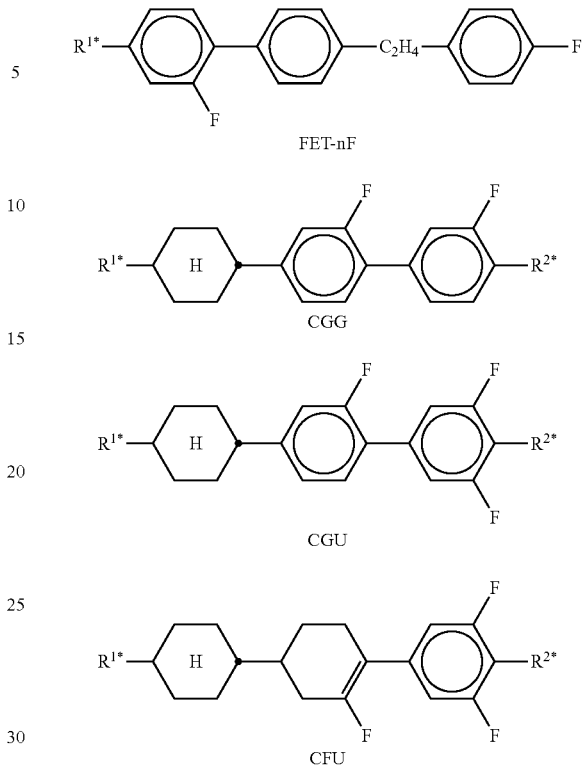
TABLE B
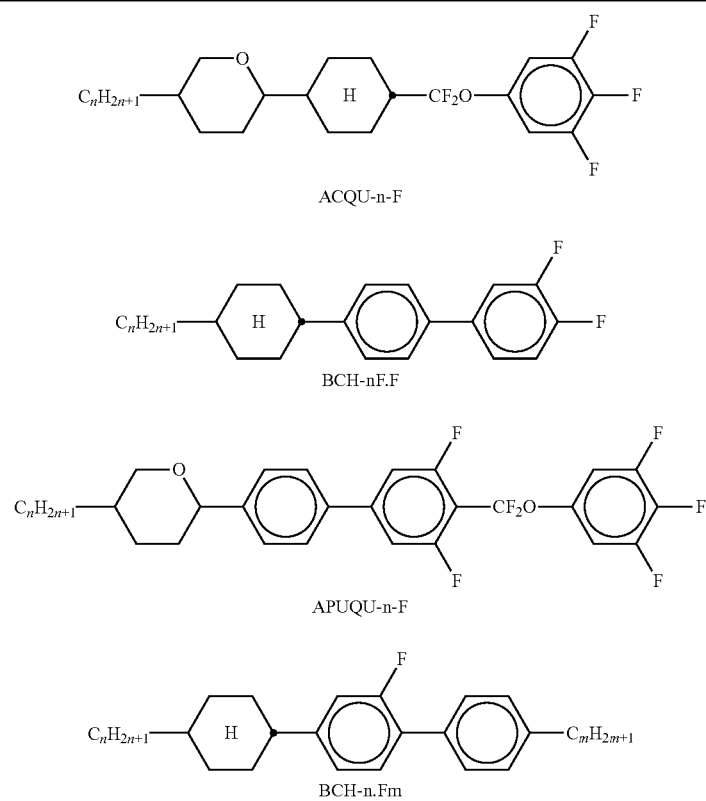

TABLE B-continued
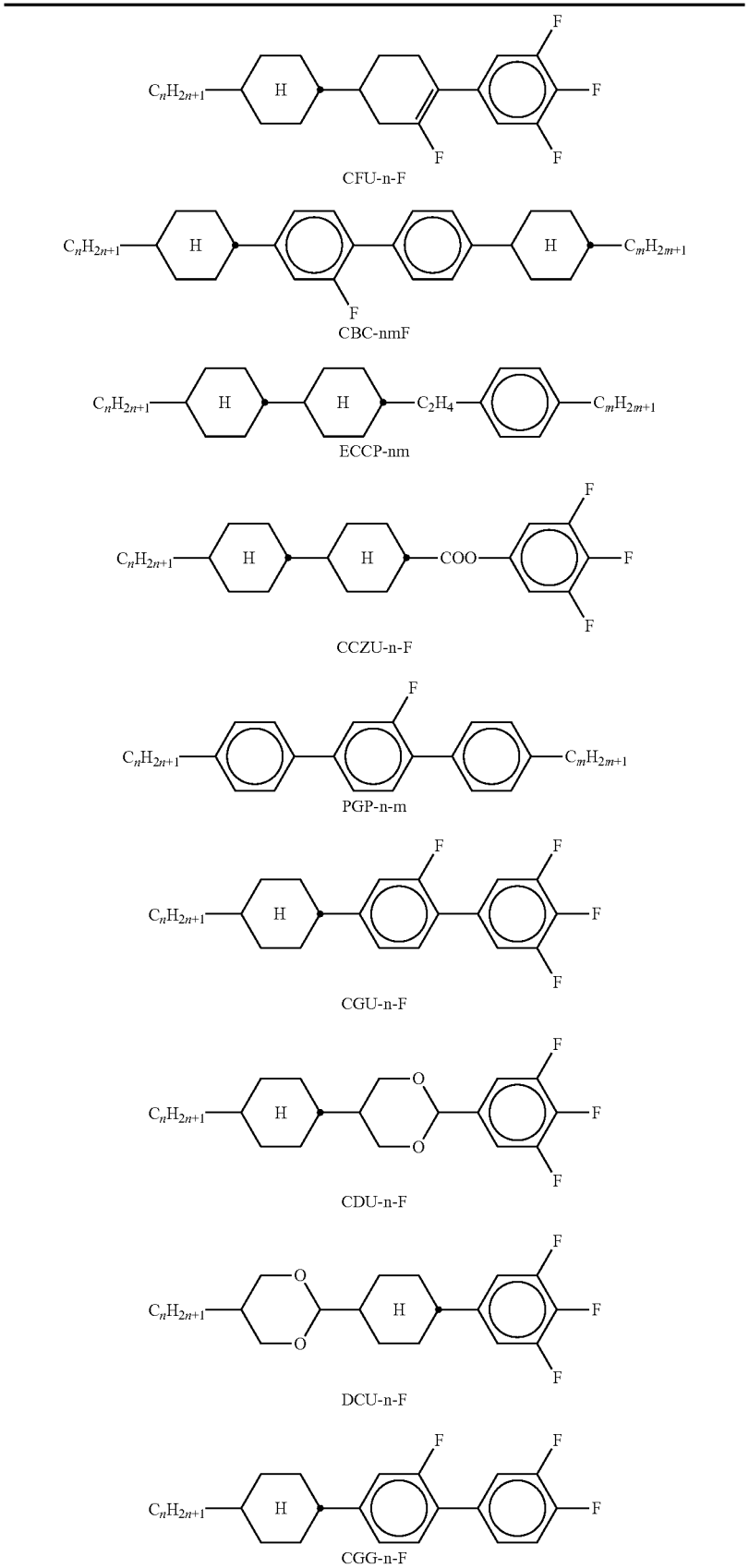

TABLE B-continued
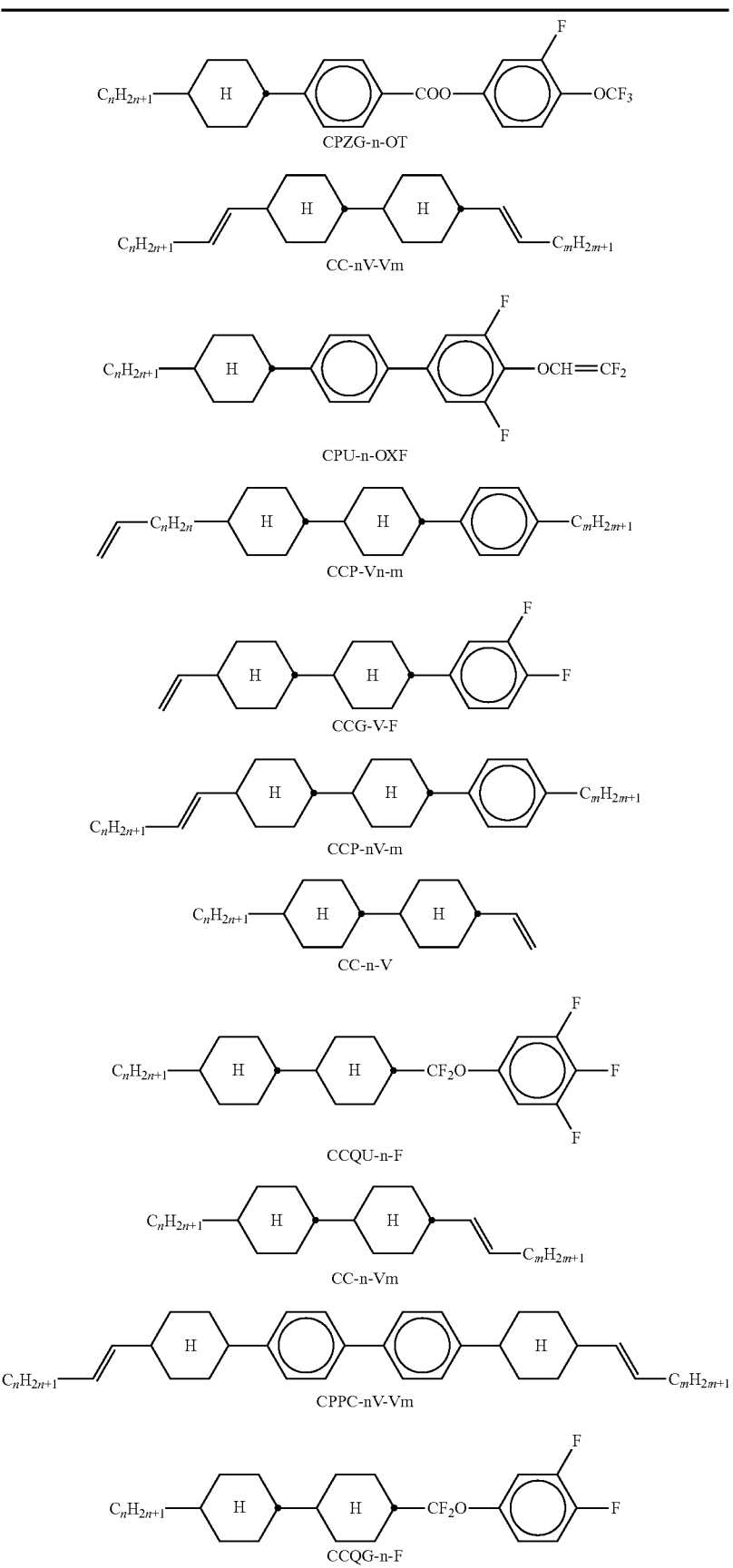

TABLE B-continued
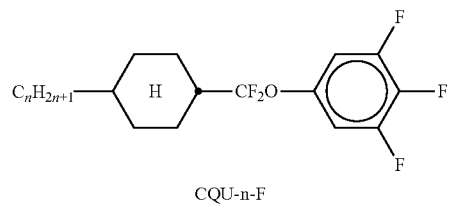
CQU-n-F
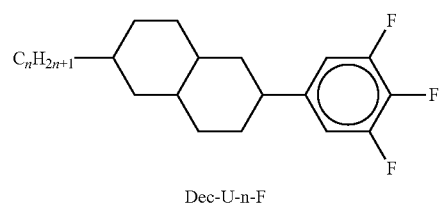
Dec-U-n-F
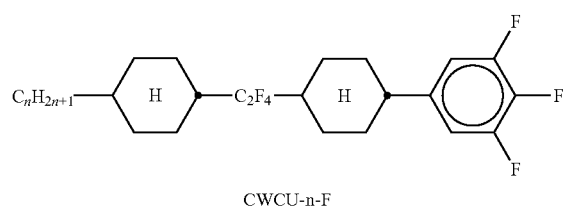
CWCU-n-F
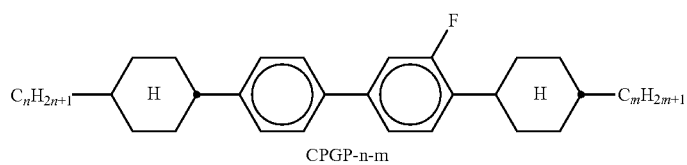
CPGP-n-m
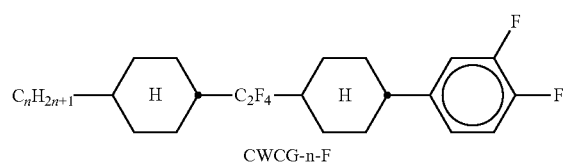
CWCG-n-F
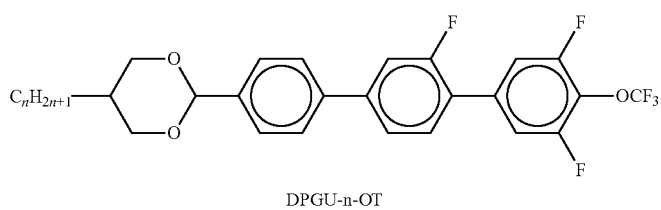
DPGU-n-OT
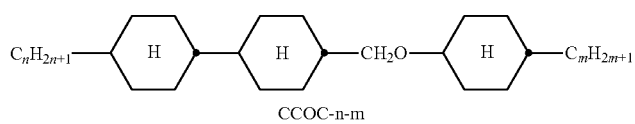
CCOC-n-m
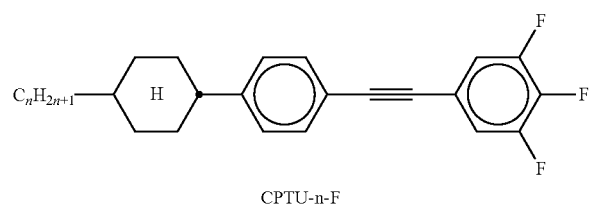
CPTU-n-F TABLE B-continued
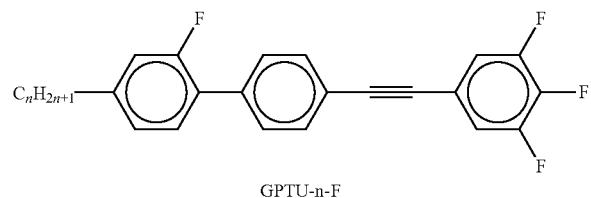
GPTU-n-F
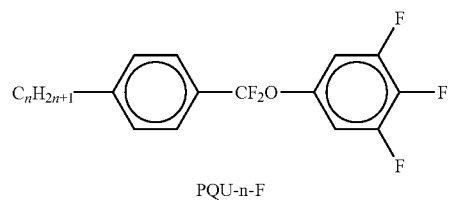
PQU-n-F
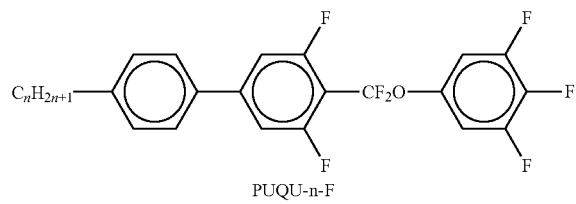
PUQU-n-F
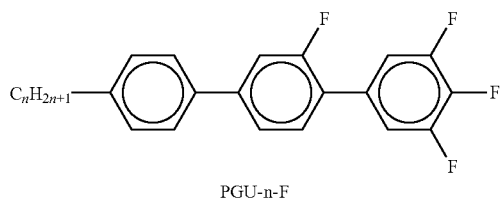
PGU-n-F
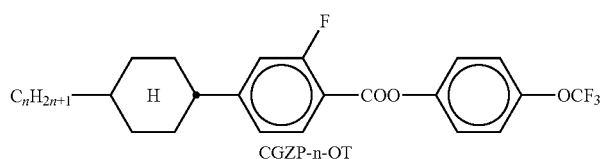
CGZP-n-OT
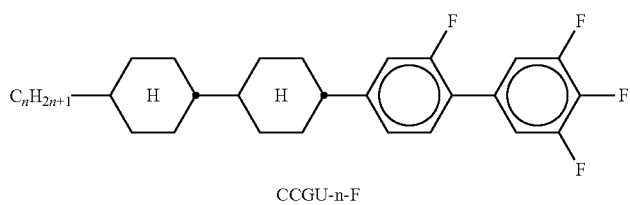
CCGU-n-F
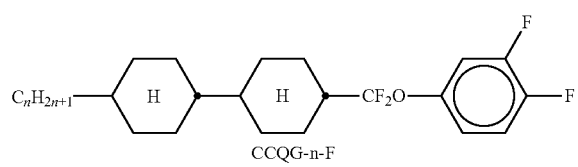
CCQG-n-F
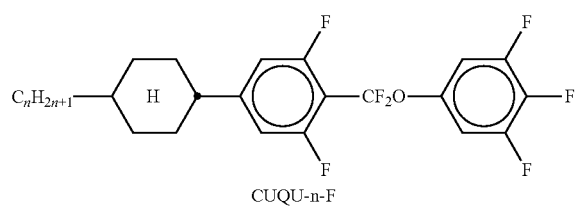
CUQU-n-F TABLE B-continued
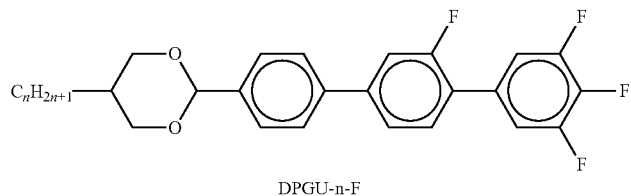
DPGU-n-F
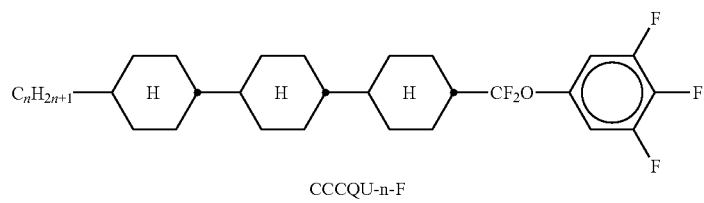
CCCQU-n-F
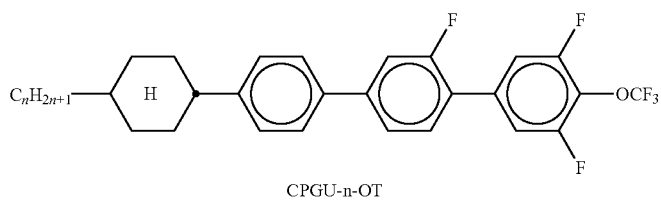
CPGU-n-OT
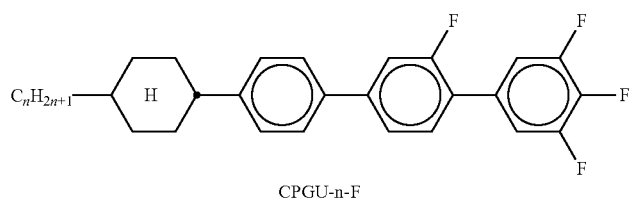
CPGU-n-F
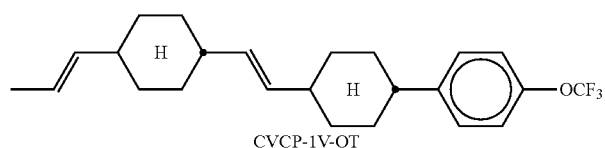
CVCP-1V-OT
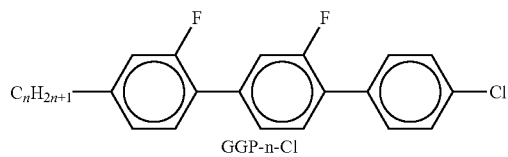
GGP-n-Cl
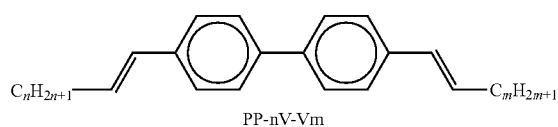
PP-nV-Vm
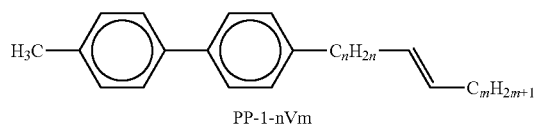
PP-1-nVm
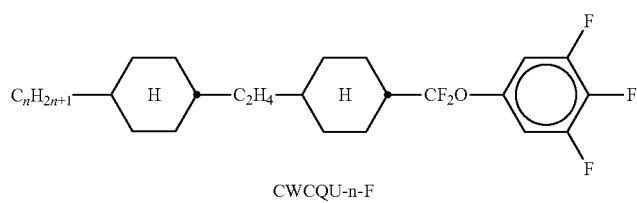
CWCQU-n-F TABLE B-continued
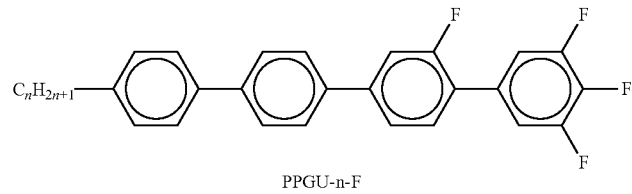
PPGU-n-F
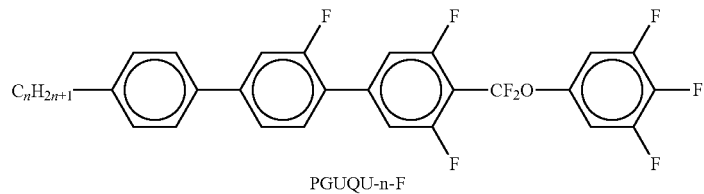
PGUQU-n-F
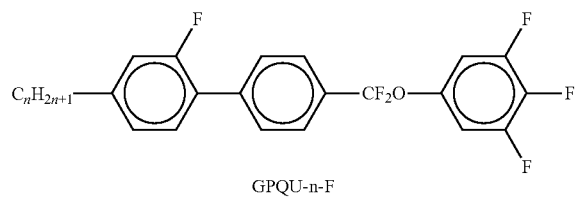
GPQU-n-F
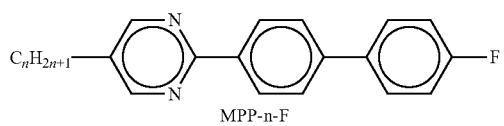
MPP-n-F
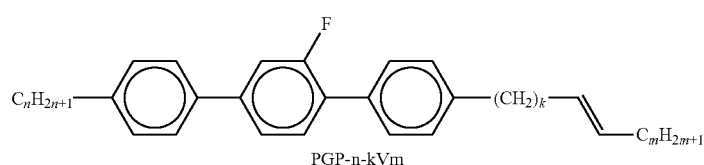
PGP-n-kVm
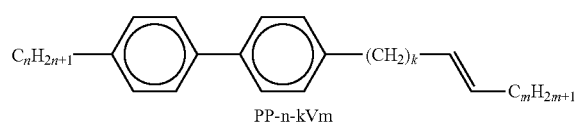
PP-n-kVm
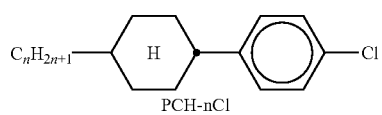
PCH-nCl
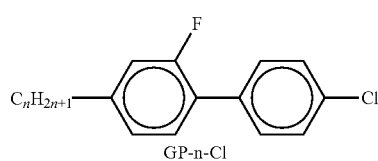
GP-n-Cl
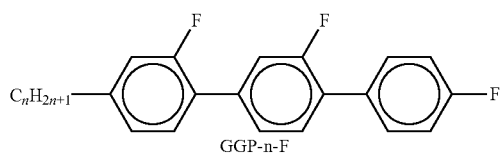
GGP-n-F
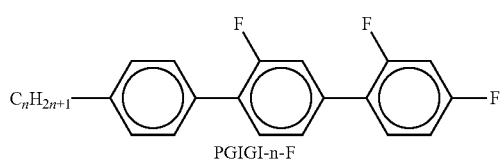
PGIGI-n-F TABLE B-continued
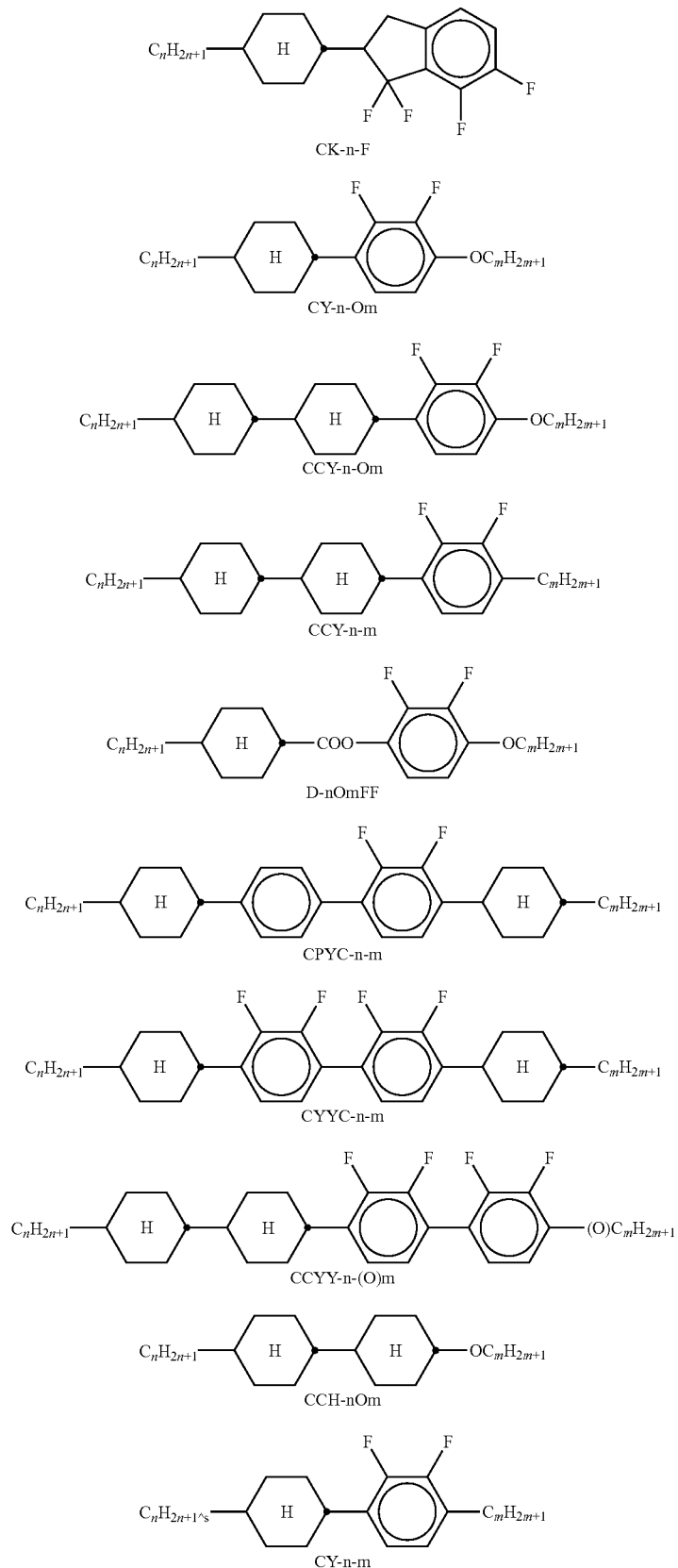

TABLE B-continued
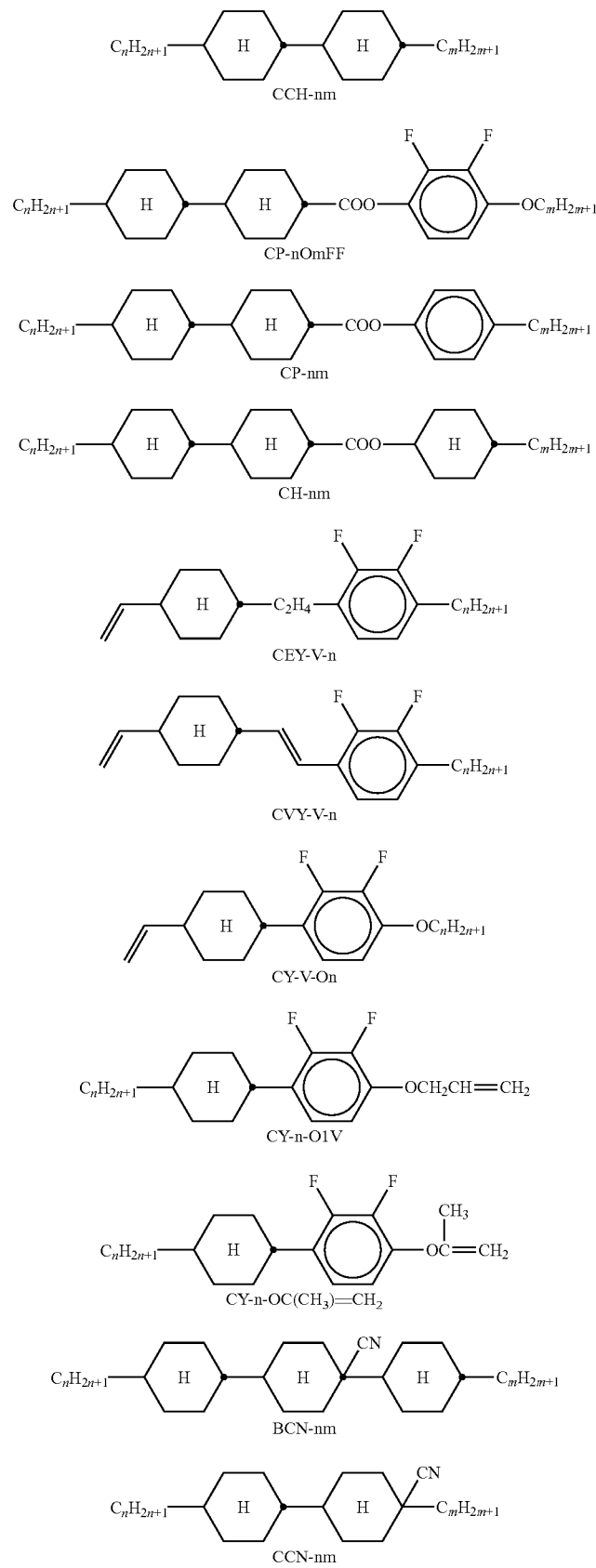

TABLE B-continued
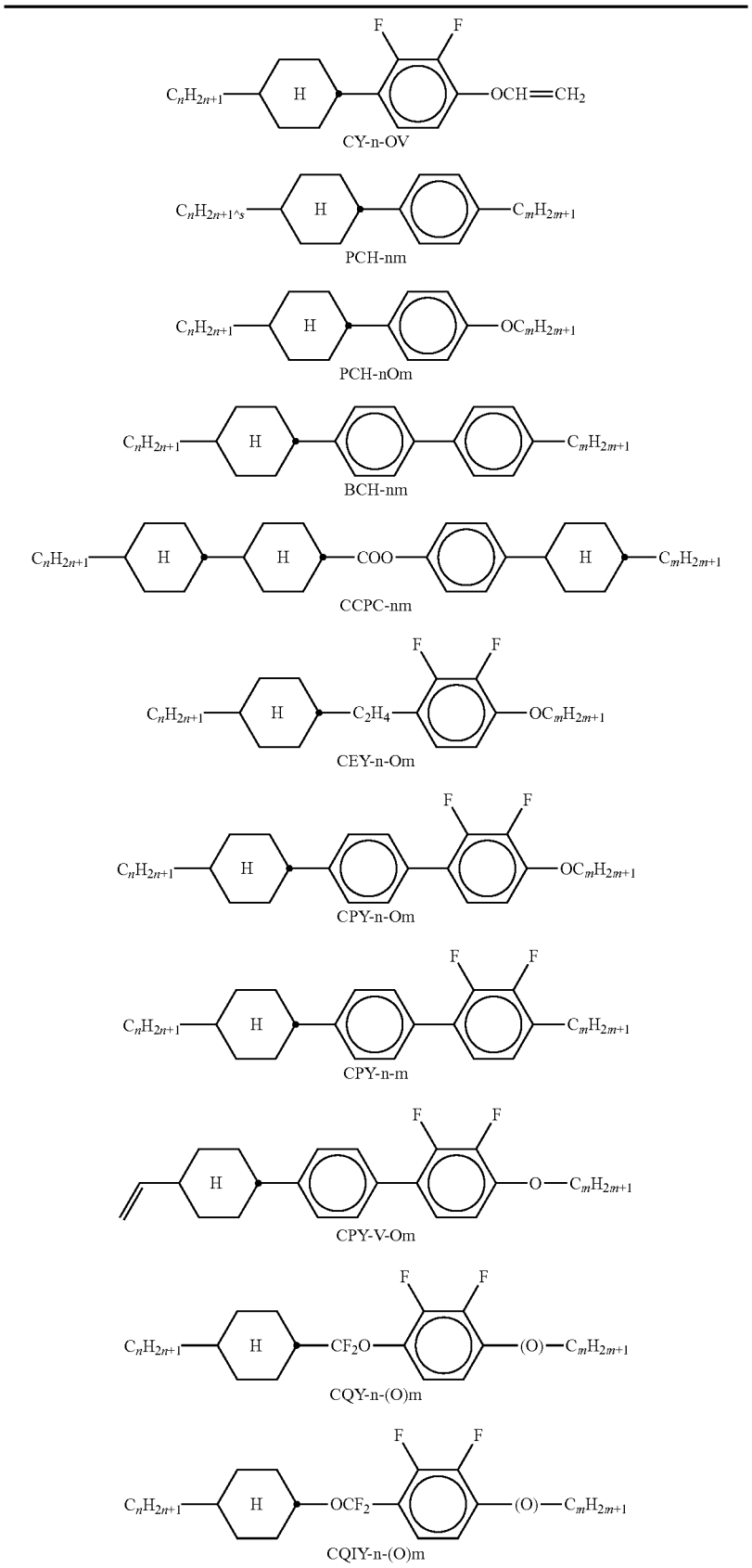

Particular preference is given to liquid-crystalline mixtures which, besides the compounds of the formula I and IA to IE, comprise at least one, two, three, four or more compounds from Table B.

TABLE C

Table C indicates possible dopants which are generally added to the mixtures according to the invention. The mixtures preferably comprise 0-10% by weight, in particular 0.01-5% by weight and particularly preferably 0.01-3% by weight of dopants.

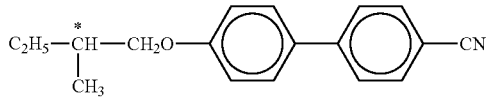
C 15

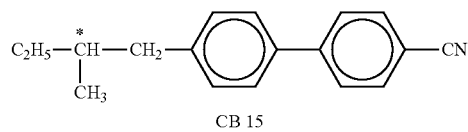
CB 15

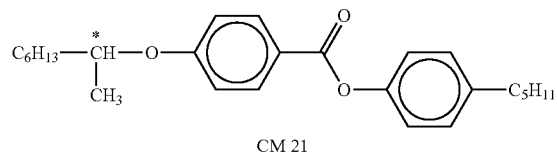
CM 21

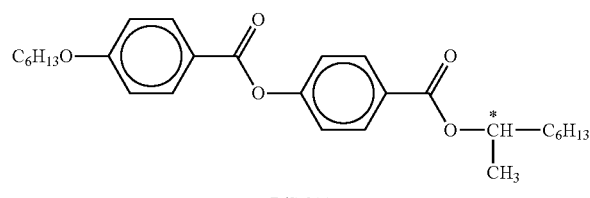
R/S-811

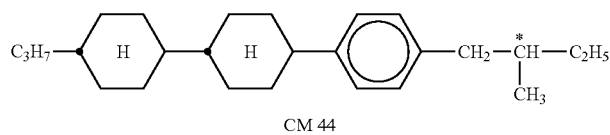
CM 44

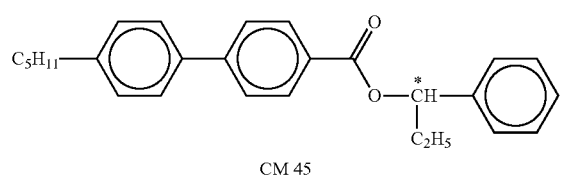
CM 45

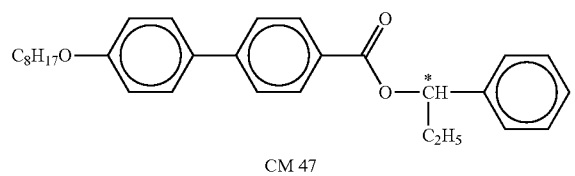
CM 47

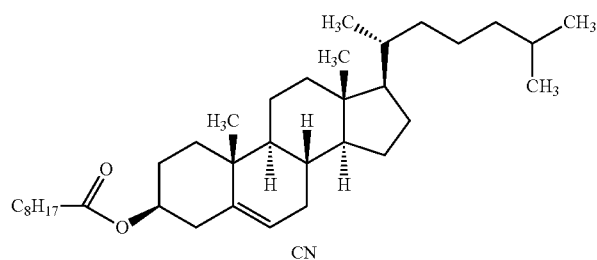
CN

TABLE C-continued
Table C indicates possible dopants which are generally added to the mixtures according to the invention.
The mixtures preferably comprise 0-10% by weight, in particular
0.01-5% by weight and particularly preferably 0.01-3% by weight of dopants.
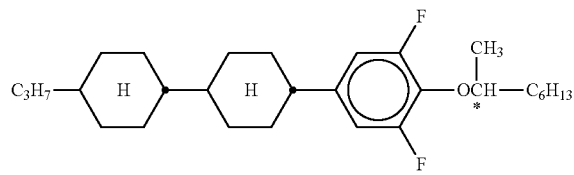
R/S-2011
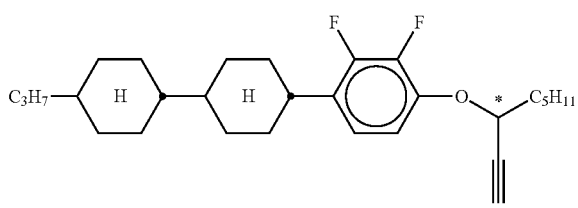
R/S-3011
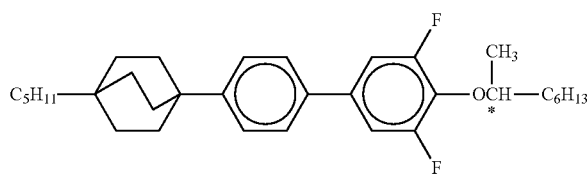
R/S-4011
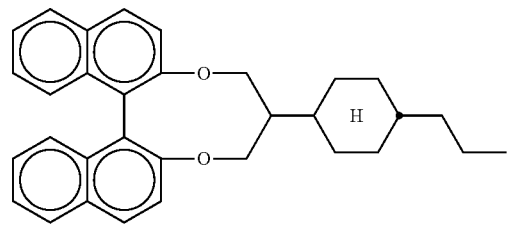
R/S-5011
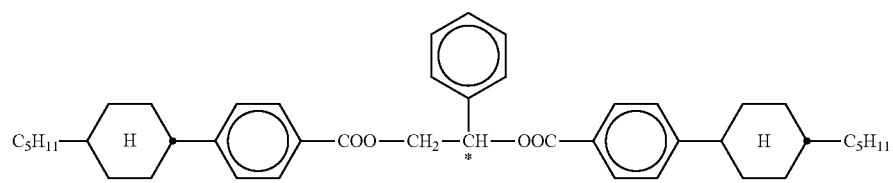
R/S-1011

TABLE D
Stabilisers which can be added, for example, to the mixtures according to the invention in amounts of 0-10% by weight are mentioned below.
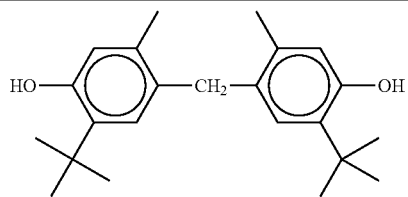
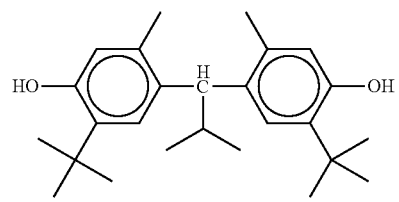
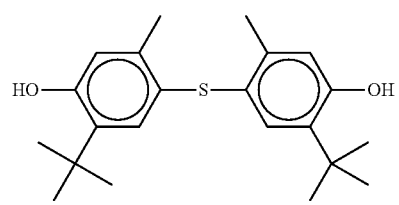
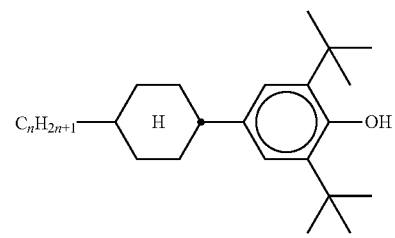
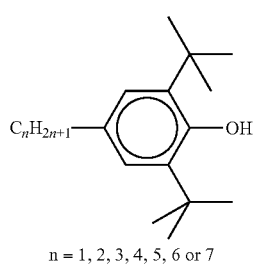
n = 1, 2, 3, 4, 5, 6 or 7
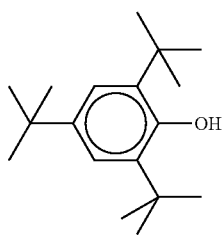

TABLE D-continued
Stabilisers which can be added, for example, to the mixtures according to the invention in amounts of 0-10% by weight are mentioned below.
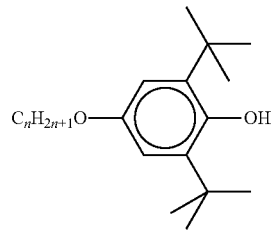
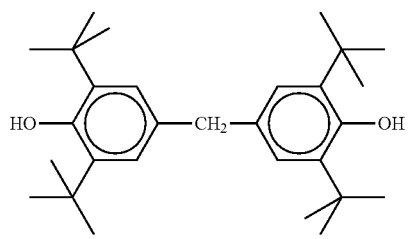
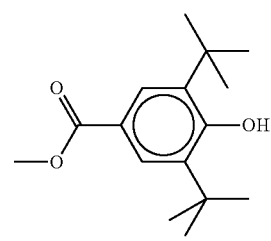
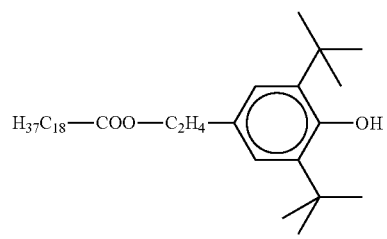
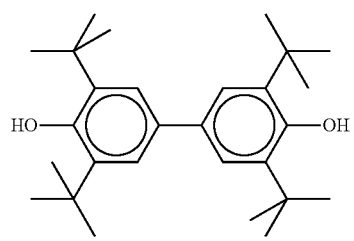

TABLE D-continued
Stabilisers which can be added, for example, to the mixtures according to the invention in amounts of 0-10% by weight are mentioned below.
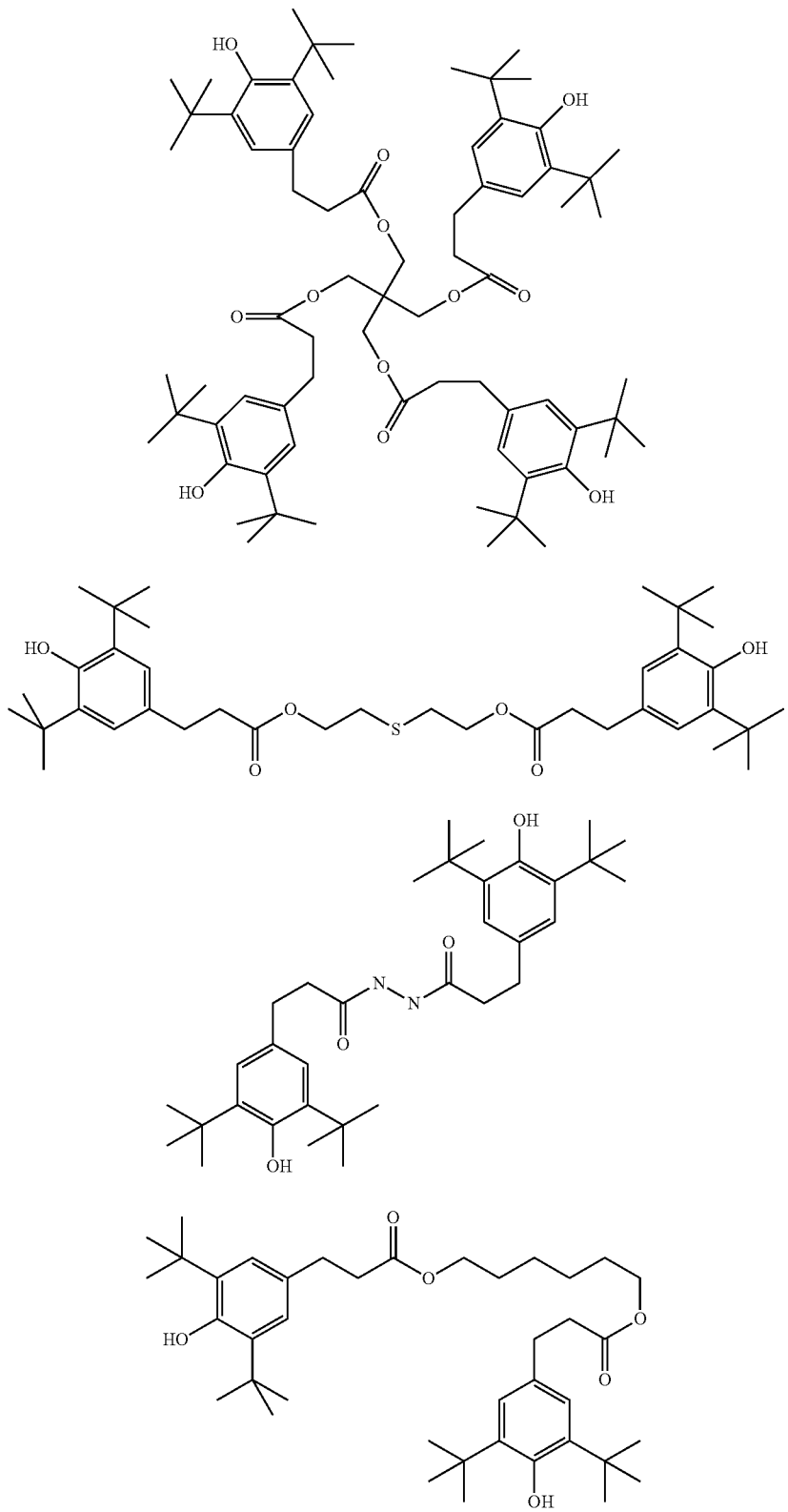

TABLE D-continued
Stabilisers which can be added, for example, to the mixtures according to the invention in amounts of 0-10% by weight are mentioned below.
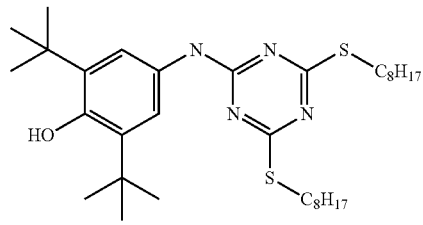
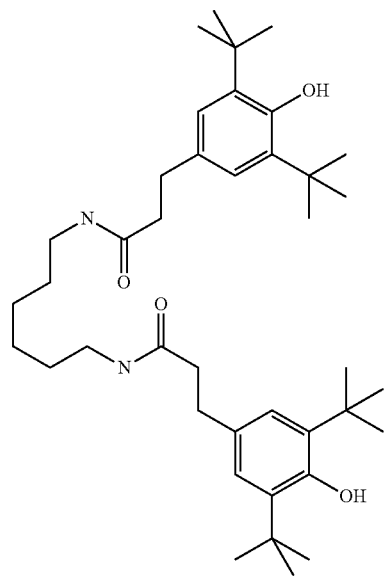 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
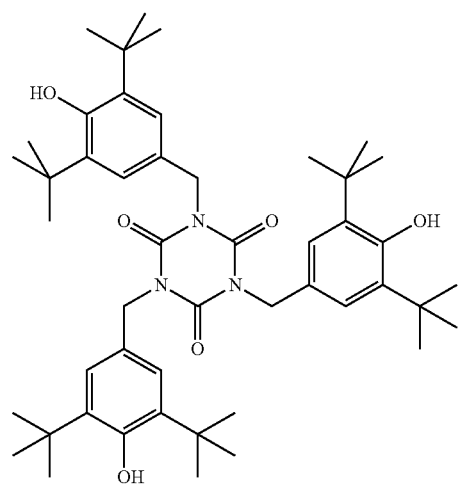 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE D-continued
Stabilisers which can be added, for example, to the mixtures according to the invention in amounts of 0-10% by weight are mentioned below.
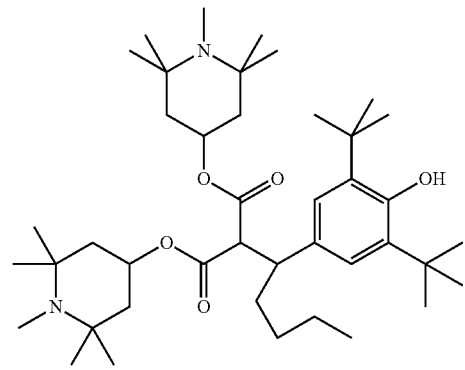 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
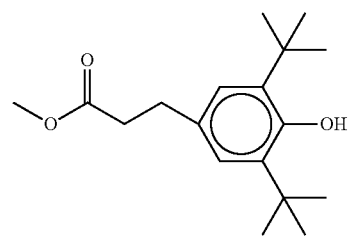
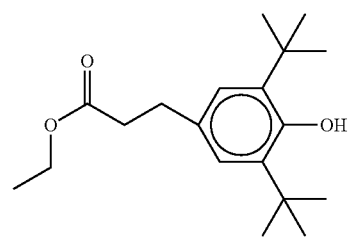
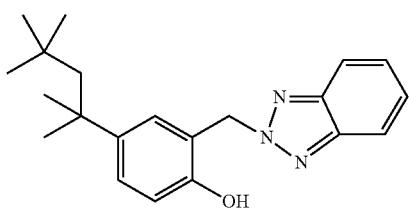 [SMILES: CC(C)(C)CC(C)(C)c1ccc(O)c(Cn2nc3ccccc3n2)c1]
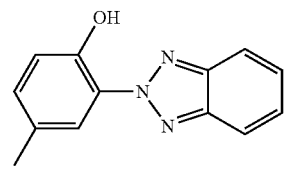 [SMILES: Cc1ccc(O)c(-n2nc3ccccc3n2)c1]
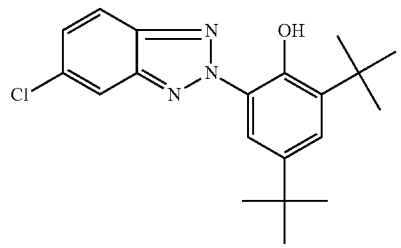 [SMILES: CC(C)(C)c1cc(-n2nc3ccc(Cl)cc3n2)c(O)c(C(C)(C)C)c1]

TABLE D-continued
Stabilisers which can be added, for example, to the mixtures according to the invention in amounts of 0-10% by weight are mentioned below.
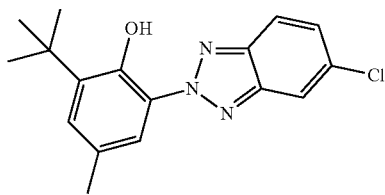 [SMILES: Cc1cc(-n2nc3ccc(Cl)cc3n2)c(O)c(C(C)(C)C)c1]
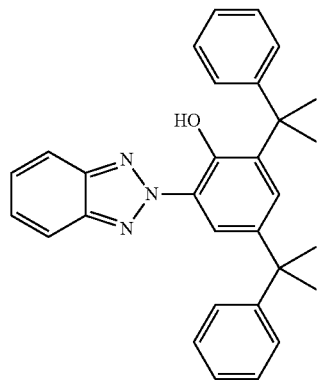 [SMILES: CC(C)(c1ccccc1)c1cc(-n2nc3ccccc3n2)c(O)c(C(C)(C)c2ccccc2)c1]
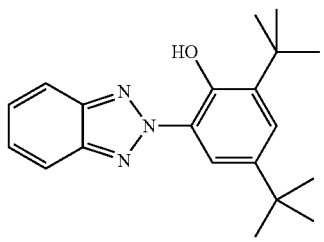 [SMILES: CC(C)(C)c1cc(-n2nc3ccccc3n2)c(O)c(C(C)(C)C)c1]
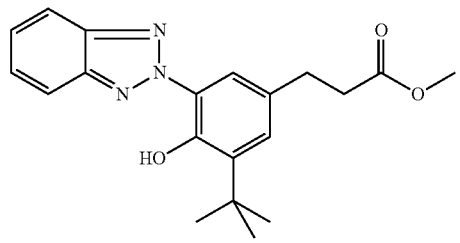 [SMILES: COC(=O)CCc1cc(-n2nc3ccccc3n2)c(O)c(C(C)(C)C)c1]
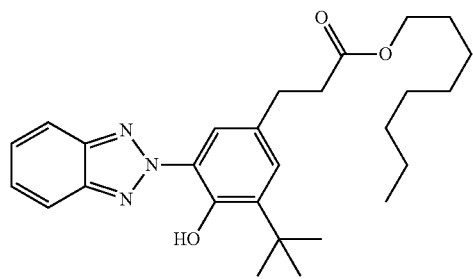 [SMILES: CCCCCCCCOC(=O)CCc1cc(-n2nc3ccccc3n2)c(O)c(C(C)(C)C)c1]

TABLE D-continued
Stabilisers which can be added, for example, to the mixtures according to
the invention in amounts of 0-10% by weight are mentioned below.
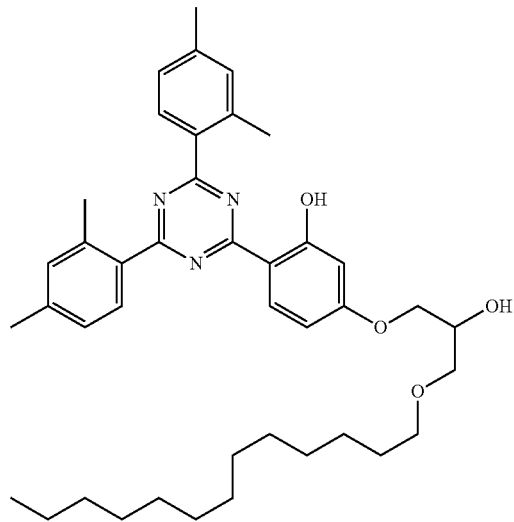 [SMILES: CCCCCCCCCCCCCOCC(O)COc1ccc(-c2nc(-c3ccc(C)cc3C)nc(-c3ccc(C)cc3C)n2)c(O)c1]
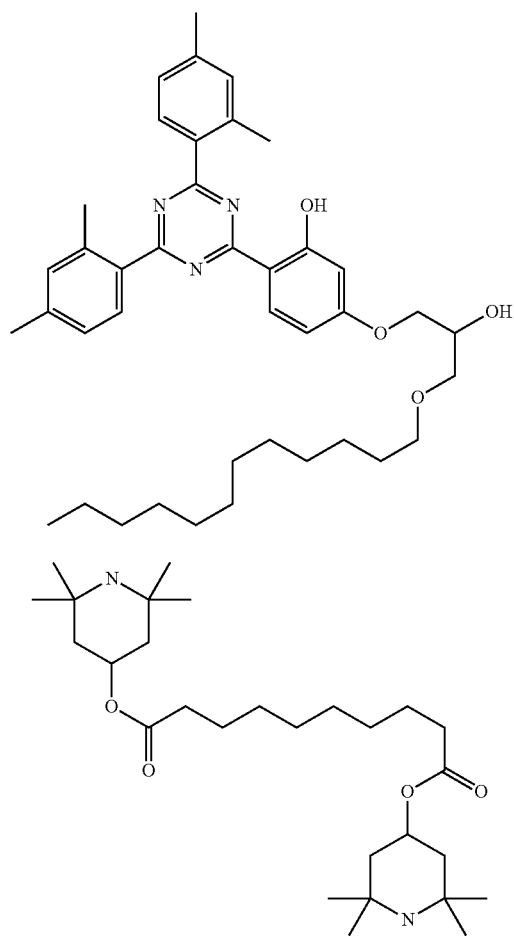

TABLE D-continued

Stabilisers which can be added, for example, to the mixtures according to the invention in amounts of 0-10% by weight are mentioned below.

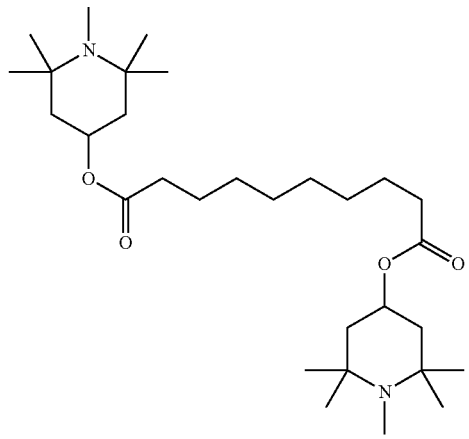

The following examples are intended to explain the invention without limiting it.

Above and below, percentage data denote percent by weight. All temperatures are indicated in degrees Celsius. m.p. denotes melting point, cl.p.=clearing point. Furthermore, C=crystalline state, N=nematic phase, S=smectic phase and I=isotropic phase. The data between these symbols represent the transition temperatures. Furthermore, Δn denotes the optical anisotropy at 589 nm and 20° C.,
$\gamma_1$ denotes the rotational viscosity (mPa·s) at 20° C.,
$V_{10}$ denotes the voltage (V) for a 10% transmission (viewing angle perpendicular to the plate surface), (threshold voltage),
Δ∈ denotes the dielectric anisotropy at 20° C. and 1 kHz (Δ∈=∈$_\parallel$–∈$_\perp$, where ∈$_\parallel$ denotes the dielectric constant parallel to the longitudinal axes of the molecules and ∈$_\perp$ denotes the dielectric constant perpendicular thereto).

The electro-optical data are measured in a TN cell at the 1st minimum (i.e. at a d·Δn value of 0.5 μm) at 20° C., unless expressly indicated otherwise. The optical data are measured at 20° C., unless expressly indicated otherwise. All physical properties are determined in accordance with "Merck Liquid Crystals, Physical Properties of Liquid Crystals", status November 1997, Merck KGaA, Germany, and apply for a temperature of 20° C., unless explicitly indicated otherwise.

EXAMPLE 1

| | | | |
|---|---|---|---|
| APUQU-3-F | 5.00% | Clearing point [° C.]: | 107.4 |
| BCH-3F.F | 6.00% | Δn [589 nm, 20° C.]: | 0.0880 |
| BCH-5F.F | 6.00% | Δ∈ [1 kHz, 20° C.]: | 7.2 |
| CC-3-V1 | 6.00% | ∈$_\parallel$ [1 kHz, 20° C.]: | 10.7 |
| CC-5-V | 12.00% | ∈$_\perp$ [1 kHz, 20° C.]: | 3.5 |
| CCG-V-F | 18.00% | | |
| CCGU-3-F | 6.00% | | |
| CCOC-3-3 | 3.00% | | |
| CCOC-3-5 | 3.00% | | |
| CCOC-4-3 | 3.00% | | |
| CCQU-2-F | 10.00% | | |
| CCQU-3-F | 10.00% | | |
| CCQU-5-F | 7.00% | | |
| CCY-3-1 | 5.00% | | |

EXAMPLE 2

| | | | |
|---|---|---|---|
| APUQU-3-F | 4.00% | Clearing point [° C.]: | 106.4 |
| BCH-3F.F | 7.00% | Δn [589 nm, 20° C.]: | 0.0886 |
| BCH-5F.F | 7.00% | Δ∈ [1 kHz, 20° C.]: | 7.3 |
| CC-3-V1 | 6.00% | ∈$_\parallel$ [1 kHz, 20° C.]: | 11.1 |
| CC-5-V | 6.00% | ∈$_\perp$ [1 kHz, 20° C.]: | 3.8 |
| CCG-V-F | 16.00% | | |
| CCGU-3-F | 7.00% | | |
| CCOC-3-3 | 4.00% | | |
| CCOC-3-5 | 4.00% | | |
| CCOC-4-3 | 4.00% | | |
| CCQU-2-F | 10.00% | | |
| CCQU-3-F | 10.00% | | |
| CCQU-5-F | 10.00% | | |
| CCY-3-1 | 5.00% | | |

EXAMPLE 3

| | | | |
|---|---|---|---|
| APUQU-2-F | 8.00 | Clearing point [° C.]: | 74.8 |
| APUQU-3-F | 7.00 | Δn [589 nm, 20° C.]: | 0.1155 |
| CC-3-V | 30.50 | | |
| CCGU-3-F | 6.00 | | |
| CCP-V-1 | 5.50 | | |
| CCQU-3-F | 6.00 | | |
| CPGU-3-OT | 6.00 | | |
| CY-5-O4 | 3.00 | | |
| PGUQU-3-F | 5.00 | | |
| PP-1-2V1 | 1.50 | | |
| PPGU-3-F | 1.50 | | |
| PUQU-3-F | 20.00 | | |

EXAMPLE 4

| | | | |
|---|---|---|---|
| APUQU-2-F | 6.50 | Clearing point [° C.]: | 74.3 |
| APUQU-3-F | 6.50 | Δn [589 nm, 20° C.]: | 0.1159 |
| CC-3-V | 28.00 | Δ∈ [1 kHz, 20° C.]: | 16.1 |
| CCGU-3-F | 4.00 | ∈$_\parallel$ [1 kHz, 20° C.]: | 20.6 |
| CCP-V-1 | 4.00 | ∈$_\perp$ [1 kHz, 20° C.]: | 4.5 |
| CCQU-3-F | 8.00 | $\gamma_1$ [mPa·s, 20° C.]: | 102 |
| CPGU-3-OT | 5.00 | $V_0$ [20° C., V]: | 0.87 |

-continued

| | |
|---|---|
| CY-5-O4 | 2.50 |
| PGUQU-3-F | 4.50 |
| PP-1-2V1 | 0.50 |
| PPGU-3-F | 1.50 |
| PUQU-3-F | 20.50 |
| CCY-3-1 | 2.50 |
| CPU-3-OXF | 6.00 |

EXAMPLE 5

| | | | |
|---|---|---|---|
| APUQU-2-F | 7.00 | Clearing point [° C.]: | 74.7 |
| APUQU-3-F | 8.00 | Δn [589 nm, 20° C.]: | 0.1163 |
| CC-3-V | 28.00 | Δε [1 kHz, 20° C.]: | 16.4 |
| CCGU-3-F | 4.00 | $\epsilon_{\|}$ [1 kHz, 20° C.]: | 21.0 |
| CCP-V-1 | 4.50 | $\epsilon_{\perp}$ [1 kHz, 20° C.]: | 4.5 |
| CCQU-3-F | 8.00 | $\gamma_1$ [mPa·s, 20° C.]: | 104 |
| CPGU-3-OT | 6.00 | $V_0$ [20° C., V]: | 0.86 |
| CY-5-O4 | 3.00 | | |
| PGUQU-3-F | 5.00 | | |
| PP-1-2V1 | 1.50 | | |
| PPGU-3-F | 1.50 | | |
| PUQU-3-F | 20.50 | | |
| CCY-3-1 | 3.00 | | |

The invention claimed is:

1. A liquid-crystalline medium having positive dielectric anisotropy, comprising:

one or more compounds of formula I

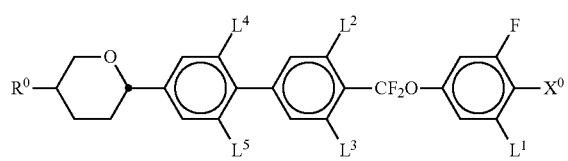

I and one or more compounds selected from formulas IA to IE

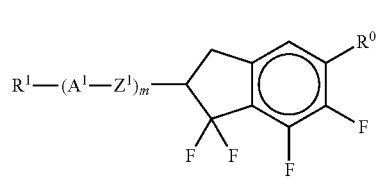

IA

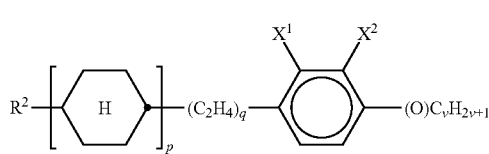

IB

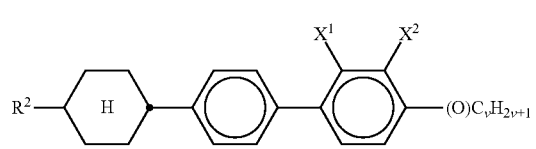

IC

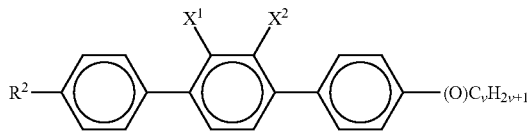

ID

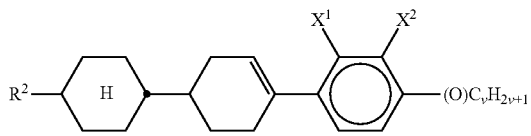

IE in which
$X^0$ denotes F, Cl, CN, SF$_5$, SCN, NCS, a halogenated alkyl radical, a halogenated alkenyl radical, a halogenated alkoxy radical or a halogenated alkenyloxy radical, having in each case up to 6 C atoms,
$L^1$ to $L^5$ each, independently of one another, denote H or F,
$R^1$ and $R^2$ each independently of one another, denote an alkyl or alkenyl radical having up to 15 C atoms which is unsubstituted, monosubstituted by CN or CF$_3$ or at least monosubstituted by halogen, where, in addition, one or more CH$_2$ groups in these radicals are each optionally replaced by —O—, —S—,

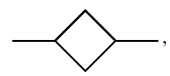,

—C≡C—, —CF$_2$O—, —OCF$_2$— —OC—O— or —O—CO— in such a way that O atoms are not linked directly to one another,
$R^0$ denotes H, an alkyl or alkenyl radical having up to 15 C atoms which is unsubstituted, monosubstituted by CN or CF$_3$ or at least monosubstituted by halogen, where, in addition, one or more CH$_2$ groups in these radicals are each optionally replaced by —O—, —S—,

,

—C≡C—, —CF$_2$O—, —OCF$_2$— —OC—O— or —O—CO— in such a way that O atoms are not linked directly to one another,
$A^1$ a) denote a 1,4-cyclohexenylene or 1,4-cyclohexylene radical, in which one or two non-adjacent CH$_2$ groups may be replaced by —O— or —S—, or
b) denote a 1,4-phenylene radical, in which one or two CH groups are each optionally replaced by N, or
c) denote a radical from the group consisting of piperidine-1,4-diyl-, 1,4-bicyclo[2.2.2]octylene-, naphthalene-2,6-diyl, decahydronaphthalene-2,6-diyl, 1,2,3,4-tetrahydronaphthalene-2,6-diyl, phenanthrene-2,7-diyl and fluorene-2,7-diyl,
where the radicals a), b) and c) may be mono- or polysubstituted by halogen atoms,
$Z^1$ denotes —CO—O—, —O—CO—, —CF$_2$O—, —OCF$_2$—, —CH$_2$O—, —OCH$_2$—, —CH$_2$CH$_2$—, —(CH$_2$)$_4$—, —C$_2$F$_4$—, —CH$_2$CF$_2$—, —CF$_2$CH$_2$—, —CF=CF—, —CH=CF—, —CF=CH—, —CH=CH—, —C≡C— or a single bond, m denotes 0, 1 or 2,
p denotes 1 or 2,
q denotes 0 or 1,
v denotes 1 to 6, and
$X^1$ and $X^2$ each independently of one another denote, F, Cl, $CHF_2$, $CF_3$, $OCHF_2$ or $OCF_3$, and wherein the amount of compounds of formulas IA, IB, IC, ID and IE in said medium is 2-30% by weight based on the total medium.

2. The liquid-crystalline medium according to claim 1, wherein said medium additionally comprises one or more compounds of formulae II and/or III

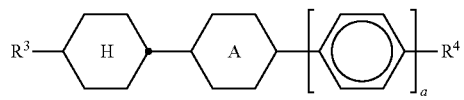

II

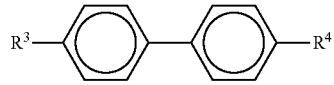

III in which
A denotes 1,4-phenylene or trans-1,4-cyclohexylene,
a denotes 0 or 1,
$R^3$ denotes alkenyl having 2 to 9 C atoms, and
$R^4$ denotes H, an alkyl or alkenyl radical having up to 15 C atoms which is unsubstituted, monosubstituted by CN or $CF_3$ or at least monosubstituted by halogen, where, in addition, one or more $CH_2$ groups in these radicals are each optionally replaced by —O—, —S—,

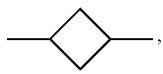

—C≡C—, —$CF_2$O—, —$OCF_2$— —OC—O— or —O—CO— in such a way that O atoms are not linked directly to one another.

3. The liquid-crystalline medium according to claim 1, wherein said medium contains one or more compounds selected from the following formulae

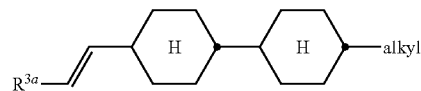

IIa

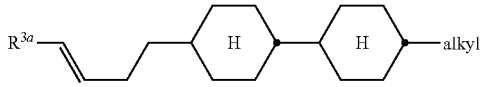

IIb

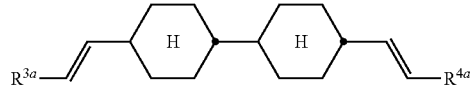

IIc

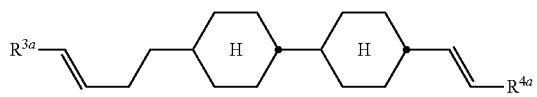

IId

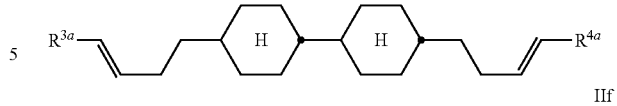

IIe

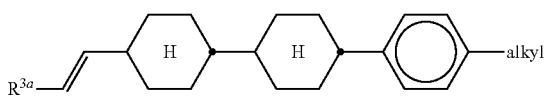

IIf

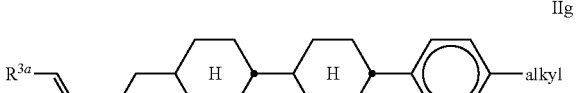

IIg

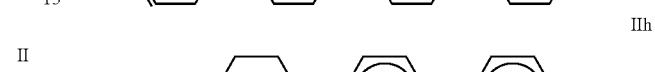

IIh

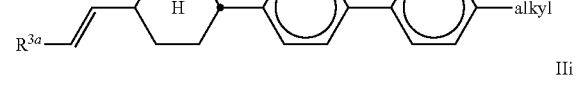

IIi

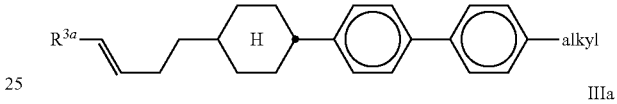

IIIa

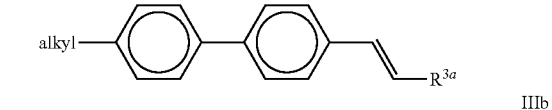

IIIb in which
$R^{3a}$ and $R^{4a}$ each, independently of one another, denote H, $CH_3$, $C_2H_5$ or $C_3H_7$, and "alkyl" denotes a straight-chain alkyl group having 1 to 8 C atoms.

4. The liquid-crystalline medium according to claim 1, wherein said medium additionally contains one or more compounds selected from the following formulae

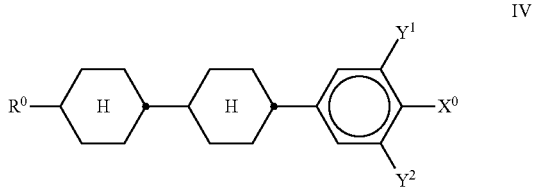

IV

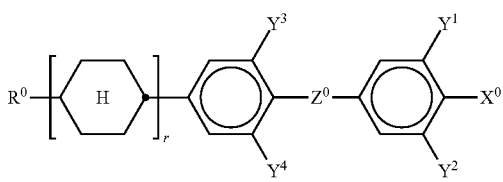

V

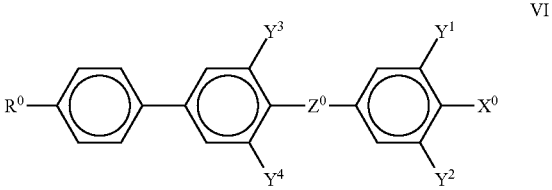

VI

-continued

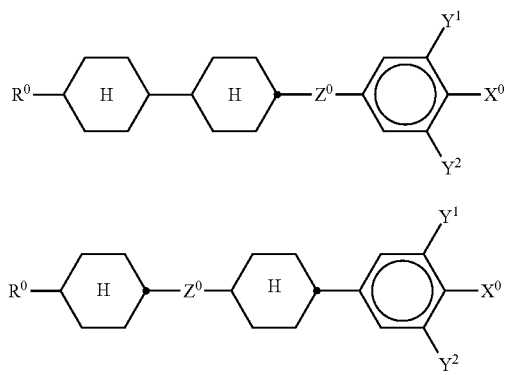

in which

R⁰ have the meanings indicated in claim 1,

Y$^{1-4}$ each, independently of one another, denote H or F,

Z⁰ denotes —C$_2$H$_4$—, —(CH$_2$)$_4$—, —CH═CH—, —CF═CF—, —C$_2$F$_4$—, —CH$_2$CF$_2$—, —CF$_2$CH$_2$—, —CH$_2$O—, —OCH$_2$—, —COO—, —CF$_2$O— or —OCF$_2$—, and in formulae V and VI Z⁰ can also be a single bond, and r denotes 0 or 1.

5. The liquid-crystalline medium according to claim 1, wherein said medium contains one or more compounds selected from the following formulae

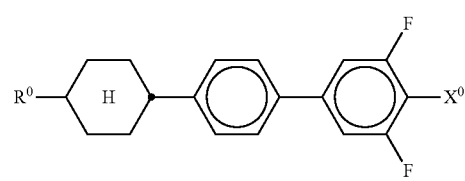

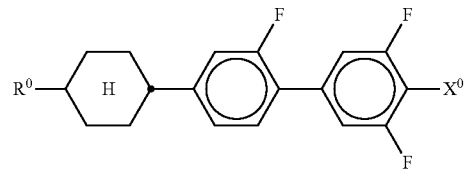

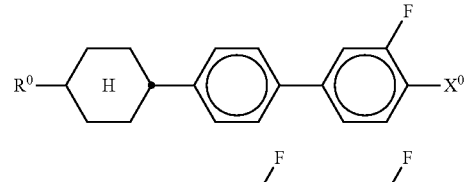

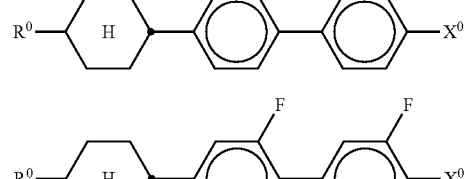

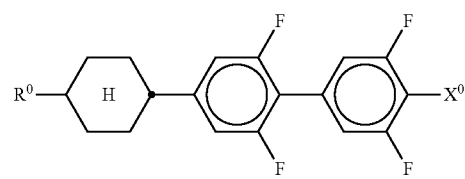

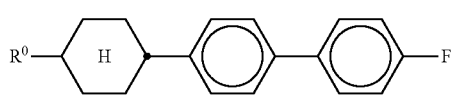

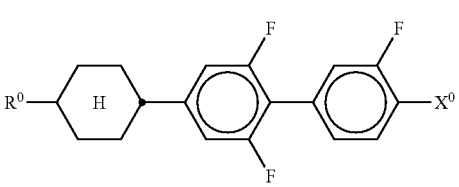

in which R⁰ and X⁰ have the meanings indicated in claim 1.

6. The liquid-crystalline medium according to claim 1, wherein said medium contains one or more compounds selected from the following formulae

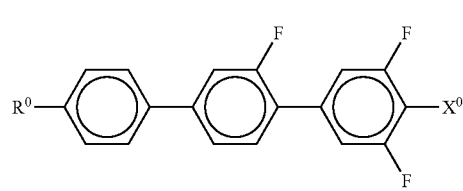

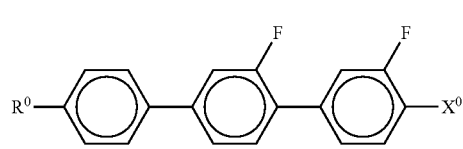

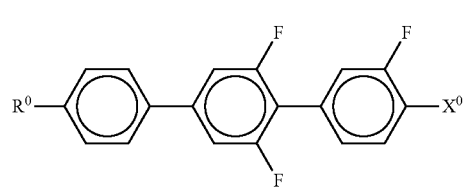

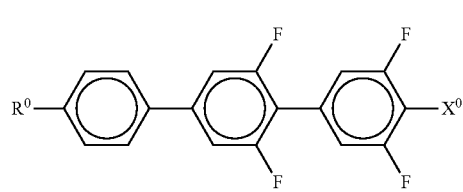

in which R⁰ and X⁰ have the meanings indicated in claim 1.

7. The liquid-crystalline medium according to claim 1, wherein said medium contains one or more compounds selected from the following formulae

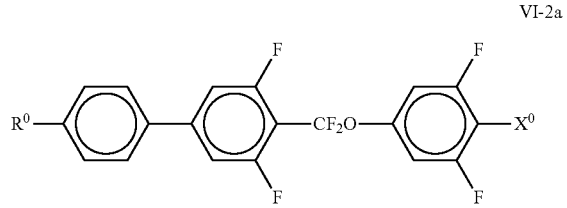

-continued

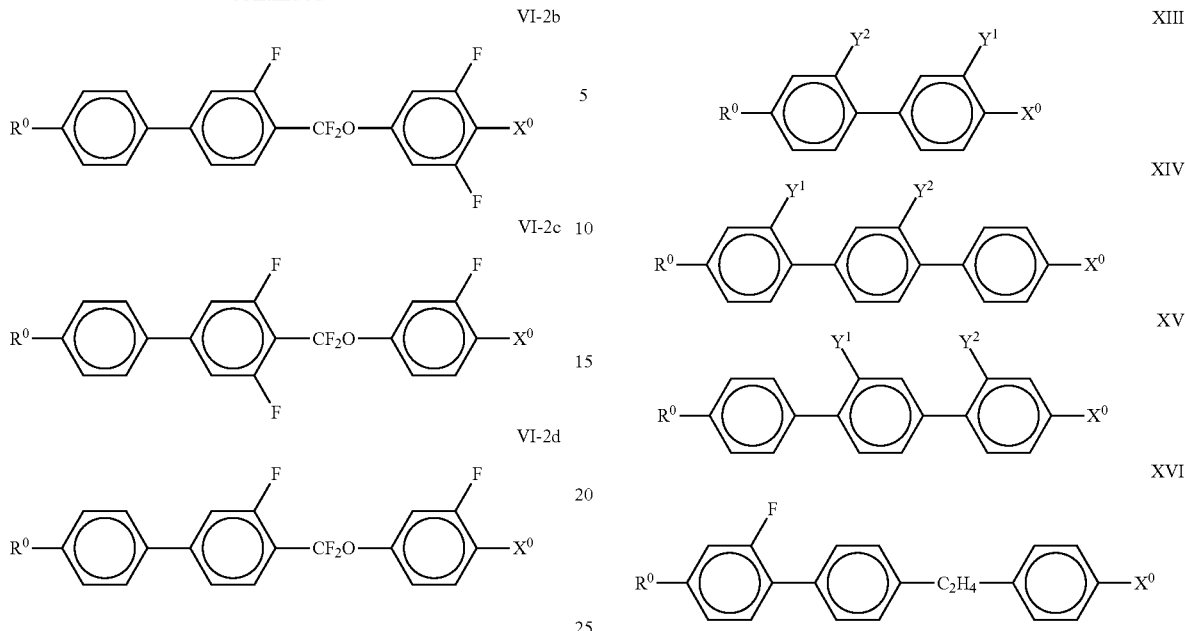

in which $R^0$ and $X^0$ have the meanings indicated in claim 1.

8. The liquid-crystalline medium according to claim 1, wherein said medium additionally contains one or more compounds selected from the following formula

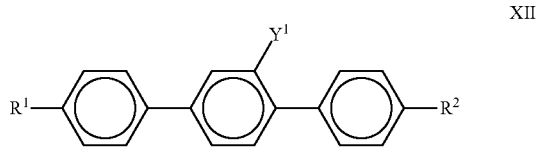

in which
R$^1$ and R$^2$ each, independently of one another, denote n-alkyl, alkoxy, oxaalkyl, fluoroalkyl or alkenyl, each having up to 9 C atoms, and
Y$^1$ denotes H or F.

9. The liquid-crystalline medium according to claim 1, wherein said medium additionally contains one or more compounds selected from the following formulae in which $R^0$, $X^0$, $Y^1$ and $Y^2$ have the meanings indicated in claim 1.

10. The liquid-crystalline medium according to claim 1, wherein said medium contains 1-25% by weight of compounds of the formula I based on the total medium.

11. The liquid-crystalline medium according to claim 1, wherein said medium additionally contains one or more UV stabilizers and/or antioxidants and/or dopants.

12. A process for the preparation of a liquid-crystalline medium according to claim 1, said process comprising mixing one or more compounds of the formula I with at least one compound of the formula IA, IB, IC, ID and/or IE and with further liquid-crystalline compounds and/or additives.

13. A method comprising using a liquid-crystalline medium according to claim 1 for electro-optical purposes.

14. An electro-optical liquid-crystal display containing a liquid-crystalline medium according to claim 1.

15. The liquid-crystalline medium according to claim 1, wherein said one or more compounds of formula I are selected from compounds of formulae I-1 to I-48:

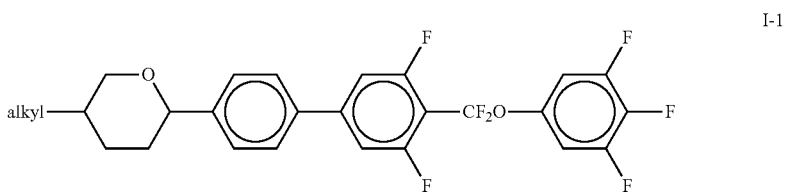

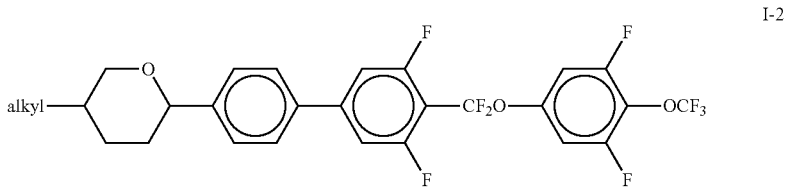

-continued
I-3
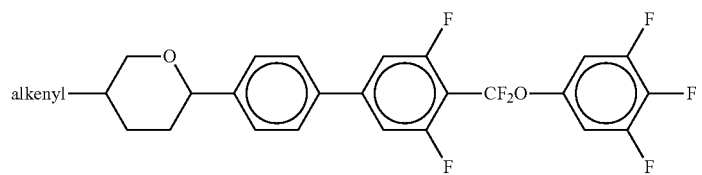
I-4
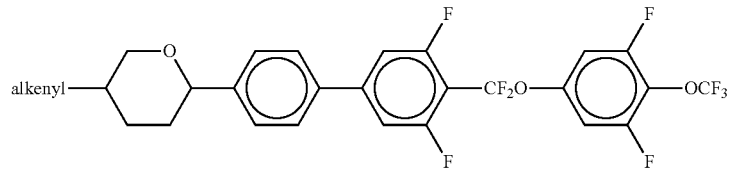
I-5
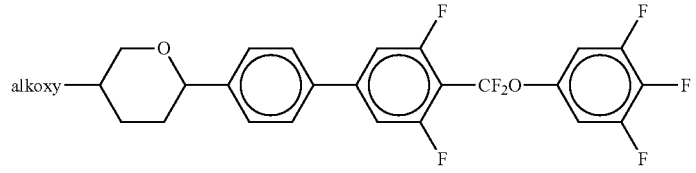
I-6
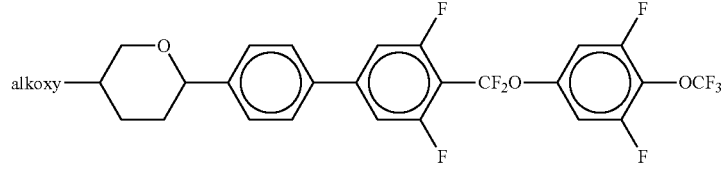
I-7
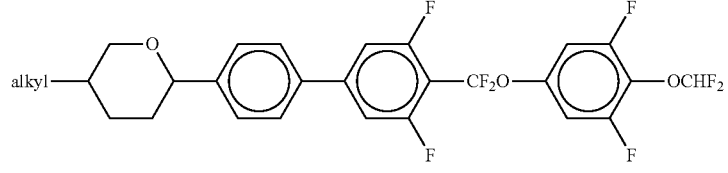
I-8
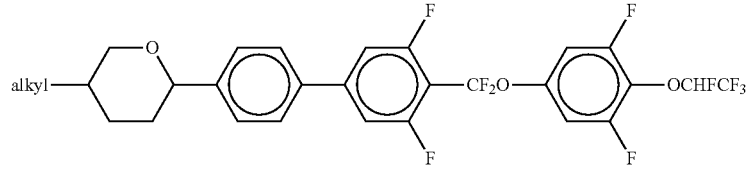
I-9
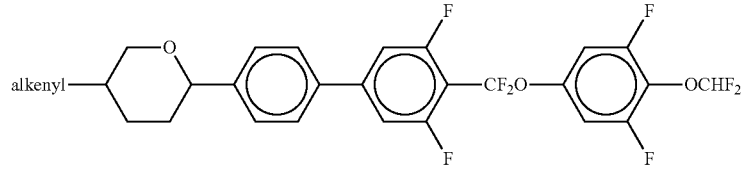
I-10
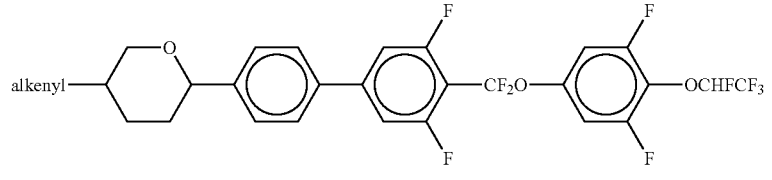
I-11
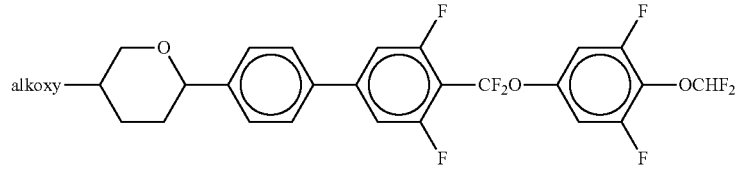

-continued
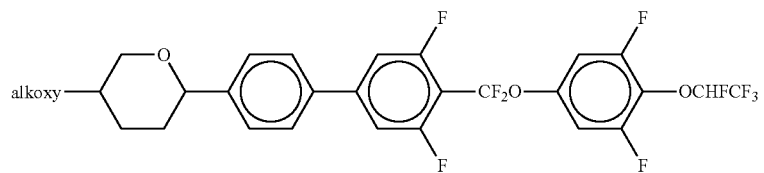
I-12
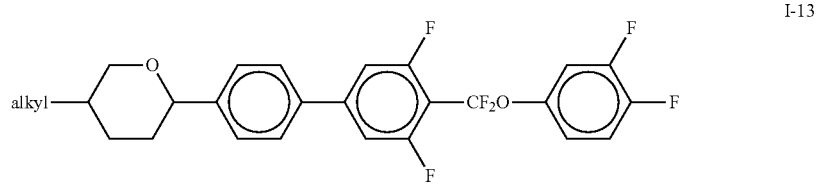
I-13
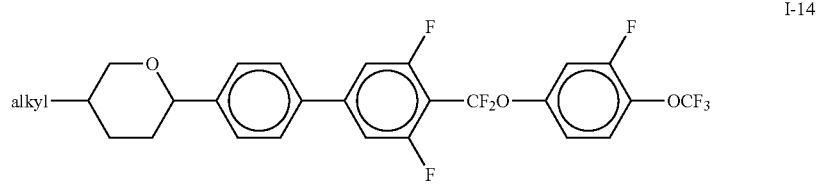
I-14
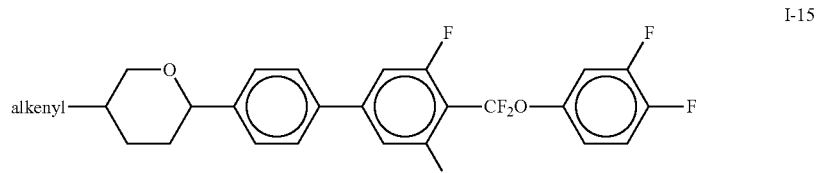
I-15
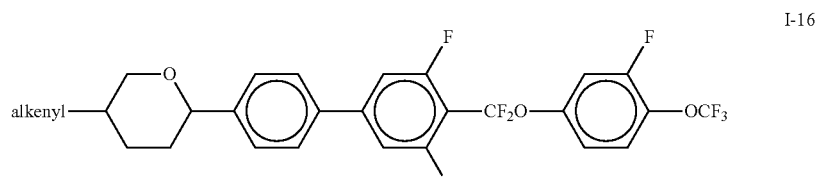
I-16
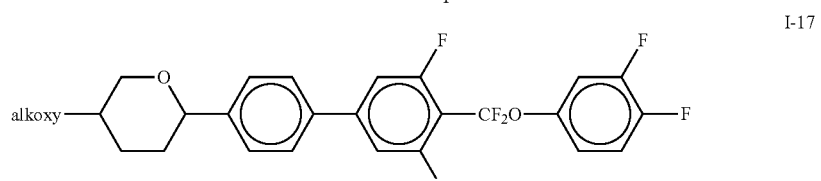
I-17
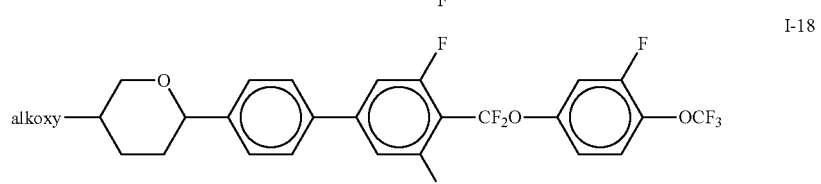
I-18
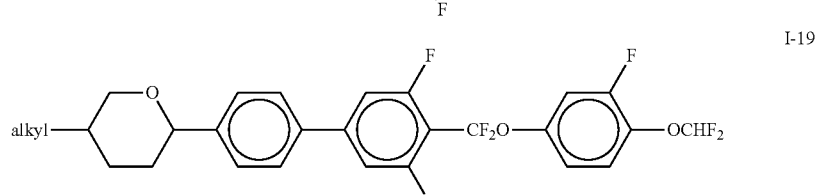
I-19
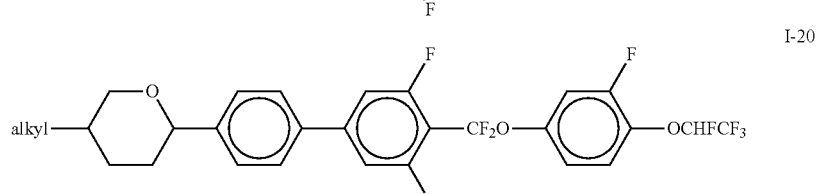
I-20

-continued
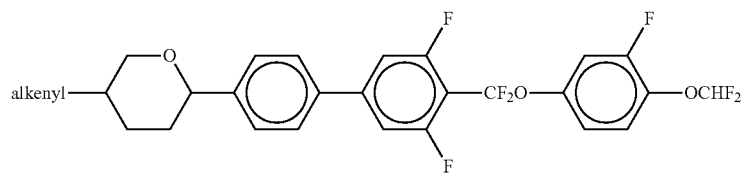
I-21
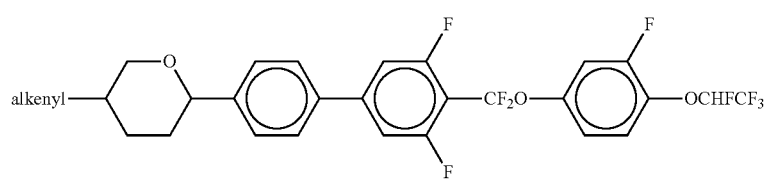
I-22
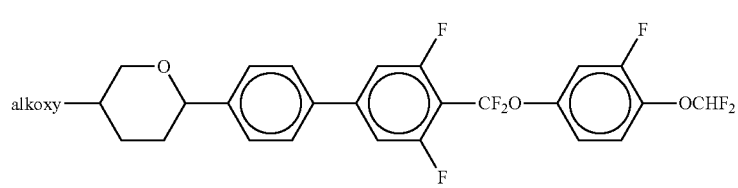
I-23
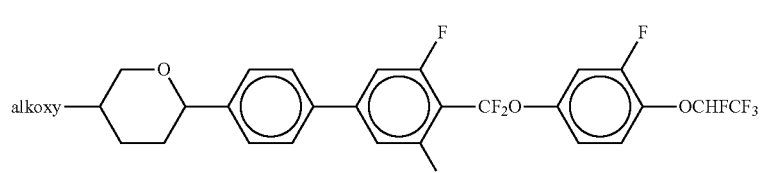
I-24
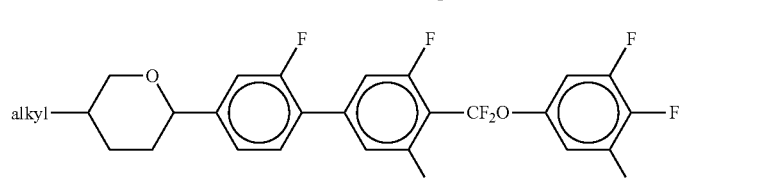
I-25
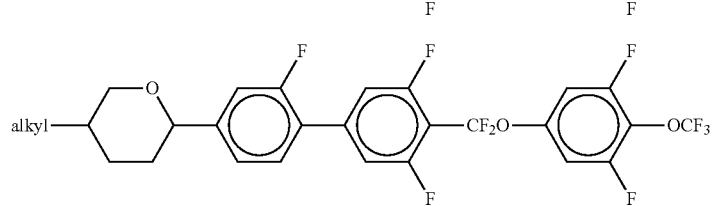
I-26
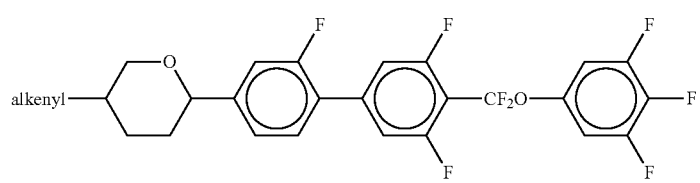
I-27
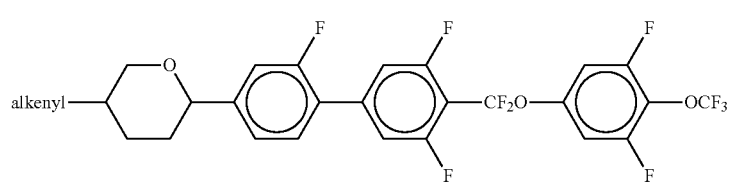
I-28
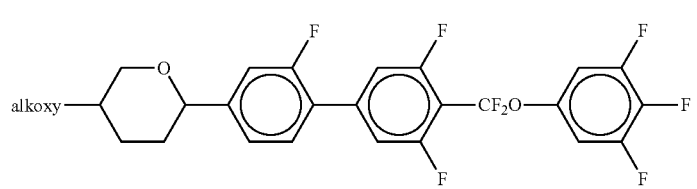
I-29

I-30
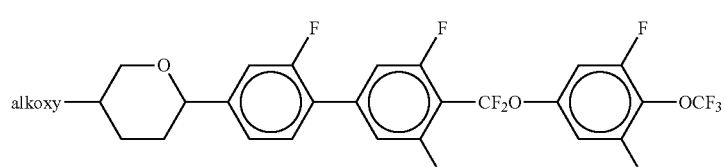
I-31
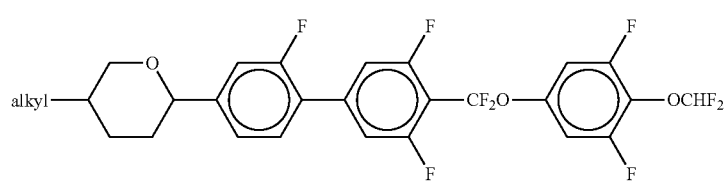
I-32
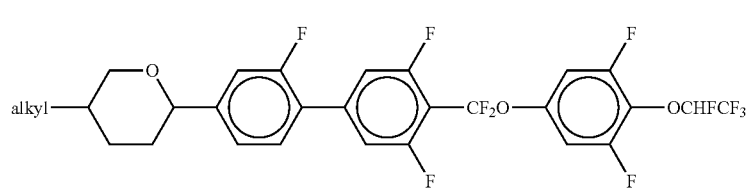
I-33
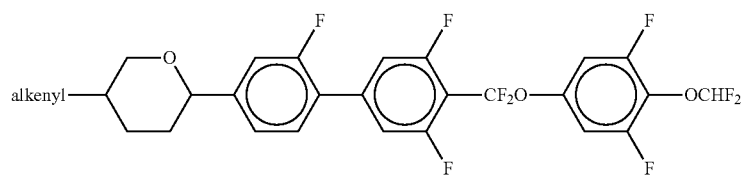
I-34
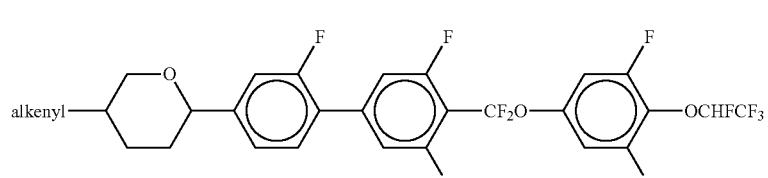
I-35
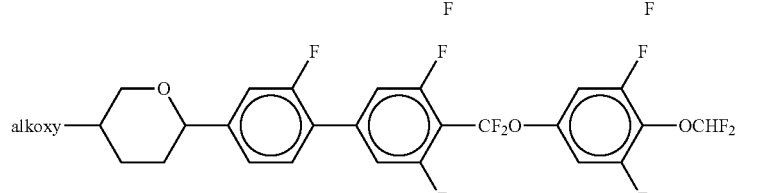
I-36
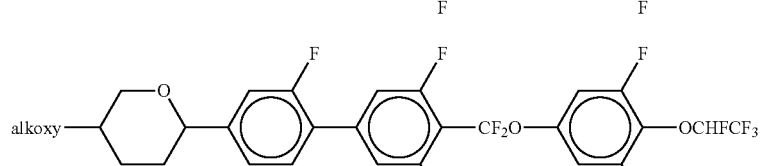
I-37
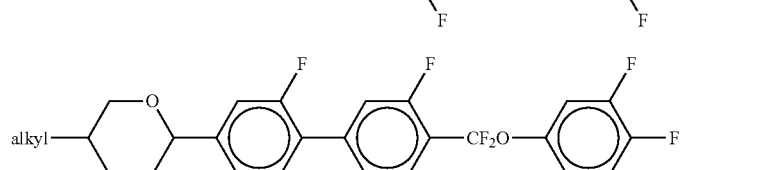
I-38
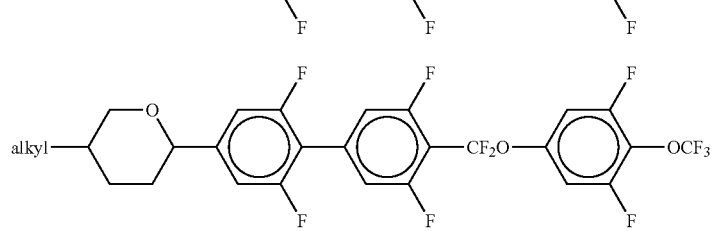

I-39
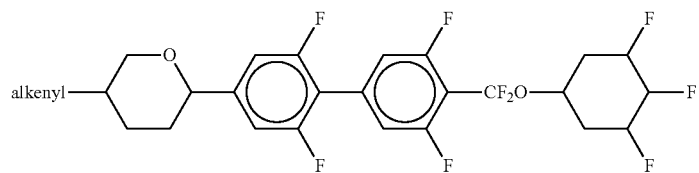
I-40
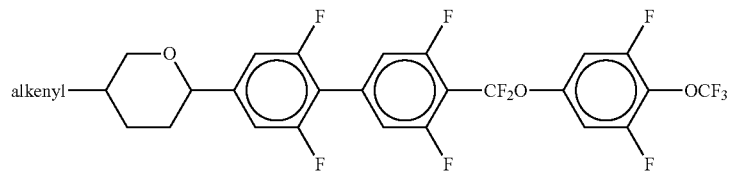
I-41
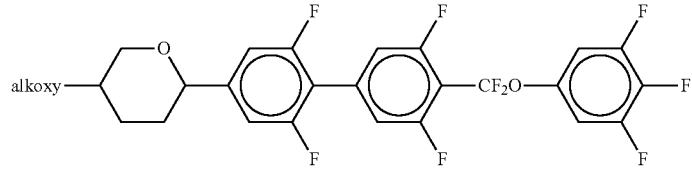
I-42
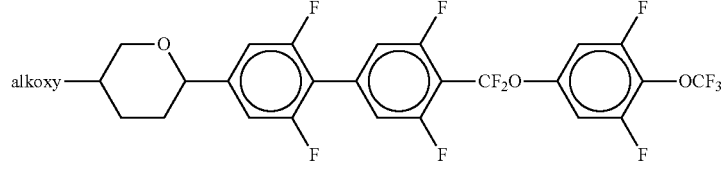
I-43
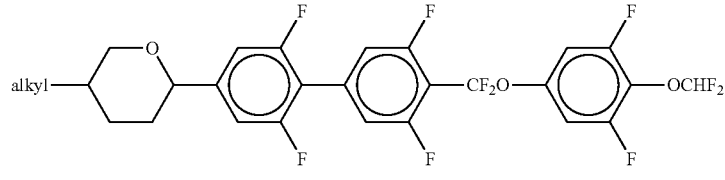
I-44
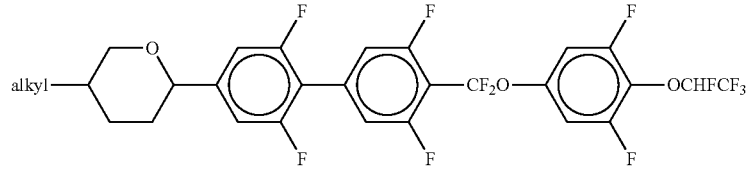
I-45
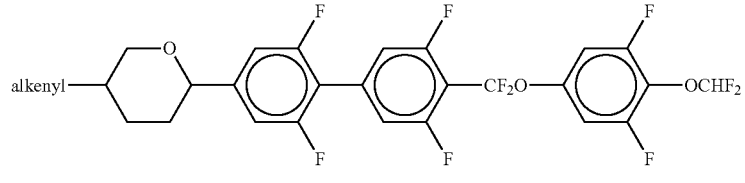
I-46
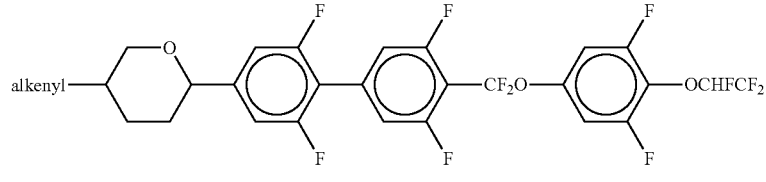
I-47
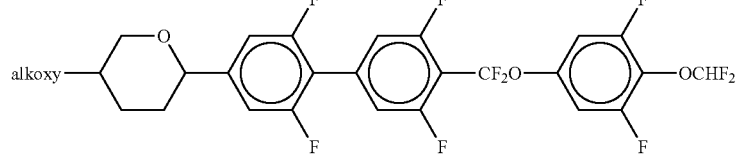

-continued

I-48

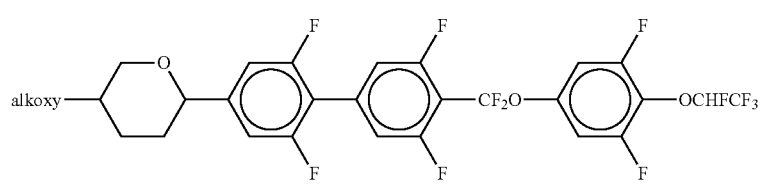

wherein
  alkyl is a straight-chain alkyl radical with 1-7 C atoms,
  alkoxy is a straight-chain alkoxy radical with 1-7 C atoms, and
  alkenyl is a straight-chain alkenyl radical with 2-7 C atoms.

16. The liquid-crystalline medium according to claim 15, wherein said one or more compounds of formula I are selected from compounds of formulae I-1 to I-2.

17. The liquid-crystalline medium according to claim 1, wherein said compounds of formula IA are selected from compounds of formulae IA-1 to IA-18:

IA-1
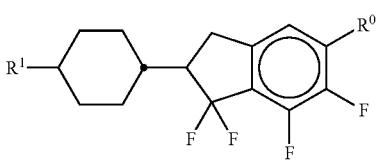

IA-2
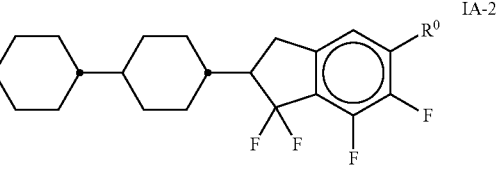

IA-3
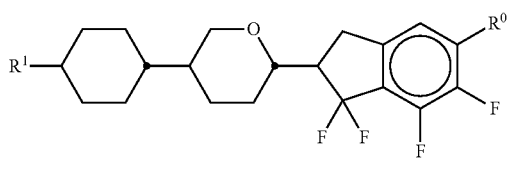

IA-4
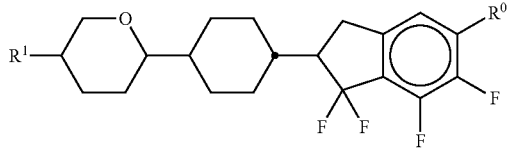

IA-5
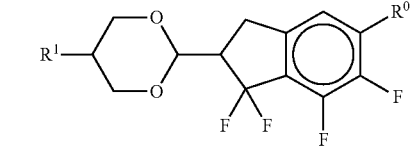

IA-6
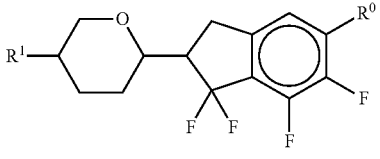

-continued

IA-7
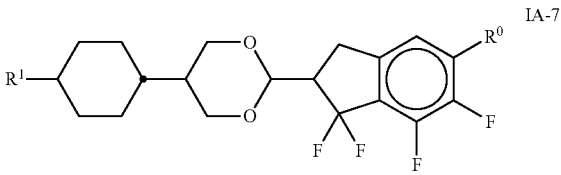

IA-8
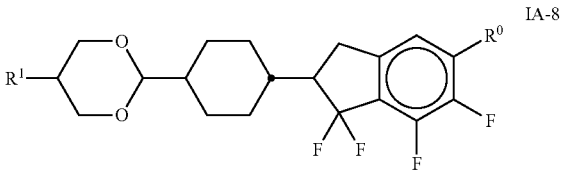

IA-9
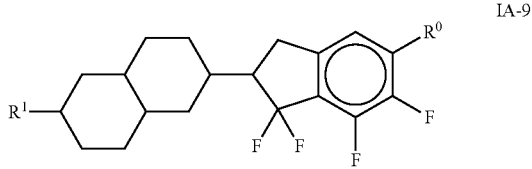

IA-10
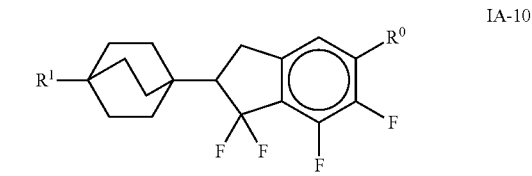

IA-11
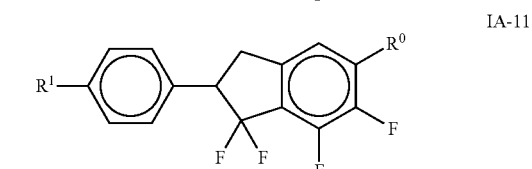

IA-12
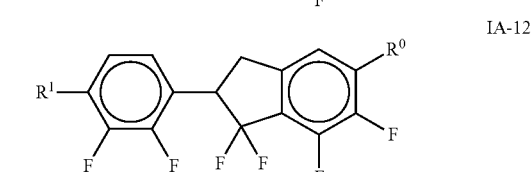

IA-13
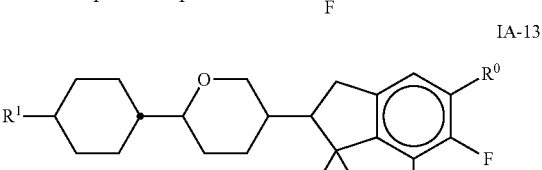

IA-14
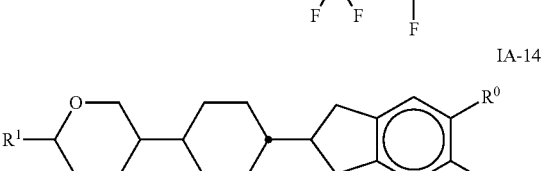

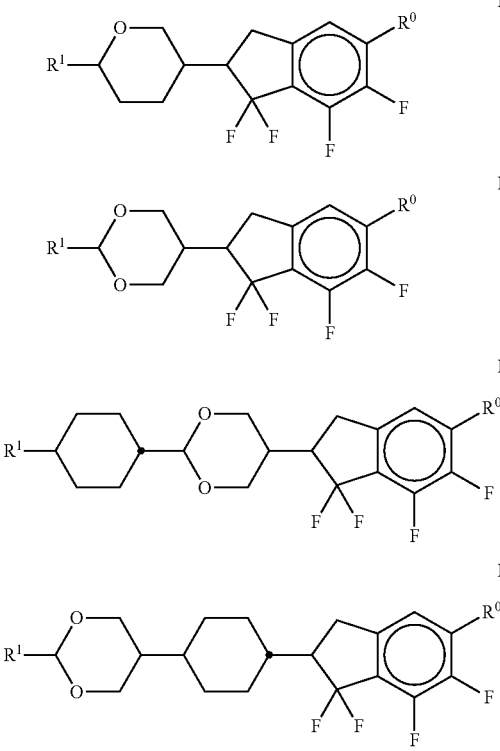
wherein R⁰ and R¹ have the meanings given in claim 1.
18. The liquid-crystalline medium according to claim 17, wherein $R^1$ is $C_2H_5$, n-$C_3H_7$, or n-$C_5H_{11}$ and $R^0$ is H, $CH_3$, $C_2H_5$ or n-$C_3H_7$.
19. The liquid-crystalline medium according to claim 1, wherein said compounds of formula TB are selected from compounds of formulae IB-1 to IB-24:
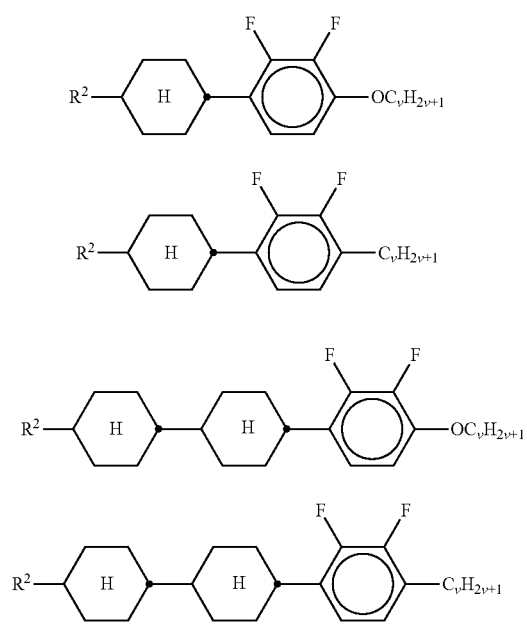
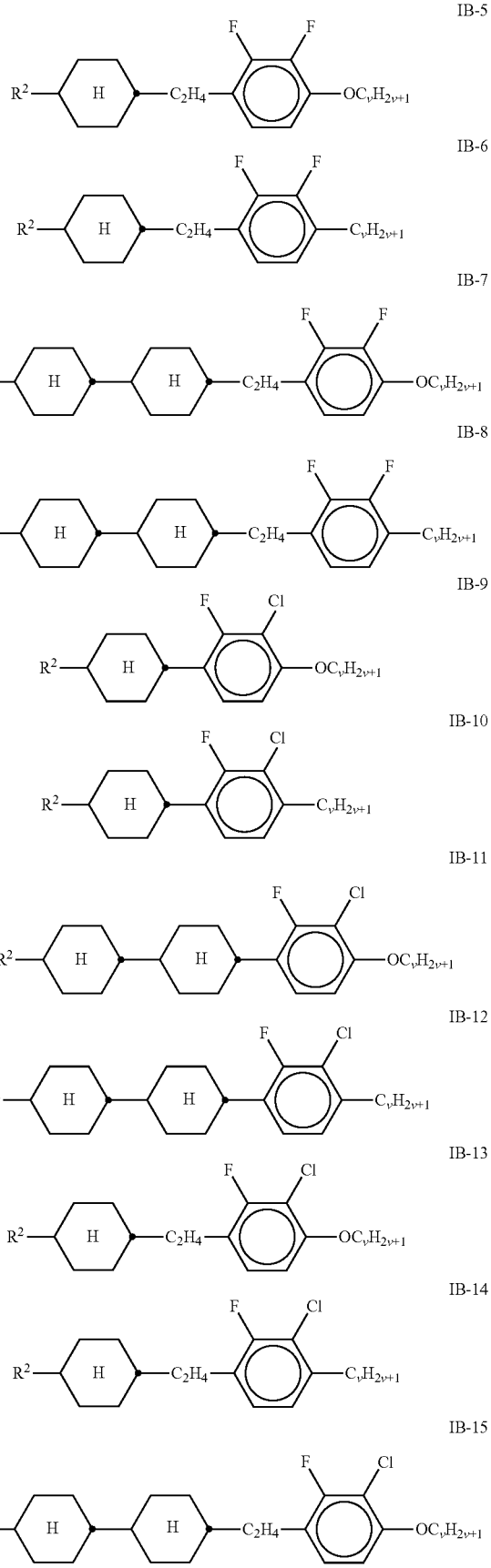

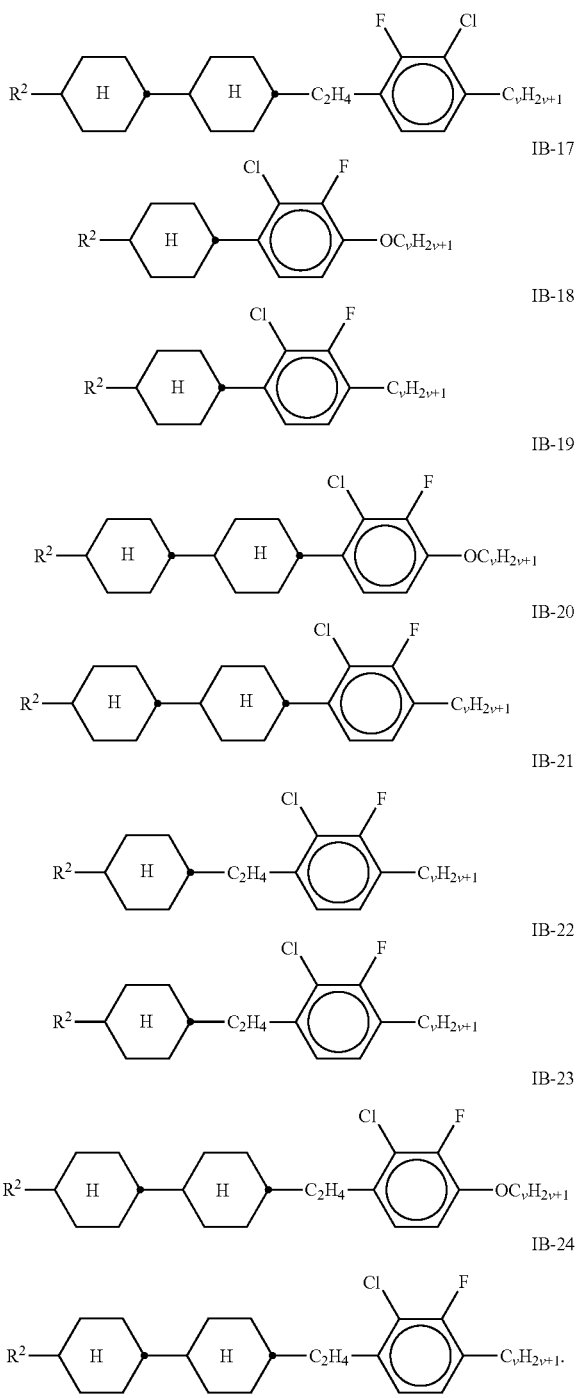

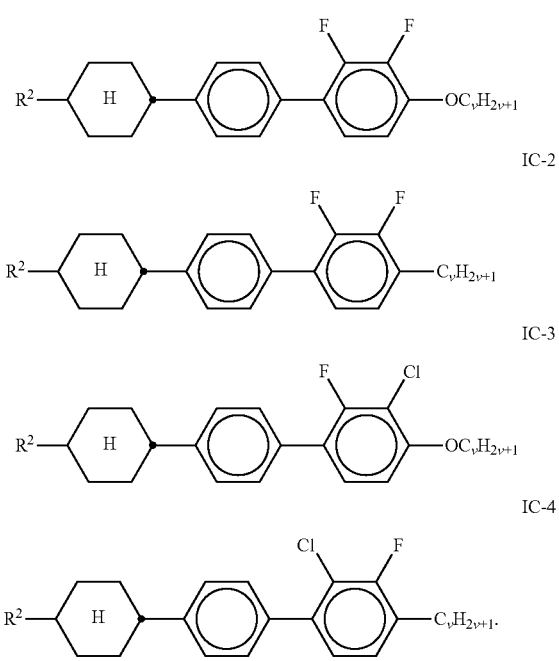

20. The liquid-crystalline medium according to claim 19, wherein R² is a straight-chained alkyl group having 1 to 6 carbon atoms or an alkenyl group having 2 to 6 carbon atoms.

21. The liquid-crystalline medium according to claim 19, wherein said compounds of formula IB are selected from compounds of formulae IB-1, IB-2, IB-3, IB-4, IB-5 and IB-6.

22. The liquid-crystalline medium according to claim 1, wherein said compounds of formula IC are selected from compounds of formulae IC-1 to IC-4:

23. The liquid-crystalline medium according to claim 22, wherein R² is a straight-chained alkyl group having 1 to 6 carbon atoms or an alkenyl group having 2 to 6 carbon atoms.

24. The liquid-crystalline medium according to claim 22, wherein said compounds of formula IC are selected from compounds of formulae IC-1 and IC-2.

25. The liquid-crystalline medium according to claim 1, wherein said compounds of formula ID are selected from compounds of formulae ID-1 to ID-6:

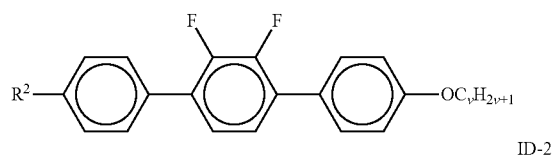

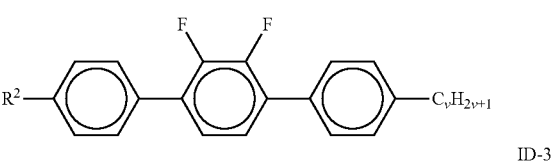

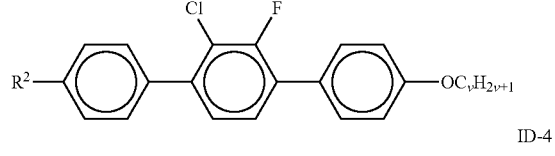

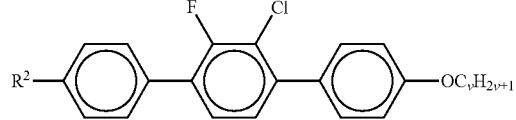

-continued

ID-5

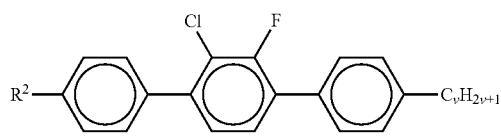

ID-6

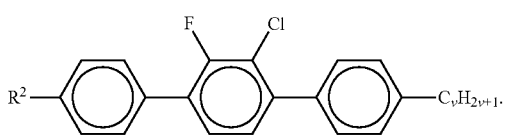

26. The liquid-crystalline medium according to claim 25, wherein $R^2$ is a straight-chained alkyl group having 1 to 6 carbon atoms or an alkenyl group having 2 to 6 carbon atoms.

27. The liquid-crystalline medium according to claim 25, wherein said compounds of formula IC are selected from compounds of formulae ID-1 and ID-2.

28. The liquid-crystalline medium according to claim 1, wherein said compounds of formula IE are selected from compounds of formulae IE-1 to IE-6:

IE-1

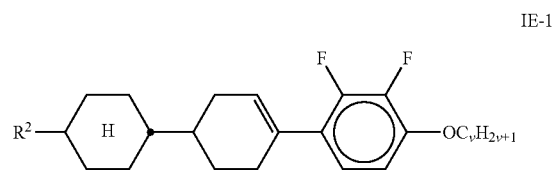

IE-2

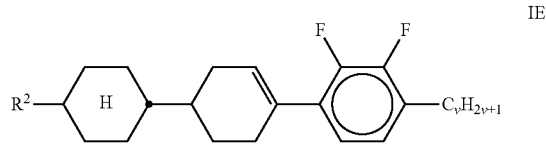

IE-3

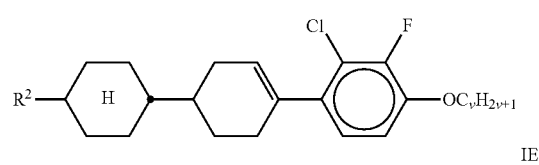

IE-4

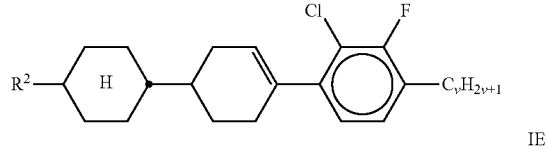

IE-5

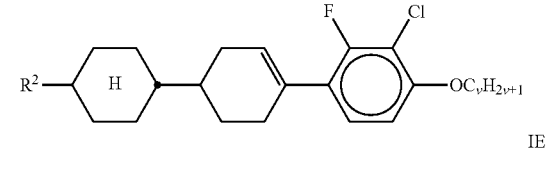

IE-6

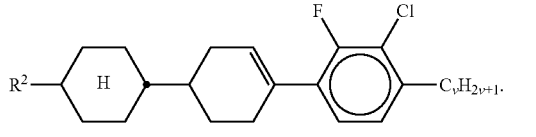

29. The liquid-crystalline medium according to claim 28, wherein $R^2$ is a straight-chained alkyl group having 1 to 6 carbon atoms or an alkenyl group having 2 to 6 carbon atoms.

30. The liquid-crystalline medium according to claim 28, wherein said compounds of formula IC are selected from compounds of formulae IE-1 and IE-2.

31. The liquid-crystalline medium according to claim 4, wherein said compounds of formula IV are selected from compounds of formulae IVa-IVf:

IVa

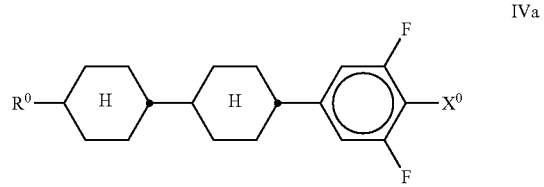

IVb

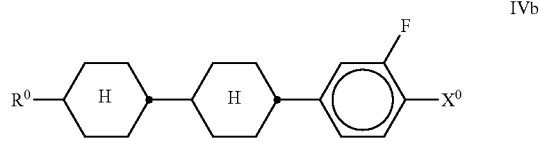

IVc

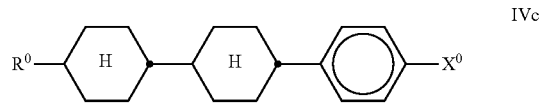

IVd

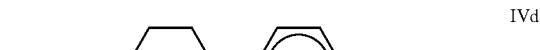

IVe

IVf

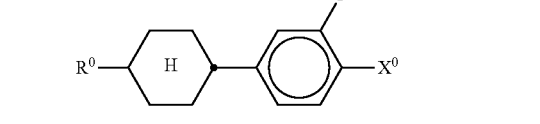

32. The liquid-crystalline medium according to claim 4, wherein said compounds of formula VII are selected from compounds of formulae VII-1a-VII-1e:

VII-1a

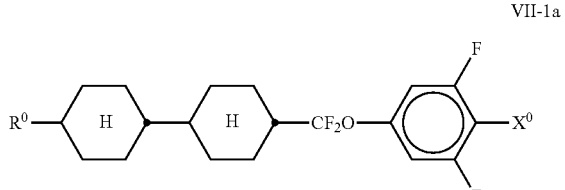

VII-1b

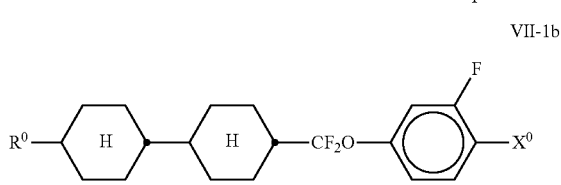

-continued

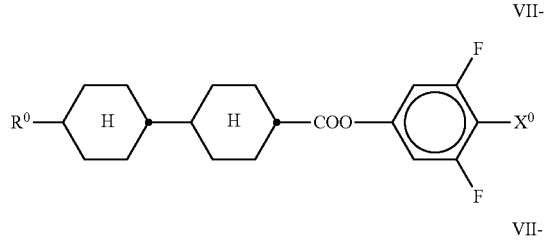
VII-1c

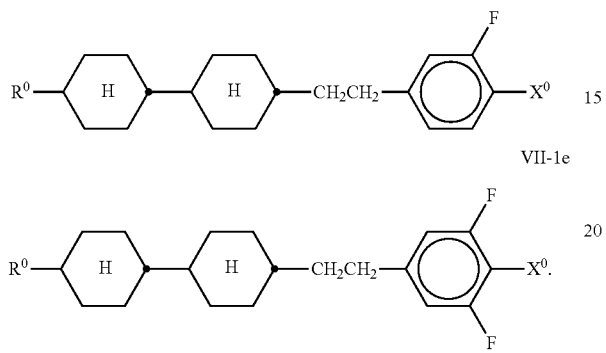
VII-1d

VII-1e

33. The liquid-crystalline medium according to claim 4, wherein said compounds of formula VIII are selected from compounds of formulae VIIIa-VIIf:

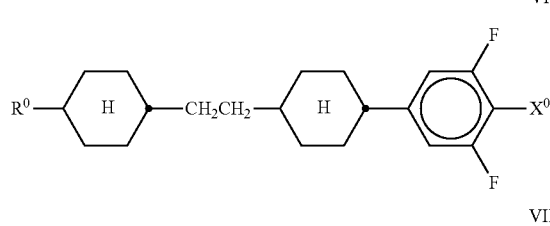
VIIIa

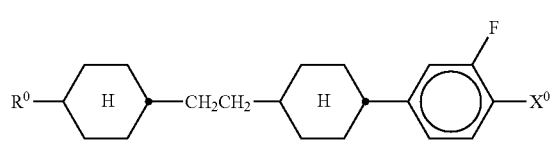
VIIIb

VIIIc

VIIId

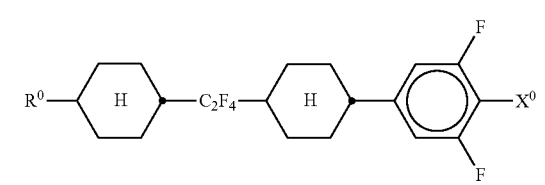
VIIIe

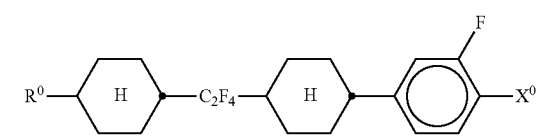

-continued

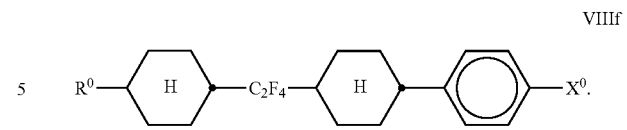
VIIIf

34. The liquid-crystalline medium according to claim 1, wherein said medium additionally contains one or more compounds selected of formula IX:

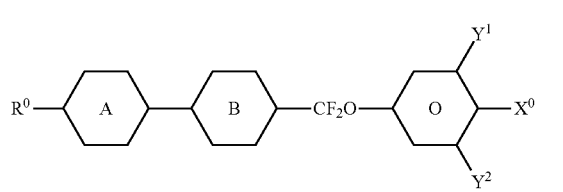
IX in which $R^0$ and $X^0$ have the meanings indicated in claim 1, $Y^1$ and $Y^2$ each, independently of one another, denote H or F,

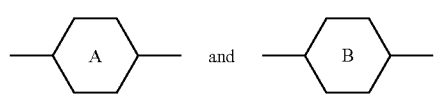

each, independently of one another denote

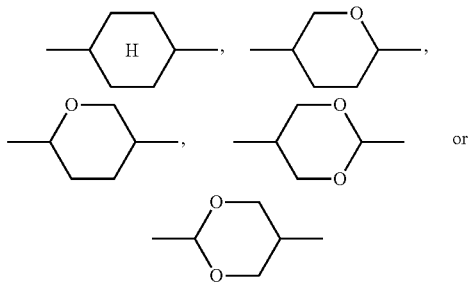

where rings A and B do not both simultaneously denote cyclohexylene.

35. The liquid-crystalline medium according to claim 34, wherein said one or more compounds selected of formula IX are selected from compounds of formulas IXa-IXh:

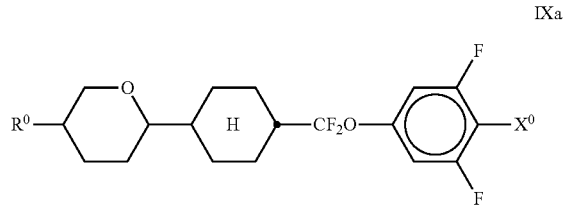
IXa

-continued

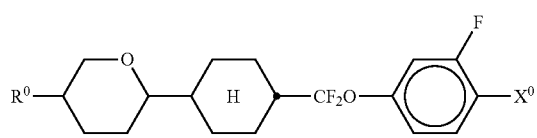

IXb

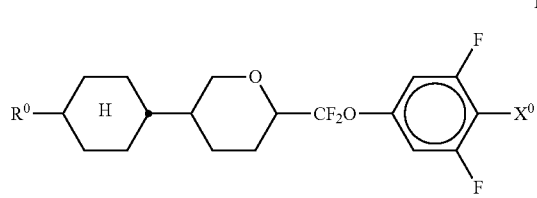

IXc

IXd

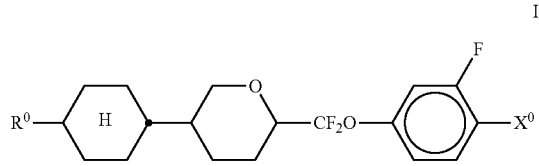

IXe

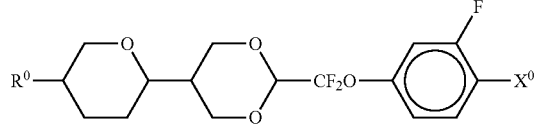

IXf

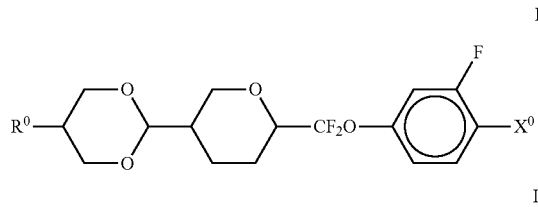

IXg

IXh

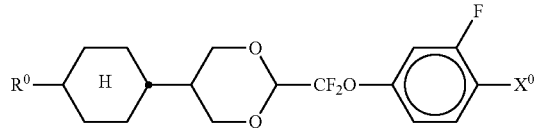

36. The liquid-crystalline medium according to claim 1, wherein said medium additionally contains one or more compounds selected of formula Xa:

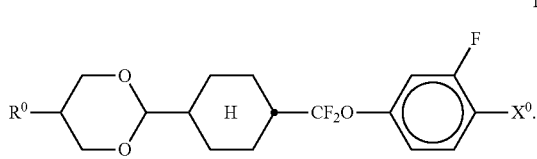

Xa in which $R^0$ and $X^0$ have the meanings indicated in claim 1.

37. The liquid-crystalline medium according to claim 1, wherein said medium additionally contains one or more compounds of formula XII:

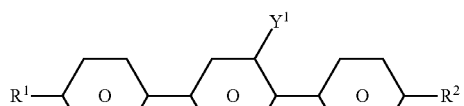

XII in which $R^1$ and $R^2$ each, independently of one another, denote n-alkyl, alkoxy, oxaalkyl, fluoroalkyl or alkenyl, each having up to 9 C atoms, and $Y^1$ denotes H or F.

38. The liquid-crystalline medium according to claim 37, wherein said one or more compounds selected of formula XII are selected from compounds of the following formulas:

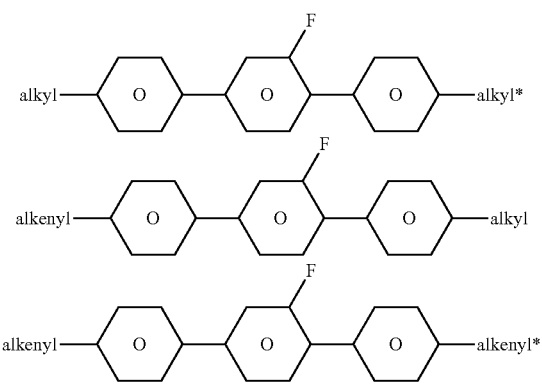

in which alkyl and alkyl* are each, independently of one another, a straight-chain alkyl radical having 1 to 6 C atoms, and alkenyl and alkenyl* are each, independently of one another, a straight-chain alkenyl radical having 2 to 6 C atoms.

39. The liquid-crystalline medium according to claim 1, wherein said medium additionally contains one or more compounds selected from formulas D1-D3:

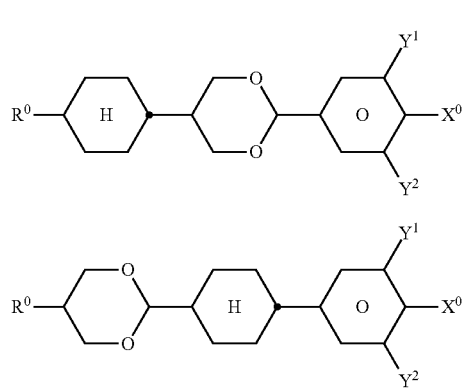

D1

D2

-continued

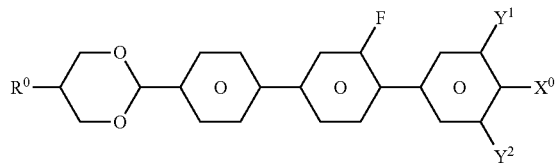
D3 in which
R⁰ and X⁰ have the meanings indicated in claim 1, and
Y¹ and Y² each, independently of one another, denote H or F.

40. The liquid-crystalline medium according to claim 1, wherein said medium additionally contains one or more compounds selected from formula XVII:

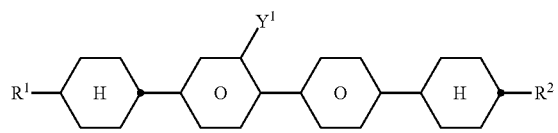
XVII in which
R¹ and R² have the meanings indicated in claim 1, and
Y¹ is H or F.

41. The liquid-crystalline medium according to claim 1, wherein said medium additionally contains one or more compounds selected from formula XVIII:

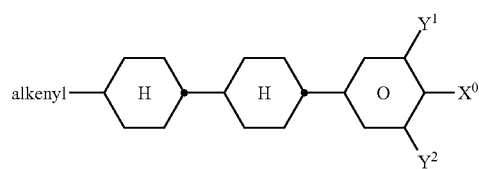
XVIII in which
X⁰ has the meanings indicated in claim 1,
Y¹ and Y² each, independently of one another, denote H or F, and
"alkenyl" is $C_{2-7}$-alkenyl.

42. The liquid-crystalline medium according to claim 1, wherein said medium additionally contains one or more compounds selected from formulas XIX-XXII:

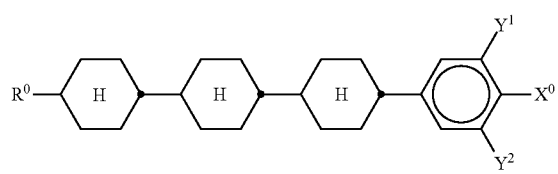
XIX

-continued

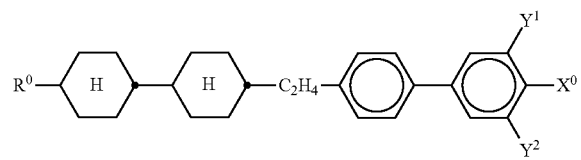
XX

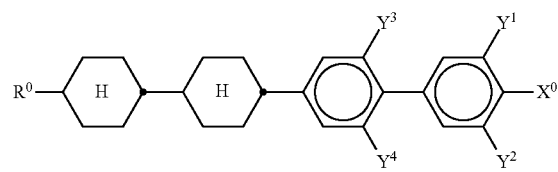
XXI

XXII in which
R⁰ and X⁰ have the meanings indicated in claim 1, and
$Y^{1-4}$ are each, independently of one another, H or F.

43. The liquid-crystalline medium according to claim 1, wherein said medium contains 1-25% by weight of compounds of the formula I based on the total medium, and the amount of compounds of formulas IA, D3, IC, ID and IE in said medium is 2-30% based on the total medium.

44. The liquid-crystalline medium according to claim 1, wherein said medium contains 1-20% by weight of compounds of the formula I based on the total medium, and the amount of compounds of formulas IA, D3, IC, ID and IE in said medium is 5-20% by weight based on the total medium.

45. The liquid-crystalline medium according to claim 1, wherein said medium contains 2-15% by weight of compounds of the formula I based on the total medium, and the amount of compounds of formulas IA, D3, IC, ID and IE in said medium is 2-15% by weight based on the total medium.

46. The liquid-crystalline medium according to claim 2, wherein said medium contains 25-80% by weight of compounds of the formulae II and/or III.

47. The liquid-crystalline medium according to claim 1, wherein the amount of compounds of formulas IA, IB, IC, ID and IE in said medium is 5-20% by weight based on the total medium.

48. The liquid-crystalline medium according to claim 1, wherein the amount of compounds of formulas IA, IB, IC, ID and IE in said medium is 2-15% by weight based on the total medium.

* * * * *

UNITED STATES PATENT AND TRADEMARK OFFICE
CERTIFICATE OF CORRECTION

PATENT NO. : 8,795,552 B2  
APPLICATION NO. : 13/058697  
DATED : August 5, 2014  
INVENTOR(S) : Mingchou Wu et al.

Page 1 of 1

It is certified that error appears in the above-identified patent and that said Letters Patent is hereby corrected as shown below:

In the Claims

Column 91, Line 20 reads: "R° have the meanings indicated in Claim 1," should read --R° and X° have the meanings indicated in Claim 1 ,--.

Column 107, Line 39 reads: "wherein said compounds of formula TB are selected from" should read --wherein said compounds of formula IB are selected from--.

Column 118, Line 37 reads: "amount of compounds of formulas IA, D3, IC, ID and IE in" should read --amount of compounds of formulas IA, IB, IC, ID and IE in--.

Column 118, Line 42 reads: "amount of compounds of formulas IA, D3, IC, ID and IE in" should read --amount of compounds of formulas IA, IB, IC, ID and IE in--.

Column 118, Line 47 reads: "amount of compounds of formulas IA, D3, IC, ID and IE in" should read --amount of compounds of formulas IA, IB, IC, ID and IE in--.

Signed and Sealed this  
Twenty-fourth Day of February, 2015

Michelle K. Lee  
*Deputy Director of the United States Patent and Trademark Office*